April 23, 1957 E. NYSSONEN 2,790,099
POLYPHASE INDUCTION MACHINE
Filed Nov. 17, 1954 16 Sheets-Sheet 1

INVENTOR.
Einard Nyssonen

April 23, 1957  E. NYYSSONEN  2,790,099
POLYPHASE INDUCTION MACHINE
Filed Nov. 17, 1954  16 Sheets-Sheet 2

INVENTOR.
Einard Nyyssonen

April 23, 1957 E. NYYSSONEN 2,790,099
POLYPHASE INDUCTION MACHINE
Filed Nov. 17, 1954 16 Sheets-Sheet 3

INVENTOR.
Einard Nyyssonen

INVENTOR.
Einard Nyyssonen

INVENTOR.
Einard Nyyssonen

April 23, 1957     E. NYYSSONEN     2,790,099
POLYPHASE INDUCTION MACHINE
Filed Nov. 17, 1954     16 Sheets-Sheet 6
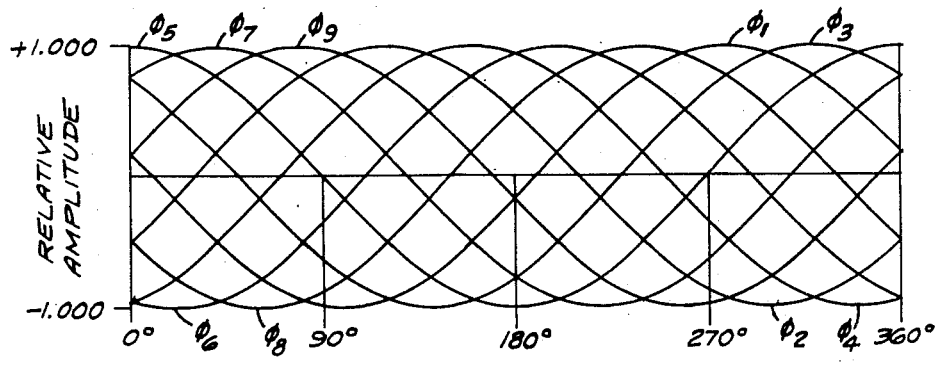
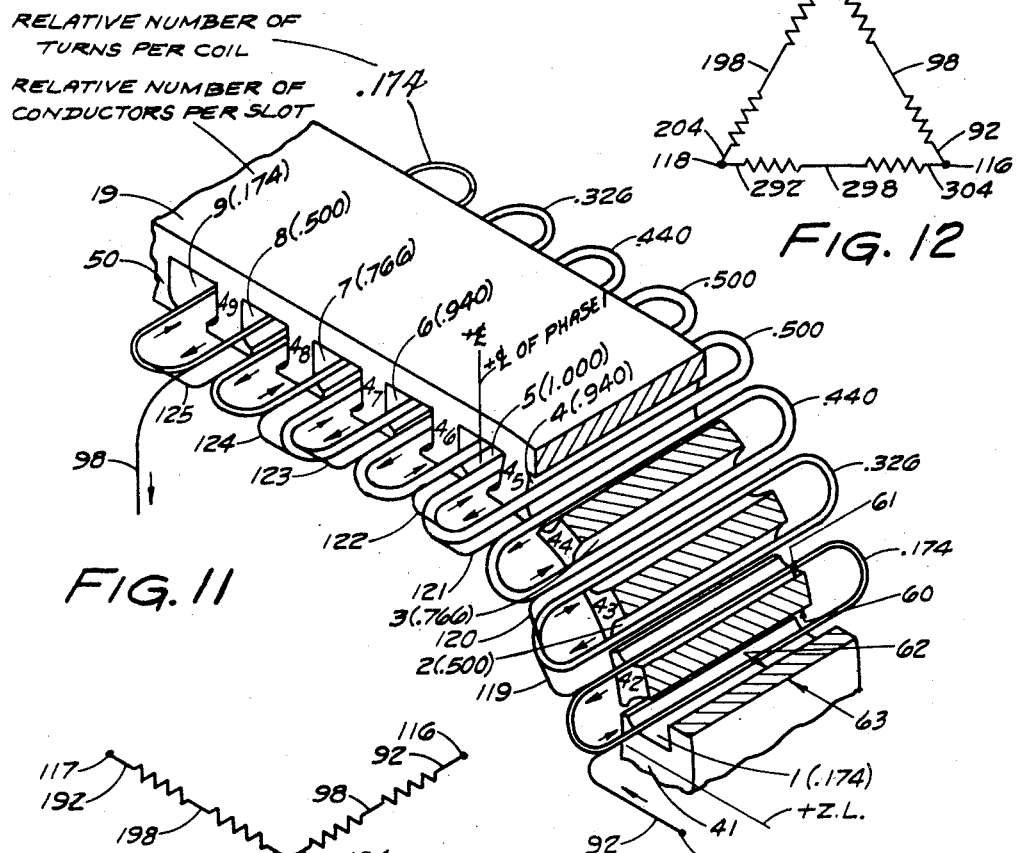
INVENTOR.
Einard Nyyssonen

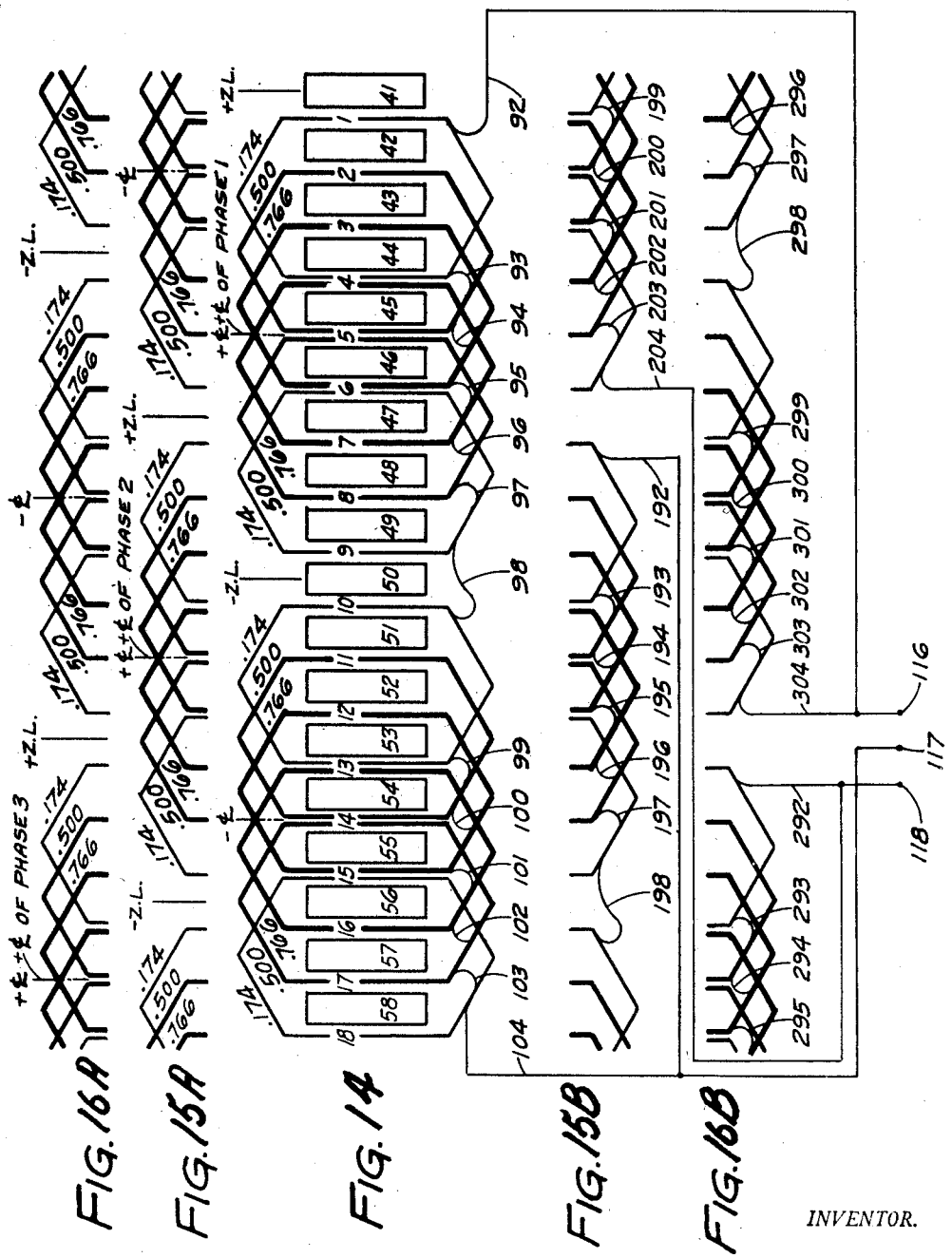

April 23, 1957  E. NYYSSONEN  2,790,099
POLYPHASE INDUCTION MACHINE
Filed Nov. 17, 1954  16 Sheets-Sheet 9

INVENTOR.
Einard Nyyssonen

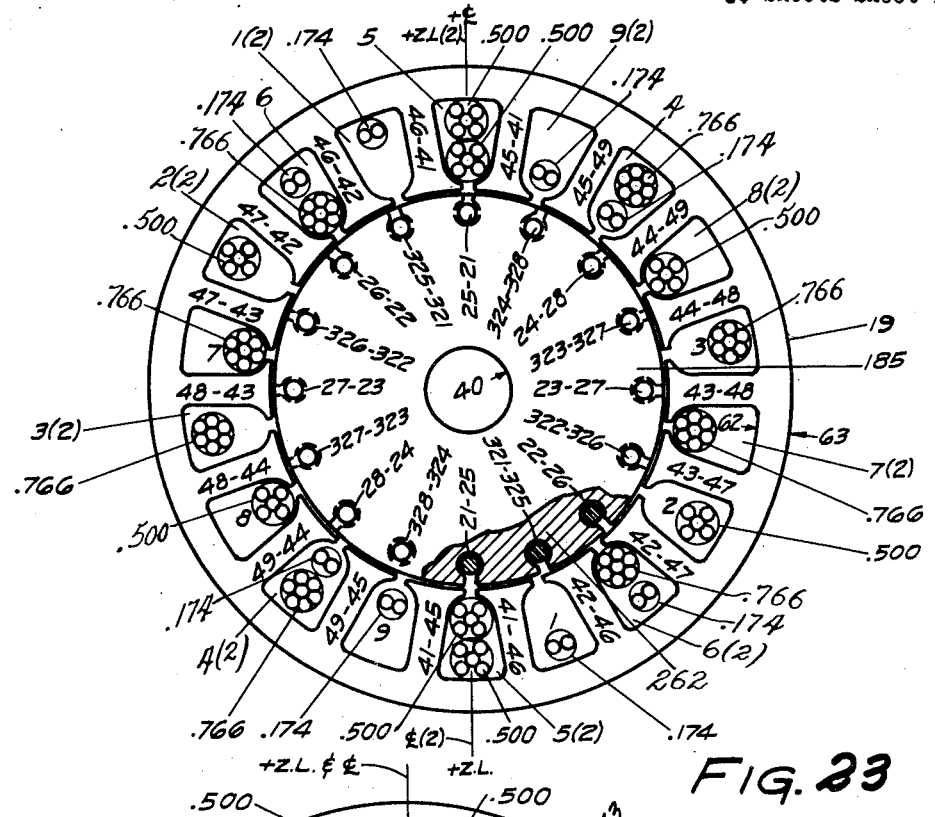

INVENTOR.
Evard Nyyssonen

INVENTOR.
Einard Nyyssonen

INVENTOR.
Einard Nyyssonen

April 23, 1957
E. NYYSSONEN
2,790,099
POLYPHASE INDUCTION MACHINE
Filed Nov. 17, 1954
16 Sheets-Sheet 14
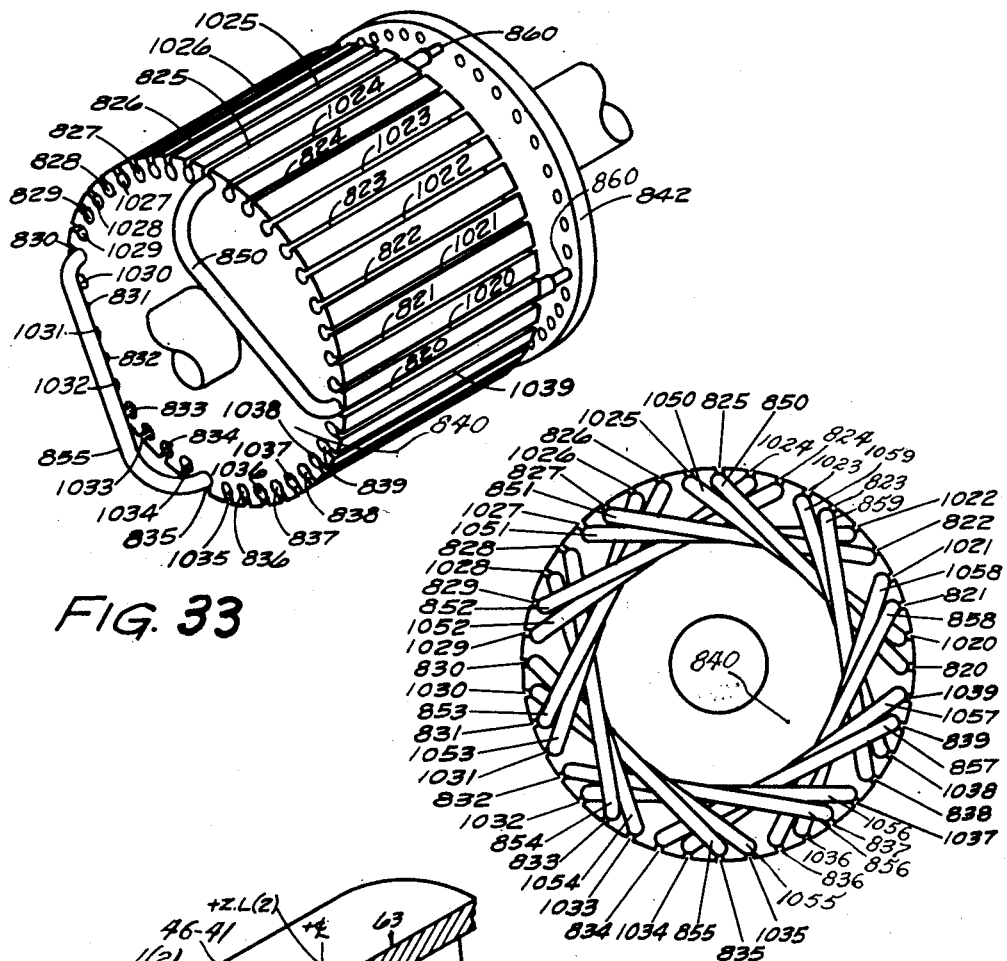
FIG. 33
FIG. 34
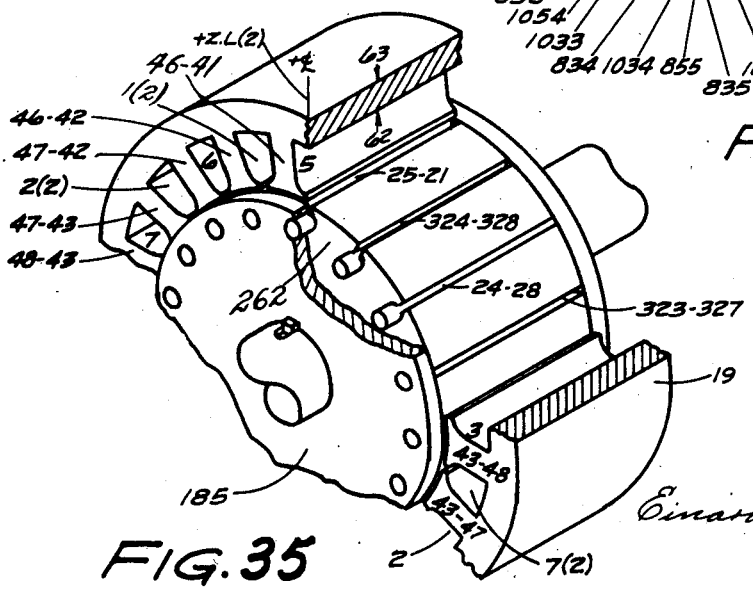
FIG. 35
INVENTOR.
Einard Nyyssonen April 23, 1957   E. NYYSSONEN   2,790,099
POLYPHASE INDUCTION MACHINE
Filed Nov. 17, 1954   16 Sheets-Sheet 15

INVENTOR.
Einard Nyyssonen

2,790,099

POLYPHASE INDUCTION MACHINE

Einard Nyyssonen, Watertown, Mass.

Application November 17, 1954, Serial No. 469,394

37 Claims. (Cl. 310—202)

The present invention relates to polyphase induction machines.

An object of the invention is to provide a new and improved polyphase induction machine.

A further object of the invention is to provide an induction machine of the above-described character in which the detrimental harmonics of the induced back electromotive forces shall be effectively cancelled.

Other and further objects will be explained hereinafter and will be particularly pointed out in the appended claims.

Figure 1:
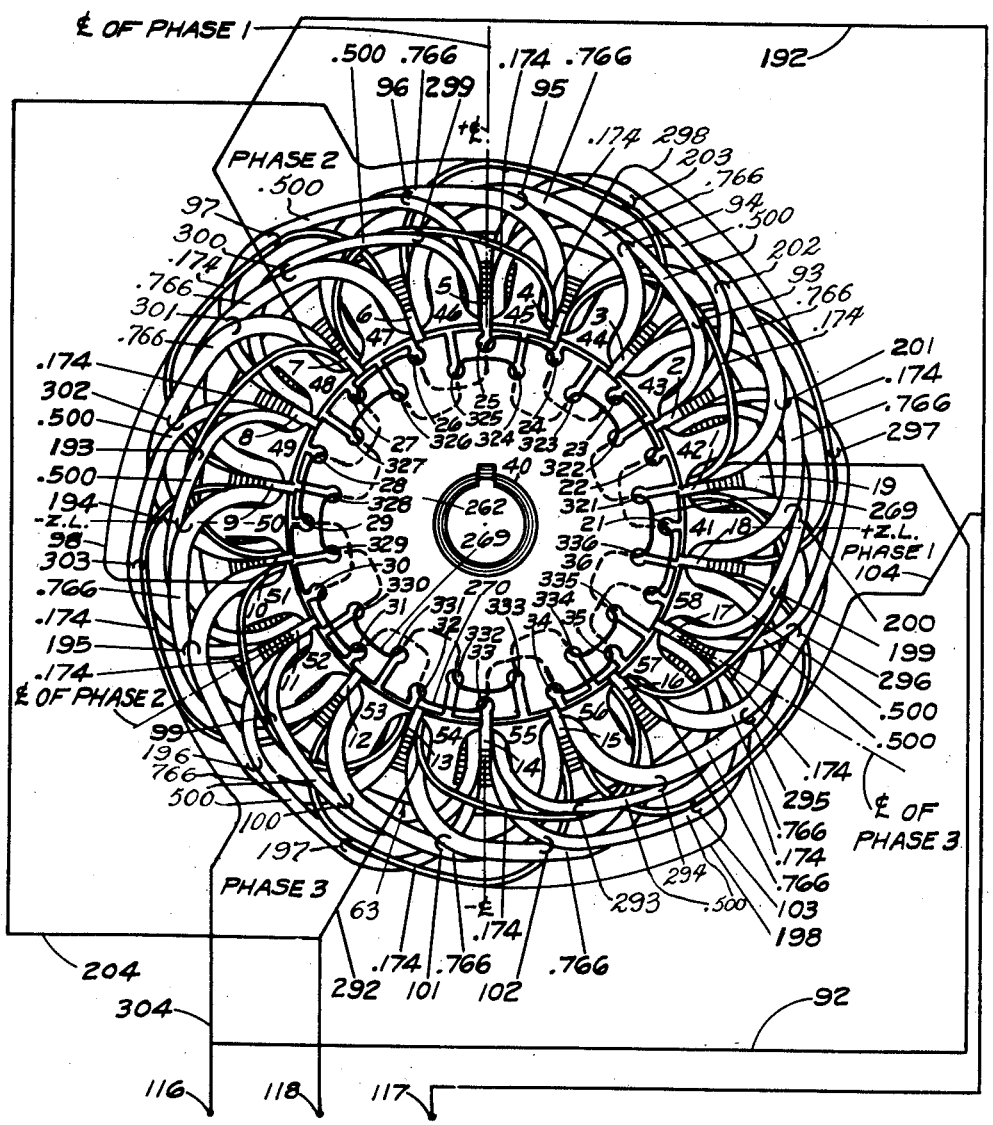
Figure 2:
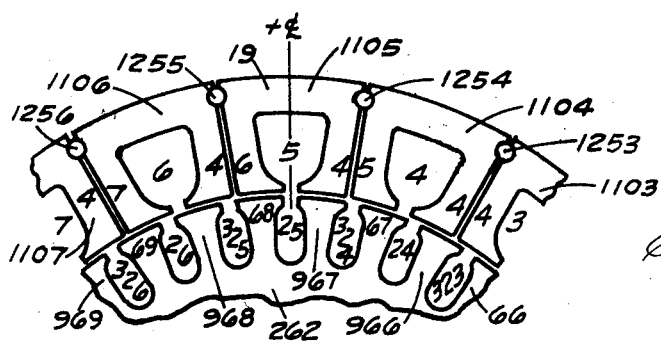
Figure 3:
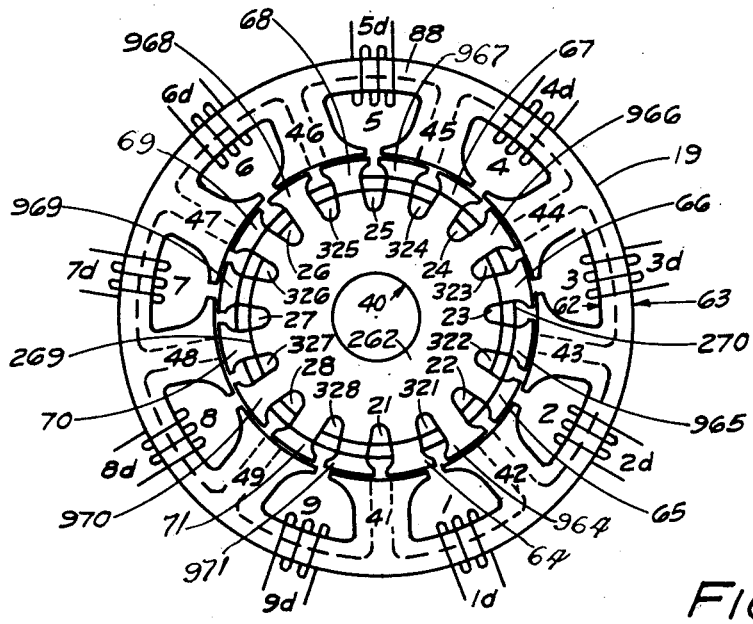
Figure 4:
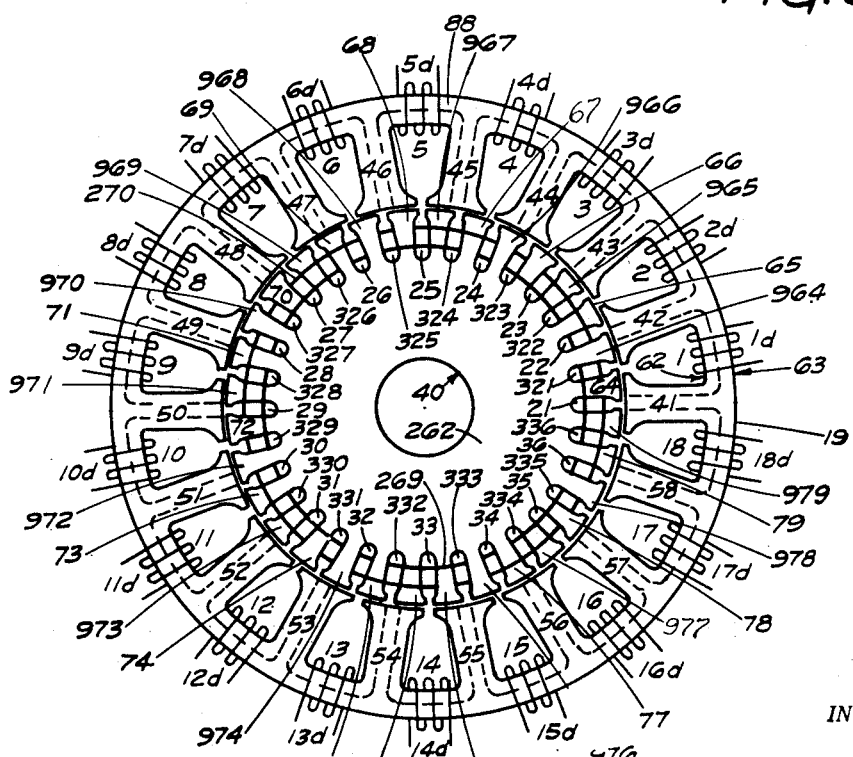
Figure 5:
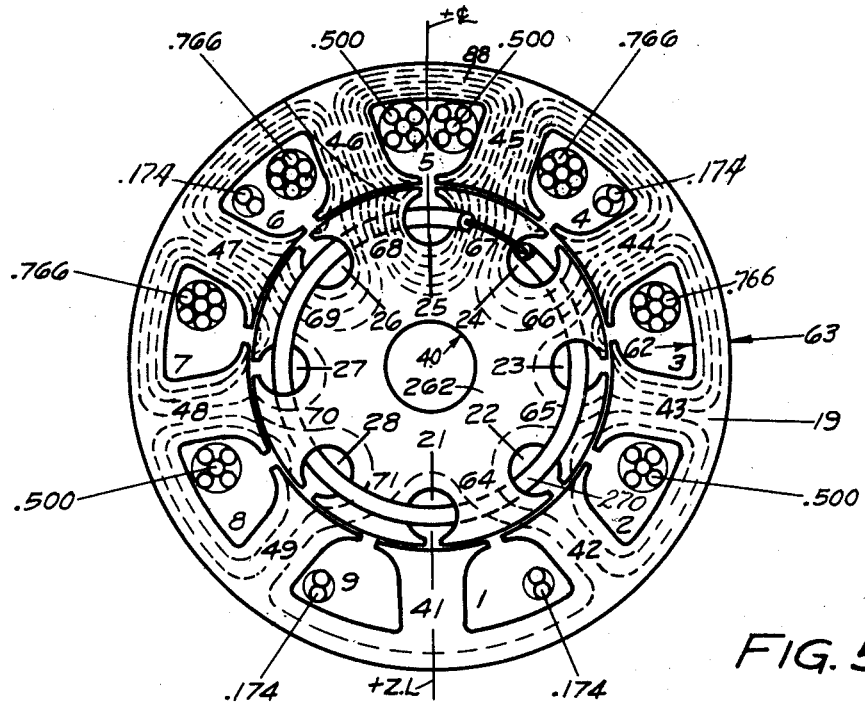
Figure 6:
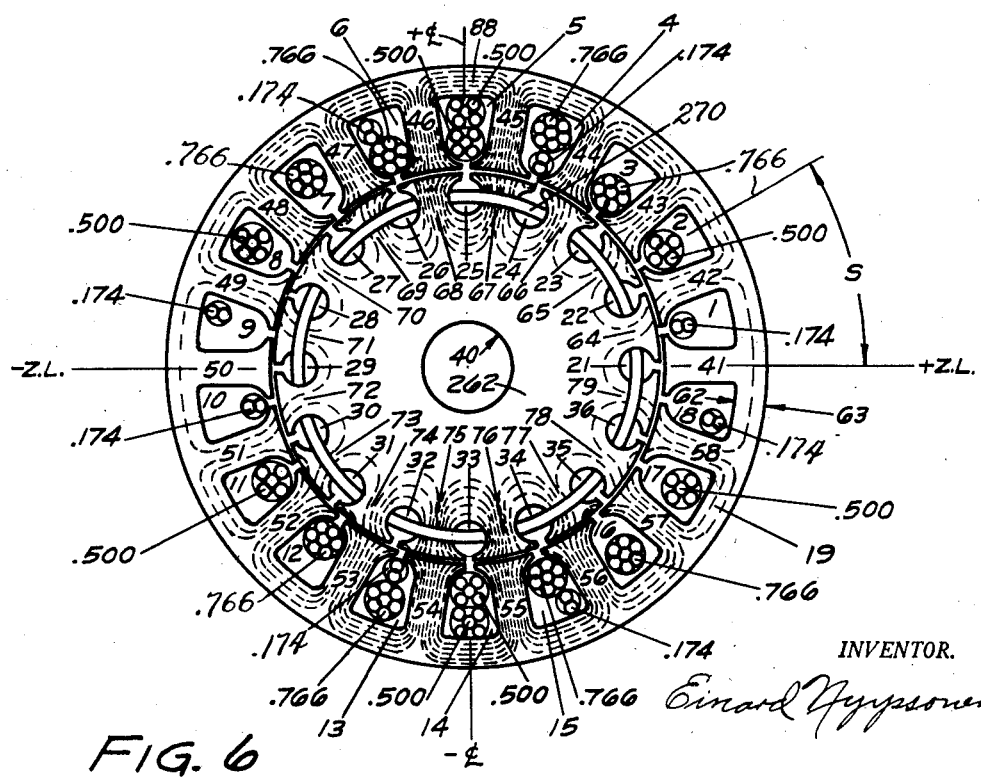
Figure 7:
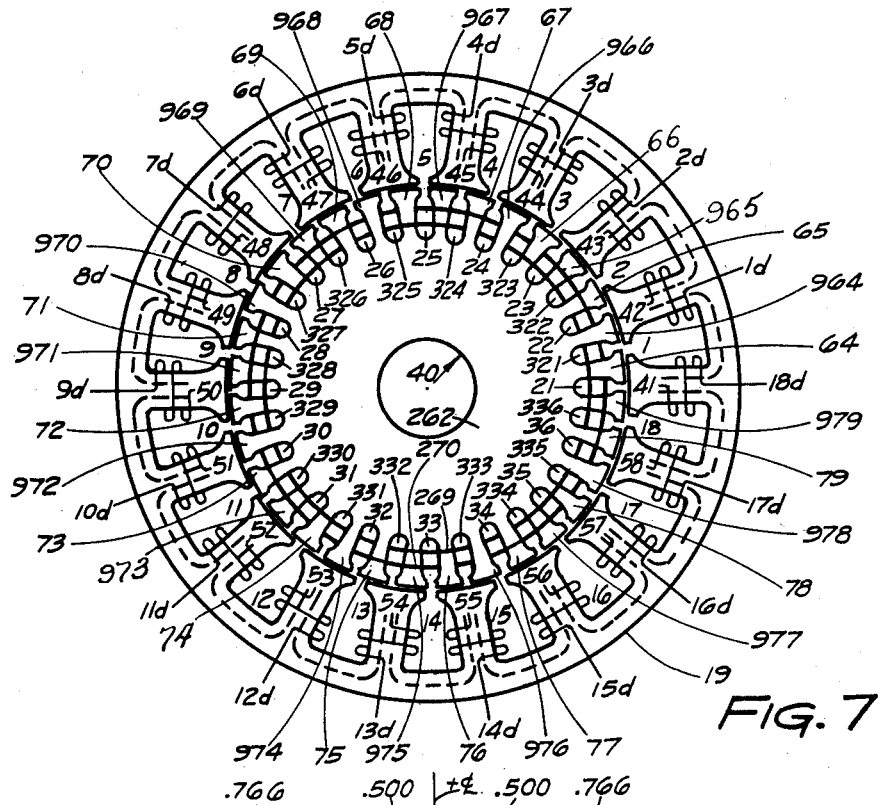
Figure 8:
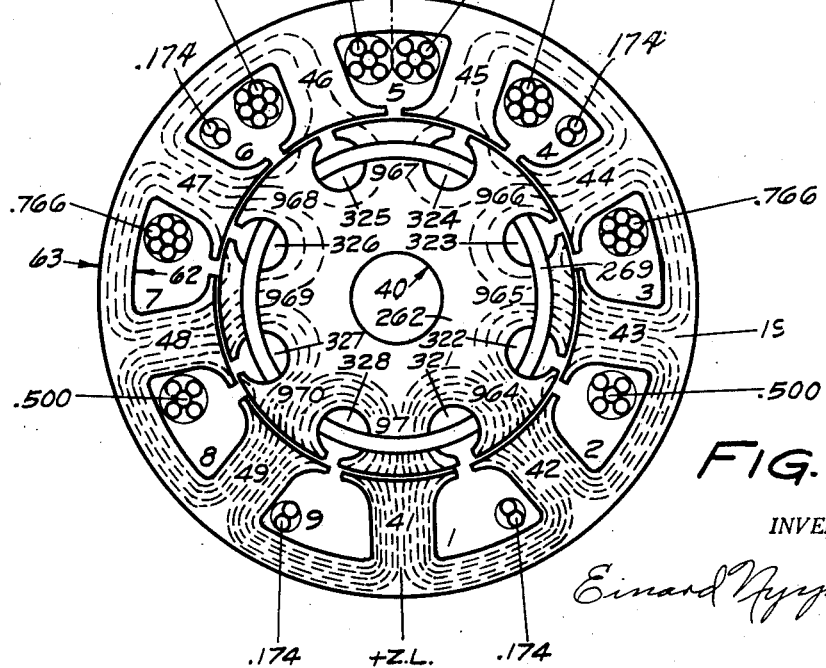
Figure 9:
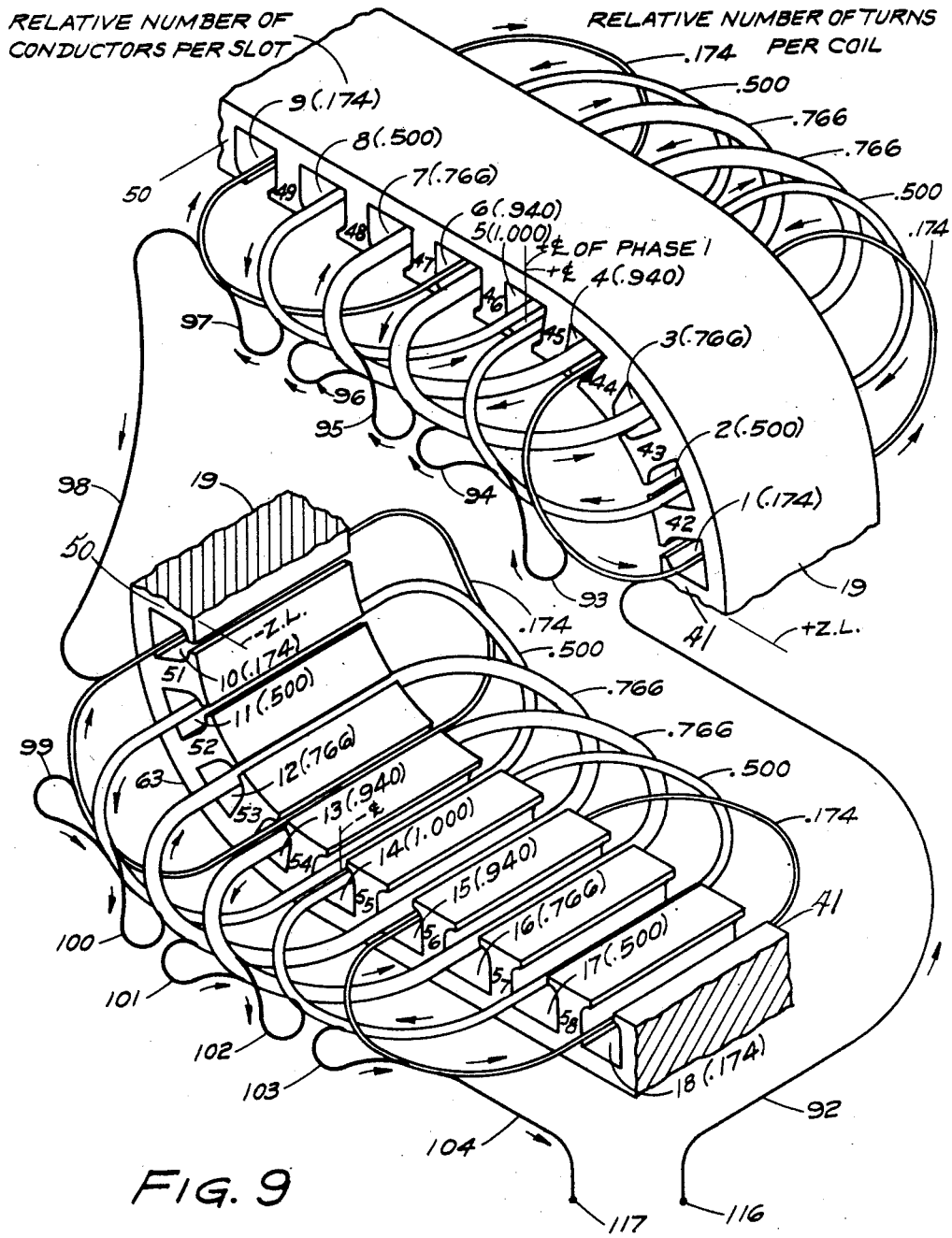
Figure 17:
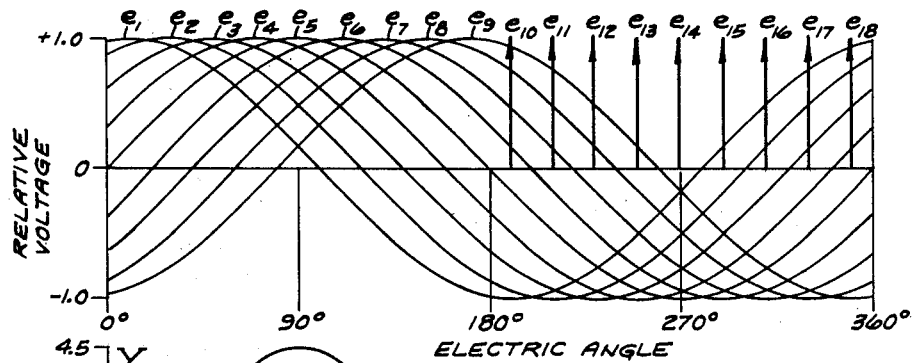
Figure 18:
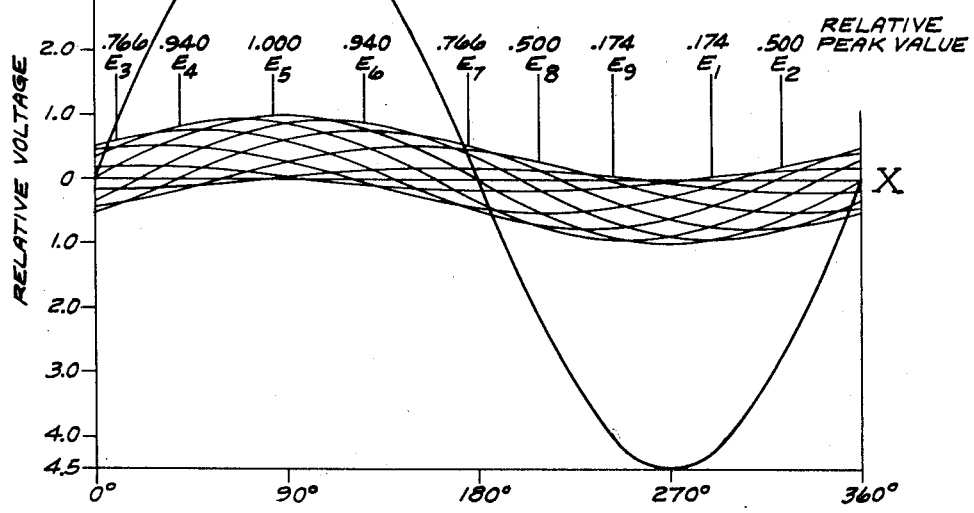
Figure 19:
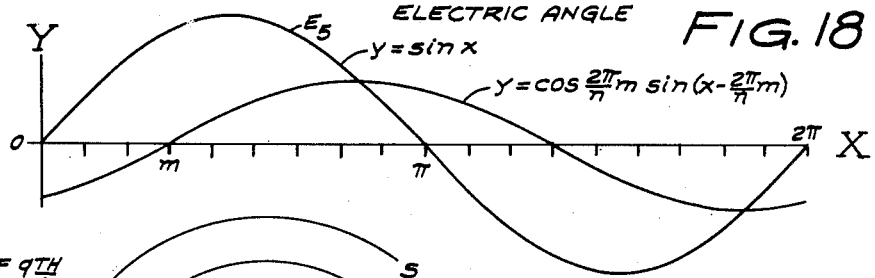
Figure 20:
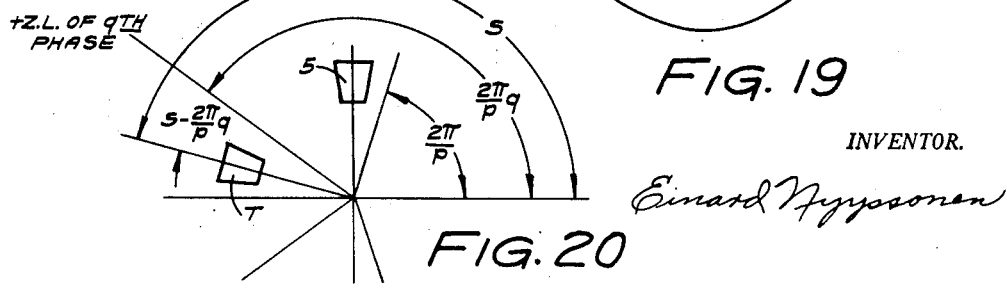
Figure 21:
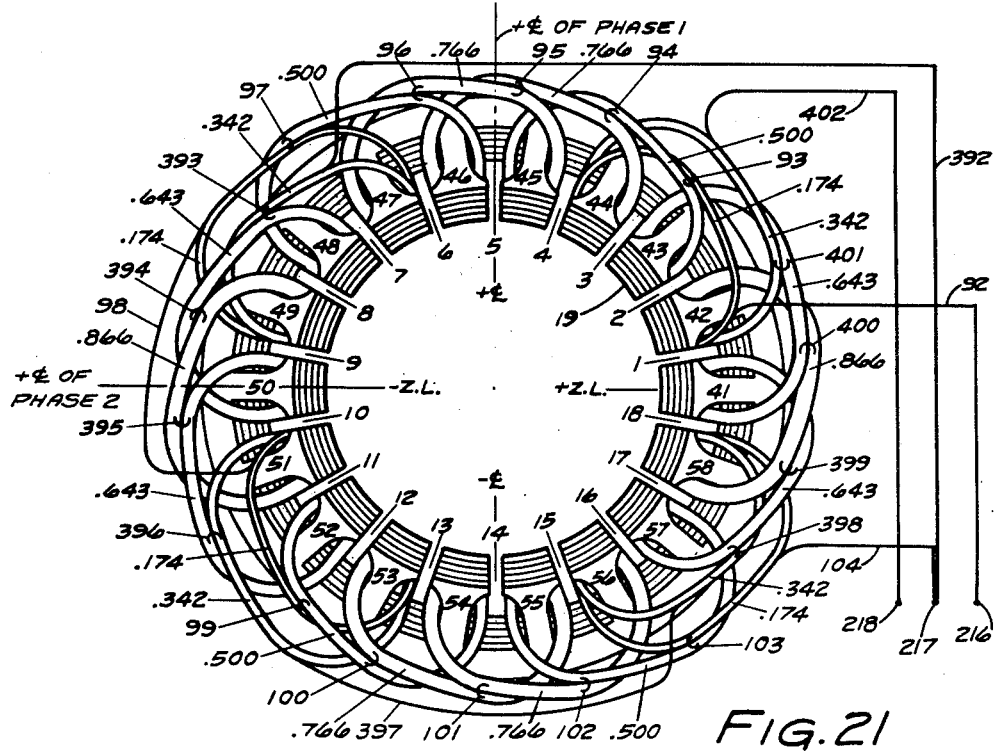
Figure 22:
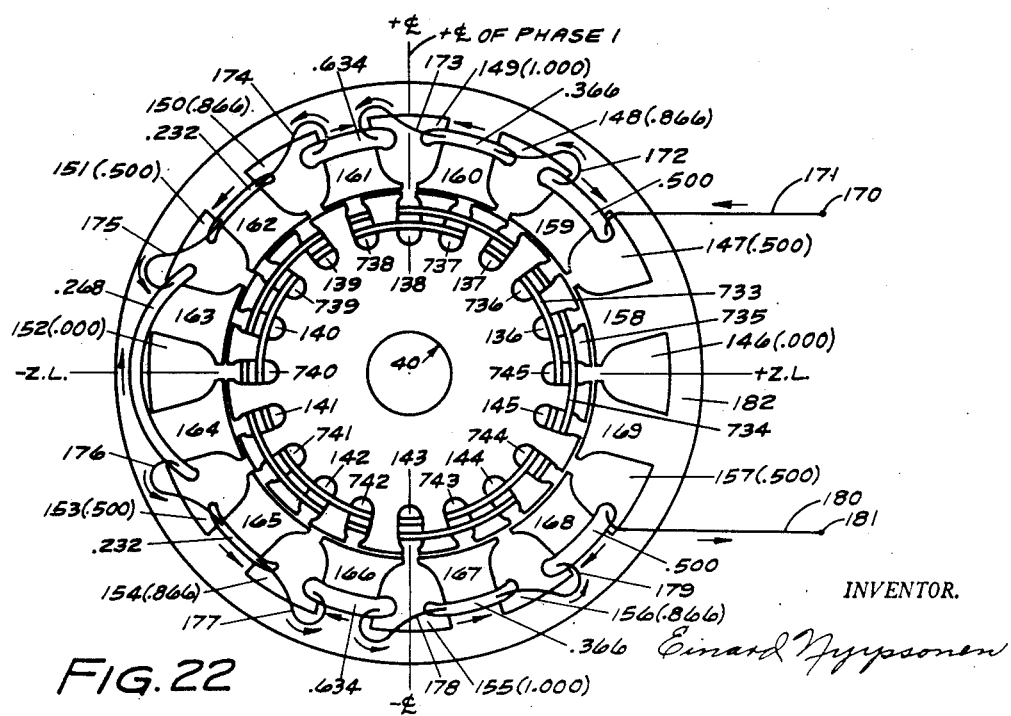
Figure 25:
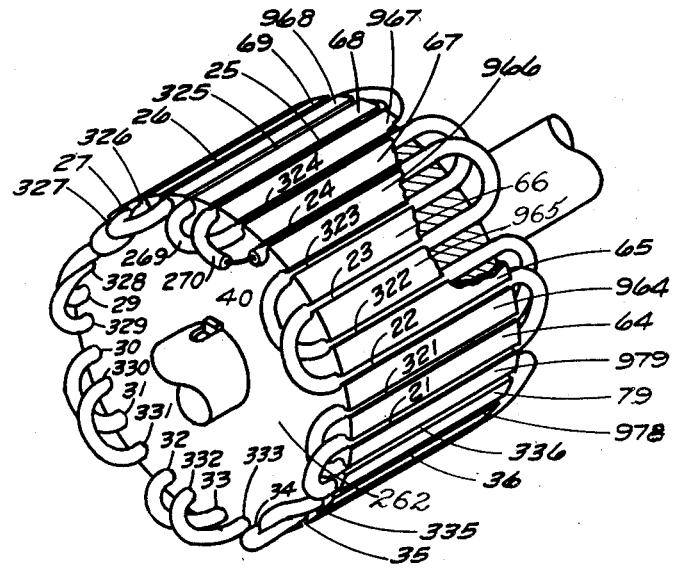
Figure 26:
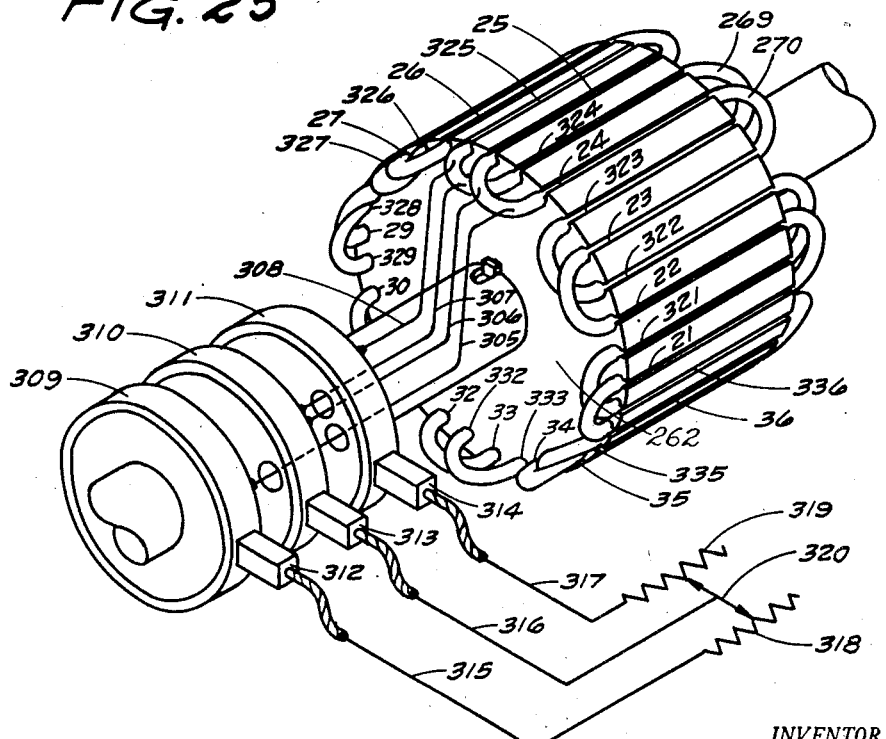
Figure 27:
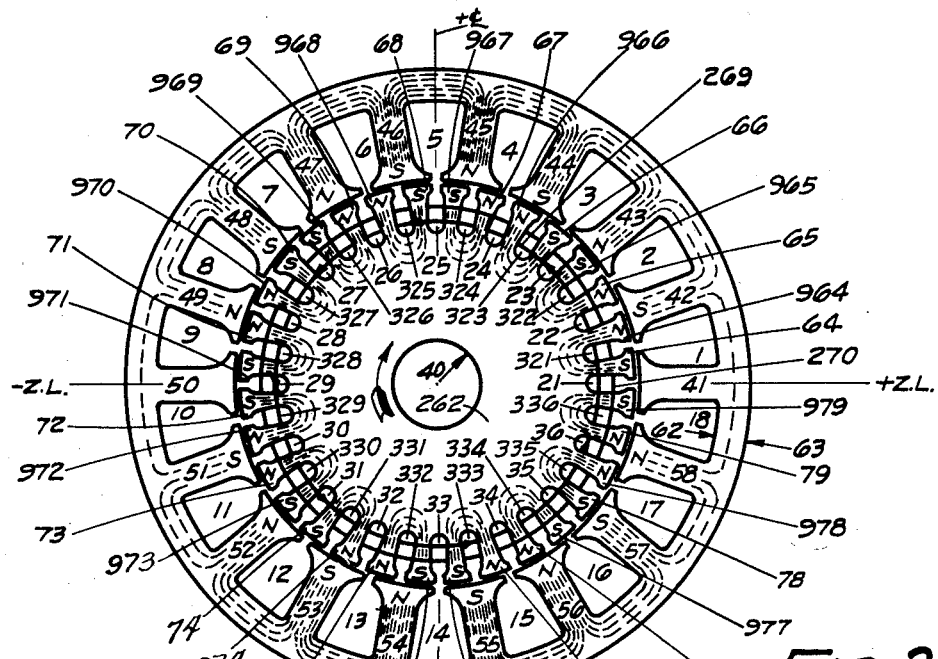
Figure 28:
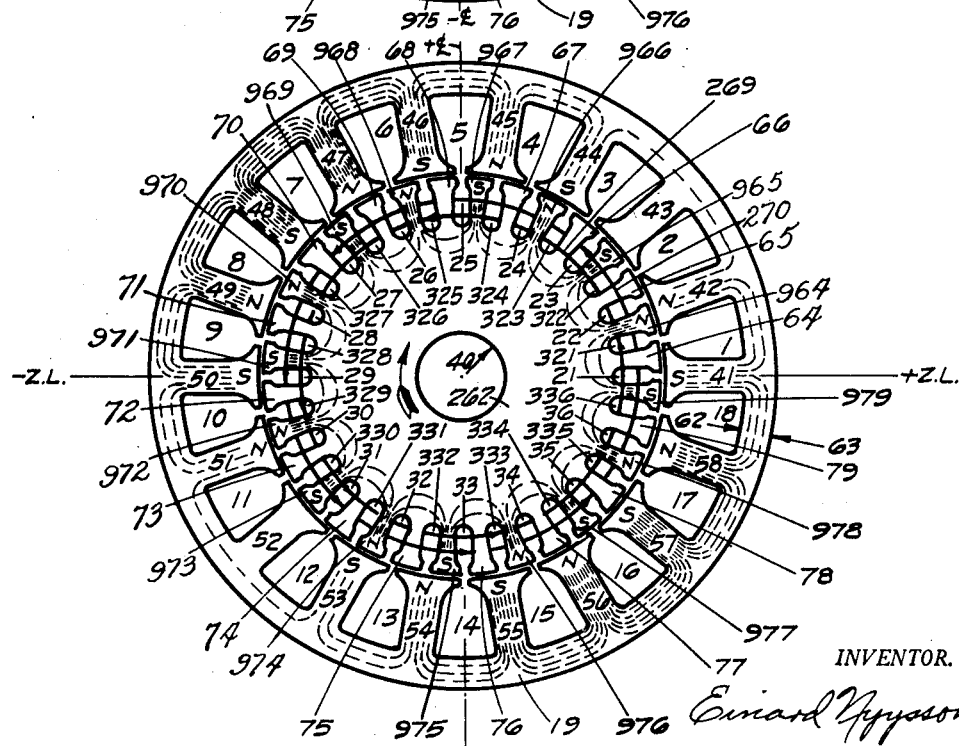
Figure 30:
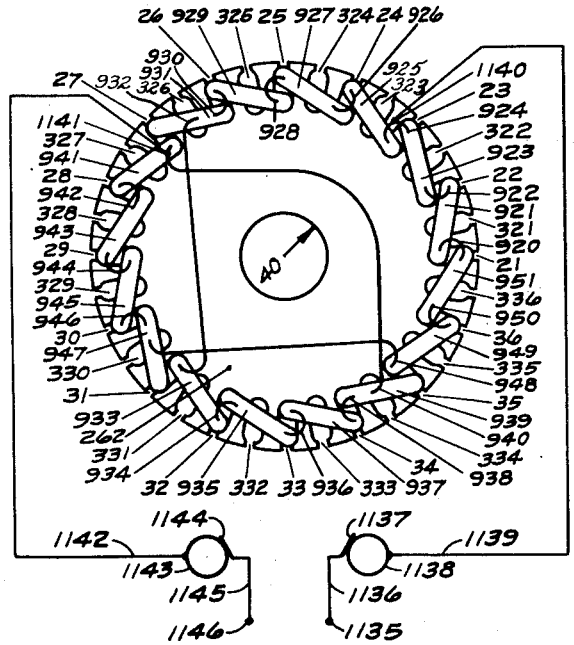
Figure 29:
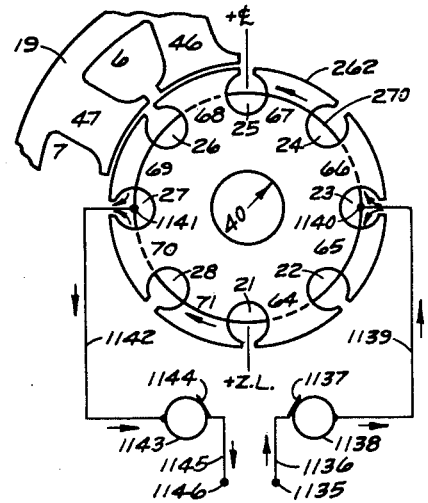
Figure 32:
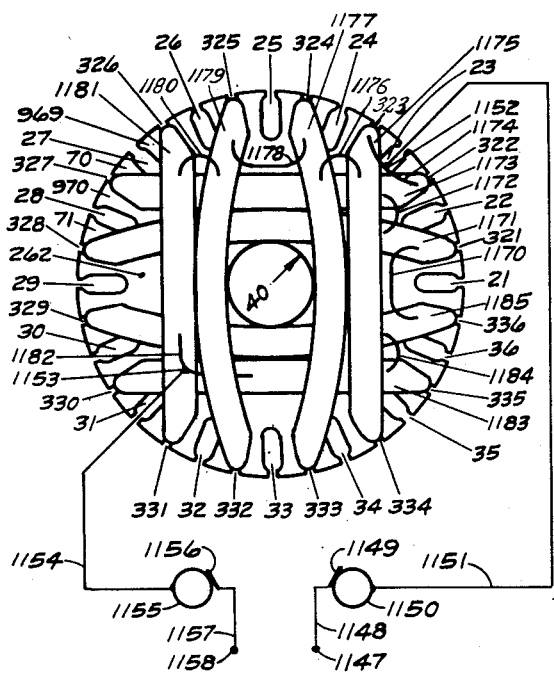
Figure 31:
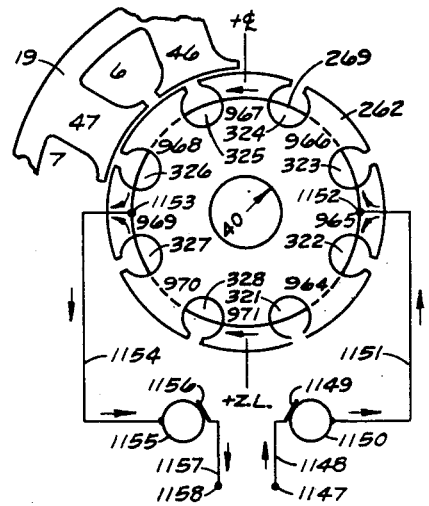
Figure 36:
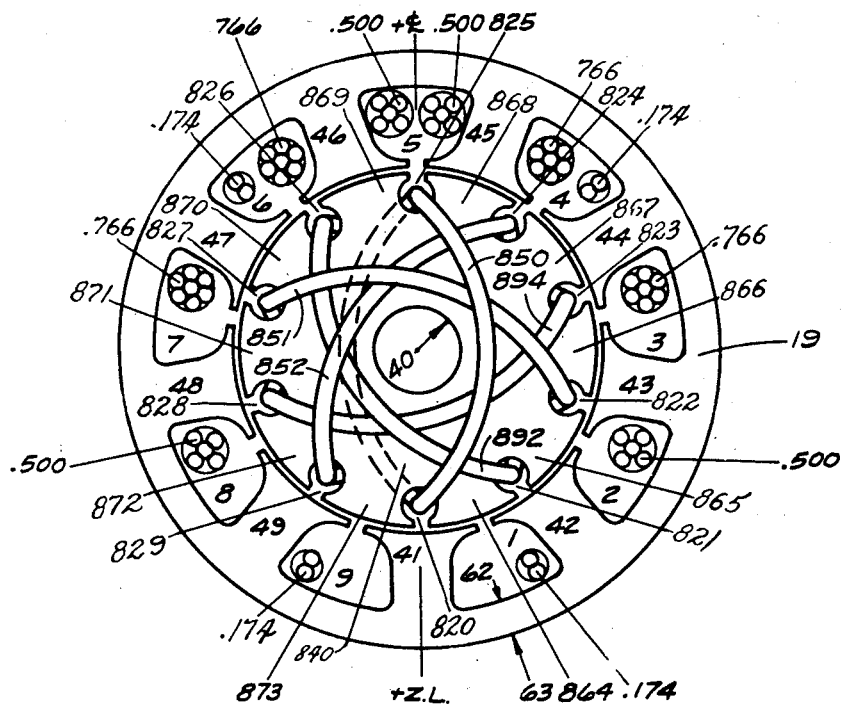
Figure 37:
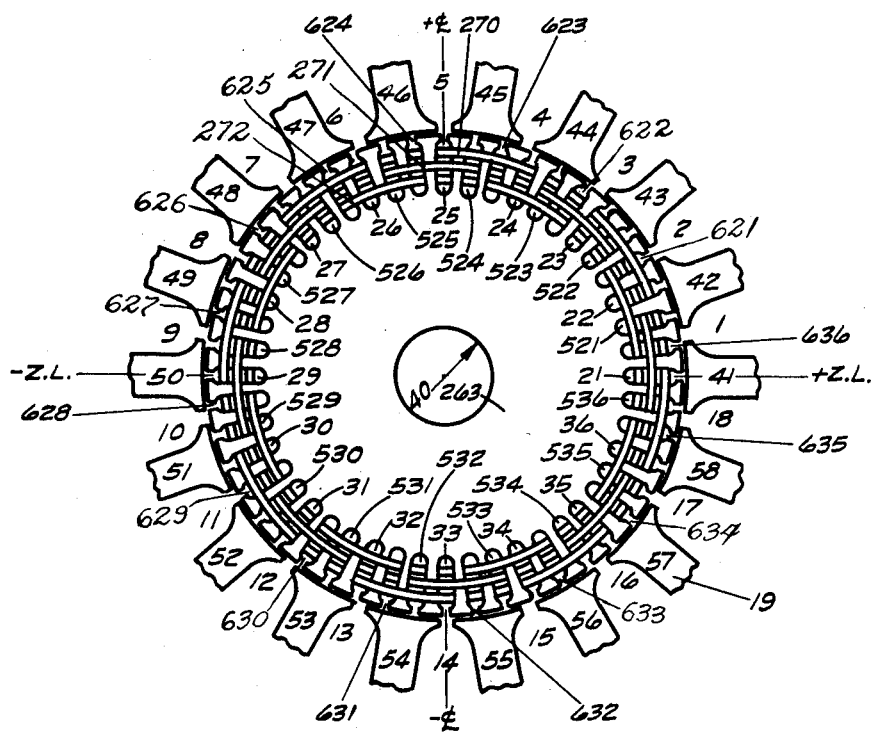

The invention will now be more fully explained in connection with the accompanying drawings, in which Fig. 1 is a schematic diagrammatic view of a three-phase induction generator or motor embodying the present invention, the primary element being shown provided with a distributed polyphase winding comprising three overlapped distributed conductor-group phase windings and the secondary element or rotor, being shown provided with a polyphase winding comprising two secondary phase windings; Fig. 2 is a fragmentary similar diagrammatic view illustrating a modified primary-element-core structure; Fig. 3 is a view similar to Fig. 1 of a modification, illustrating a nine-phase induction generator or motor, the primary element of which is shown provided with a polyphase winding comprising individual concentrated phase windings; Fig. 4 is a similar view of an eighteen-phase induction generator or motor; Fig. 5 is a view similar to Fig. 3, but with the primary element provided with the conductor groups of only one distributed phase winding, which may be considered as the phase 1 distributed phase winding of a polyphase winding similar to the polyphase winding illustrated in Fig. 1, and with only a single assembly of secondary-element rotor slots and a secondary-element rotor phase winding disposed therein, in order to conduce to simplicity of explanation, and illustrating also, by dot-and-dash lines, the paths of the magnetic fluxes; Fig. 6 is similarly a schematic view similar to Fig. 4; Fig. 7 is a view similar to Fig. 4, but illustrating a polyphase winding comprising modified individual concentrated phase windings; Fig. 8 is a view similar to Fig. 5, but illustrating a different assembly of rotor slots and a corresponding rotor phase winding disposed therein, and also illustrating the paths of the magnetic-flux distribution at a different instant of the electric cycle; Fig. 9 is a fragmentary, somewhat distorted, perspective illustrating the conductor groups of Fig. 6 connected into a distributed phase winding; Fig. 10 is a diagram, in Cartesian coordinates, illustrating, in their true polarity, the alternating magnetic fluxes, assumed to be sinusoidal, produced in the magnetic circuits encircling the primary-element slots by the polyphase current supplied to the polyphase primary-element winding; Fig. 11 is a fragmentary, somewhat distorted, perspective similar to Fig. 9, of a modification; Figs. 12 and 13 are diagrams illustrating delta and Y connections, respectively, for the three-phase induction machine illustrated in Fig. 1; Fig. 14 represents diagrammatically a development, in a plane, of the conductor groups of the distributed phase winding illustrated in Figs. 6 and 9, arranged in a setting to correspond to phase 1 of the three-phase induction generator or motor illustrated in Fig. 1, and showing also the geometric and phase relations with respect to phase 2 and phase 3; Figs. 15A and 15B represent a similar development for phase 2 of the same three-phase induction generator or motor, so arranged as to show the relations with respect to phases 1 and 3; Figs. 16A and 16B represent a diagrammatic development similar to Figs. 15A and 15B for phase 3, so arranged with respect to Figs. 14, 15A and 15B, as to show the phase relations between phases 1, 2 and 3, and with suitable conductors for connecting phase 3 to phases 1 and 2; Fig. 17 is a diagram, in Cartesian coordinates, illustrating the alternating voltages, assumed to be sinusoidal, induced in unit-conductor groups, each assumed to have a unit number of conductors, one disposed in each of the positive collection of stator slots illustrated in Figs. 1 to 9 and 11; Fig. 18 is a similar diagram explanatory of the component voltages induced in the conductor groups of the distributed phase winding corresponding to phase 1 shown in Figs. 5 and 6, when all the component voltages are assumed sinusoidal; Fig. 19 is a diagram illustrating, by means of curves, two sinusoidal voltage components; Fig. 20 is a diagram for facilitating the calculation of the magnetomotive forces; Fig. 21 is a diagrammatic view similar to Fig. 1 of the primary element of the two-phase induction machine embodying the present invention; Fig. 22 is a diagram of a modified induction machine embodying the present invention, but illustrating only one distributed primary-element phase winding; Fig. 23 is a diagrammatic view similar to Fig. 5 of an induction machine provided with a primary element having two identical single-collection assemblies of slots provided with identical distributed phase windings, shown in section, the rotor shown being provided with a squirrel-cage type winding; Fig. 24 is a diagrammatic view similar to Fig. 5, but with the single-collection assembly of primary-element slots distributed over twice the circumference, and with the rotor provided with a squirrel-cage winding similar to the squirrel-cage winding illustrated in Fig. 23; Fig. 25 is a perspective, partly broken away, of a two-phase rotor embodying the present invention; Fig. 26 is a similar perspective, illustrating operation as a varying-speed induction motor; Fig. 27 is a view similar to Fig. 6, but showing both secondary-element windings as in Fig. 4, illustrating the production of torque at a particular instant in the electric cycle, and showing by dashed lines the magnetic flux established in the stator by the polyphase current at the portion of the cycle represented in Figs. 5 and 6; Fig. 28 is a view similar to Fig. 27, but illustrating the production of torque at a later instant or portion of the electric cycle; Fig. 29 is a diagrammatic view similar to Fig. 5, but illustrating a modified rotor phase winding; Fig. 30 is a diagrammatic view of a modified phase 1 rotor phase winding with the connections illustrated schematically in Fig. 29; Fig. 31 is a diagrammatic view similar to Fig. 29, but illustrating schematically the corresponding connections to the phase 2 rotor phase winding; Fig. 32 is a diagrammatic view similar to Fig. 30, but illustrating schematically the corresponding connections to the phase 2 rotor phase winding; Fig. 33 is a perspective illustrating two circuits of a modified rotor phase winding connected to a common end plate; Fig. 34 is a diagrammatic view illustrating a rotor provided with two complete rotor phase windings each of circuits similar to the circuits shown in Fig. 33, but without employing the common end plate of Fig. 33; Fig. 35 is a perspective, with parts broken away, illustrating the squirrel-cage induction motor of the present invention diagrammatically illustrated in Fig. 23; Fig. 36 is a diagram similar to Fig. 5, but illustrating a rotor phase winding similar to the rotor phase windings shown in Fig. 34; and Fig. 37 is a diagrammatic view, similar to Figs. 1, 4, 6, 7 and 21, partly broken away, of an induction machine embodying the present invention, with a three-phase rotor.

The induction generator or motor of the present invention, like present-day induction generators or motors, embodies primary and secondary stator and rotor elements, each comprising a magnetizable laminated core. As diagrammatically illustrated in Fig. 1, for example, and for explanatory purposes, the primary element 19 may be taken as the stator and the secondary element 262 as the rotor. This arrangement may, of course, be reversed, with the primary element 19 as the rotor and the secondary element 262 as the stator.

For brevity, the description herein will be confined largely to the induction motor. The principles explained will be understood to be applicable also to the induction generator, however, for the induction generator is an induction motor driven at a speed higher than its synchronous speed.

As in present-day induction machines, the stator and the rotor are in all cases both shown annular in shape, with the rotor mounted for rotation, within the annulus of the stator, about a common center of the annuli of the stator and rotor. The outer circular periphery of the stator annulus is indicated by the arrow 63, and the inner circular periphery of the rotor is indicated by the arrow 40. The rotor shaft may be fixed within the inner circular periphery 40 of the rotor in any desired way.

In Figs. 1, 2, 4, 6, 7, 9, 11, 14, 21, 27, 28 and 37, the magnetizable core of the annular stator 19 is shown provided along its internal circular periphery with a plurality of equally spaced consecutively disposed teeth 41 to 58, of the same size and shape, alternately disposed with the stator slots 1 to 18, each shown eighteen in number. In Figs. 3, 5, 8 and 36, the stator 19 is shown provided with only nine stator teeth 41 to 49, alternately disposed with only nine stator slots 1 to 9. The nine-slot-and-tooth stator 19 of Figs. 3, 5, 8 and 36, therefore, corresponds to one-half of the eighteen-slot-and-tooth stator 19 of Figs. 1, 4, 6, 7, 9, 11, 14, 21, 27, 28 and 37. The peripheral portion 88 of the stator 19 is included between the outer circular periphery 63 and the outer boundaries 62 of the stator slots.

In practice, of course, the stator may be provided with any desired number of stator slots and stator teeth. In Fig. 22, for example, the stator 182 is shown provided with twelve stator slots 146 to 157 and twelve stator teeth 158 to 169.

The eighteen stator slots 1 to 18 of Figs. 1, 2, 4, 6, 7, 9, 11, 14, 21, 27, 28 and 37, will be referred to as an assembly of two similar collections, each of nine stator slots 1 to 9 and 10 to 18, respectively, and the eighteen stator teeth 41 to 58 as an assembly of two similar collections, each of nine stator teeth 41 to 49 and 50 to 58, respectively. The nine stator slots 1 to 9 will be referred to as a positive collection of stator slots, and the nine stator slots 10 to 18 as a corresponding negative collection of stator slots. The stator teeth 41 to 49 will similarly be referred to as the positive collection of stator teeth of the two-collection assembly of stator teeth 41 to 58, to distinguish it from the negative collection to stator teeth 50 to 58 of this assembly of stator teeth 41 to 58. The stator slots 5 and 14 will be referred to as the central stator slots of the respective positive and negative collections of stator slots 1 to 9 and 10 to 18.

The assembly of stator slots 1 to 9 and the assembly of stator teeth 41 to 49 of the stator 19 of Figs. 3, 5, 8 and 36, of course, is each constituted of only a single collection of nine stator slots and nine stator teeth, respectively.

As will appear hereinafter, the induction machine of the present invention is not restricted to use with a stator having an assembly of only one or two collections of stator slots and stator teeth. The assembly may comprise also three, four or any other convenient number of collections of stator slots and stator teeth.

Similarly to the slot-and-tooth arrangement of the stator 19, the magnetizable core of the rotor 262 is shown provided along its external circular periphery with alternately disposed equally spaced teeth and slots of the same size and shape.

A better understanding of the rotor may perhaps be obtained if reference be made first to the diagrammatic showing of Fig. 6. The rotor 262 is there illustrated as provided along its external circular periphery with an assembly of sixteen equally spaced rotor slots 21 to 36 of the same size and shape, two less than the eighteen stator slots 1 to 18, divided into two similar collections: one, the positive collection of rotor slots 21 to 28; and the other, the negative collection of rotor slots 29 to 36. The rotor 262 of Fig. 6 is shown provided also with an assembly of sixteen equally spaced rotor teeth 64 to 79 of the same size and shape, disposed alternately with the rotor slots of the assembly of rotor slots 21 to 36, also divided into two similar collections: one, the positive collection of rotor teeth 64 to 71; and the other the negative collection of rotor teeth 72 to 79. According to the embodiment of the invention illustrated in Fig. 5, the number of rotor slots in the single-collection assembly of rotor slots 21 to 28 and the number of rotor teeth in the single-collection assembly of rotor teeth 64 to 71 is similarly shown as eight, which is one less than nine, the number of stator teeth in each collection of stator teeth and the number of stator slots in each collection of stator slots.

The diagrammatic showing of Figs. 5 and 6 is not, however, complete. The rotor 262 of Fig. 5 is actually provided, along its outer circular periphery, not only with the single-collection assembly of eight rotor slots 21 to 28, alternately disposed with the teeth of the single-collection assembly of eight rotor teeth 64 to 71, but also with at least the further single-collection assembly of eight rotor slots 321 to 328, illustrated in Fig. 8, alternately disposed with the teeth of the further single-collection of eight rotor teeth 964 to 971. Similarly, in the two-collection assemblies of Figs. 1, 2, 4, 7, 25 to 28, 30 and 32, the rotor 262 of Fig. 6 is more completely shown provided, along its outer circular periphery, not only with the two-collection assembly of sixteen rotor slots 21 to 36, alternately disposed with the teeth of the two-collection assembly of sixteen rotor teeth 64 to 79, but also with the further two-collection assembly of sixteen rotor slots 321 to 336, alternately disposed with the teeth of the further two-collection assembly of sixteen rotor teeth 964 to 979.

The manner of cooperation of the rotor 262 with the stator 19 will be more fully explained presently. It will appear that the operation depends upon the rotor having one more or less slot or tooth in each collection of rotor slots or teeth and, therefore, one more or one less rotor induced magnetic pole, in each collection of rotor induced magnetic poles, than the stator is provided with slots or teeth in each collection of stator slots or teeth. If the number of stator teeth in each collection of stator teeth and the number of stator slots in each collection of stator slots be retained as nine, as illustrated in Figs. 1 to 9, 11, 14 to 16, 27, 28, 36 and 37, a rotor would serve equally well the number of rotor slots in each collection of rotor slots of which is ten rather than eight. The number of rotor teeth and rotor-induced magnetic poles in each collection of rotor teeth and rotor-induced magnetic poles, respectively, would, of course, also be ten, rather than eight. If, on the other hand, the number of rotor slots or teeth and rotor poles in each collection of rotor slots or teeth and rotor poles be retained as eight, as is illustrated in Figs. 1 to 9, 11, 14 to 16, 27, 28 and 37, a stator would serve equally well the number of stator teeth in each collection of stator teeth and the number of stator slots in each collection of stator slots of which is seven, rather than nine.

It has already been explained that the assembly of stator teeth and the assembly of stator slots may have less or more than two collections. The corresponding assembly of rotor teeth, rotor slots and rotor poles, of course, should have the same number of collections of rotor teeth, rotor slots and rotor poles, respectively.

As magnetic poles occur always physically in pairs, one pole positive and the other negative, the number of rotor poles of each assembly of rotor poles, and, therefore, the number of rotor teeth and slots of each assembly of rotor teeth and slots, repectively, must always be even.

The stator 19 of Fig. 4 is shown provided with a polyphase winding comprising eighteen phase windings 1d to 18d respectively wound through the stator slots 1 to 18, each about the corresponding peripheral portion 88 of the stator core 19 between its outer periphery 63 and the bottom 62 of the corresponding stator slot. The stator 19 of Fig. 3 is shown similarly provided with nine phase windings 1d to 9d wound in the stator slots 1 to 9, respectively. The phase windings 1d to 18d are illustrated as like phase windings, identical in all respects, each having two terminals, and all provided with the same number of conductors or turns. They may be referred to as individual concentrated phase windings, to distinguish them from the hereinafter more fully described distributed phase windings. For purposes of theory only, the stator phase windings 1d to 18d are shown wound in alternately opposite directions from stator slot to stator slot. In the practical machine, the same result would be obtained simply by reversing the connections to alternately disposed terminals of these phase windings 1d to 18d.

The terminals of the individual concentrated phase windings 1d to 9d of Fig. 3 and 1d to 18d of Fig. 4 may be connected to corresponding terminals of the respective phases of a polyphase source of voltage or a polyphase load, not shown, respectively of nine and eighteen alternating phases of equal amplitude that are substantially equally phase-displaced over a total range of phase displacement of $\pi$ or 180 degrees and $2\pi$ or 360 degrees, respectively. There are, of course, other ways of connecting the individual concentrated phase windings. For example, by reversing the direction of connection, the terminals of the phase windings 10d to 18d of Fig. 4 may be respectively connected to the terminals of the same phases as the phase windings 1d to 9d. With this latter method of connection, the number of collections, therefore the number of poles, of the induction machine illustrated by Figs. 3, 4 and 7 may be increased without increasing the number of its electric phases.

The phase displacement of adjacently disposed windings 1d to 18d, with the alternately opposite direction of winding or connection, therefore, is 20 electric degrees, and the displacement of diametrically oppositely disposed windings of Fig. 4 is $\pi$ or 180 electric degrees. The $\pi$ or 180 degree phase displacement arises from the progressive phase displacement of the windings 1d to 18d. Resulting from the alternately opposite direction of winding or of connection, the phase displacement of the currents supplied to adjacently disposed stator slots by the windings, on the other hand, is 20 plus 180 or 200 electric degrees, and the currents supplied to diametrically oppositely disposed stator slots are of the same phase. In the latter case, the $\pi$ or 180 degree phase difference of the diametrically oppositely disposed windings is cancelled by their opposite directions of winding.

The alternating current supplied to each of the stator slots 1 to 18 by the respective phase windings 1d to 18d, being of alternately opposite polarity and phase-displaced 20 electric degrees from stator slot to stator slot, produces alternating magnetic fluxes in the stator core 19, similarly phase-displaced, that are confined to substantially independent magnetic circuits which respectively encircle the stator slots 1 to 18. An assembly of magnetic circuits is thus produced that is stationary with respect to the stator element 19. These magnetic circuits are represented diagrammatically in Figs. 3, 4 and 7 by means of single dashed lines. In Figs. 5 and 6, the magnetic flux of these magnetic circuits is illustrated by nested dashed lines for the instant that the magnetic flux of the magnetic circuit encircling the stator slot 5 is at its maximum value, and, in Fig. 8, for the instant that this same magnetic flux is at its minimum or zero value. A magnetic system of eighteen magnetic circuits is thus provided, respectively encircling the stator slots 1 to 18.

The magnetic energy or magnetic flux, of either the single-collection assembly of Figs. 3, 5, 8 and 36 or the two-collection assembly of Figs. 1, 2, 4, 6, 7, 9, 11, 14 to 16, 21, 27, 28 and 37, will be referred to herein as a magnetic pattern. It represents the aggregate of an assembly of one or more collections of individual alternating magnetic fluxes, each collection being associated with a total range of phase displacement, disregarding the alternately opposite polarity, of substantially $\pi$ or 180 magnetic degrees. The magnetic pattern appears uniformly to rotate in the direction of the phase sequence of the alternating magnetic fluxes. The rotation, however, is apparent only, and not real. The invention does not depend for its operation upon a rotating magnetic field.

According to the modification of the invention illustrated by Fig. 2, the magnetic circuits encircling the stator slots 1 to 18, instead of being provided in an integral core 19, are respectively confined to separate laminated core sections five of which, respectively encircling the stator slots 3 to 7, are respectively shown at 1103 to 1107, held in an integral assembly by means of bolts, rivets or the like 1253 to 1256. These core sections 1103 to 1107 are shown separated by radial air gaps centrally through the respective stator teeth 44 to 47. Whether or not the air gaps are employed, the respective magnetic circuits are substantially complete in themselves, and independent of one another.

Magnetomotive forces and corresponding magnetic fluxes having a similar total range of phase displacement may be obtained with any like windings, equal in number to the number of magnetic circuits, equiangularly spaced throughout the periphery. For example, in Fig. 7, the like phase windings 1d to 18d are each shown disposed, not in a separate stator slot, as illustrated in Figs. 3 and 4, but in two adjacently disposed stator slots, thereby encircling the stator tooth disposed between these adjacently disposed stator slots. The stator phase winding 1d, for example, is disposed in the stator slots 1 and 2, thereby encircling the stator tooth 42, and the stator phase winding 2d is similarly disposed in the stator slots 2 and 3, thereby encircling the stator tooth 43. Two adjacently disposed stator phase windings are therefore disposed in each stator slot.

For the purpose of comparing, in other respects, the relative merits of disposing each of the stator phase windings 1d to 18d in a separate slot, as illustrated by Fig. 4, and two adjacently disposed stator slots, as illustrated by Fig. 7, it will be assumed that the same number of conductors is disposed in each stator slot in each of these arrangements. Assuming that the phase windings 1d to 18d are all alike, therefore, they will each have half as many turns in the arrangement of Fig. 7 as in that of Fig. 4. For diagrammatic purposes, each of the stator phase windings is shown in Fig. 7 composed of two turns, thereby providing four conductors in each stator slot.

The magnetomotive forces produced in the stator slots 1 to 18 of Fig. 7 are exactly the same as the magnetomotive forces produced in the stator slots 1 to 18 of Fig. 4, though half the magnetomotive force produced in each stator slot of Fig. 7 is provided by each of the two phase windings disposed therein. Since the two magnetomotive-force contributions to each stator slot are displaced 20 degrees, the magnetomotive forces produced in the stator slots 1 to 18 of Fig. 7 are displaced 10 degrees and they are smaller, although by a very small amount, than the magnetomotive forces produced in the stator slots 1 to 18 of Fig. 4. From a practical viewpoint, either arrangement provides magnetomotive forces of substantially the same peak amplitude, and these magnetomotive forces are equally phase displaced over a total range equal to $2\pi$ or 360 electric degrees. Similar remarks apply to the alternating magnetic fluxes produced in the magnetic circuits encircling the stator slots 1 to 18 by these magnetomotive forces.

Relative sinusoidal values of the alternating magnetic energy or fluxes encircling the stator slots 1 to 18 will be plotted in Cartesian coordinates. The relative unity or 1.000 peak value of the sine function may represent the peak value attained by each of these alternating magnetic fluxes.

The alternating magnetic fluxes, assumed to vary sinusoidally, of the magnetic circuits encircling the stator slots of the positive collection of stator slots 1 to 9 of Figs. 1, 2, 4, 6, 7, 9, 11, 14 to 16, 21, 27, 28 and 37, or the single collection of stator slots 1 to 9 of Figs. 3, 5, 8 and 36, are represented in Fig. 10, in their true polarity, by the curves $\phi_1$ to $\phi_9$. The origin of coordinates is so chosen, in Fig. 10, that, at a particular instant of time, representing the zero-degree magnetic angle, the positive relative peak amplitude, assumed unity or 1.000, of the curve $\phi_5$, representing the alternating magnetic flux of the magnetic circuit encircling the centrally disposed stator slot 5, lies on the axis of ordinates. The alternating magnetic fluxes of the magnetic circuits encircling diametrically opposed stator slots, representing the negative collection of stator slots of the two-collection assembly of Figs. 1, 2, 4, 6, 7, 9, 11, 14 to 16, 21, 27, 28 and 37, are duplicates. The magnetic flux of the magnetic circuit encircling the stator slot 10, as an illustration, is precisely the same as the magnetic flux of the magnetic circuit encircling the stator slot 1, and it is represented by the same curve $\phi_1$.

To excite the induction machine of the present invention from a polyphase electric system of two, three, or any other desired number of phases, the primary element 19 may be provided with a distributed polyphase winding comprising a number of distributed phase windings equal to the number of phases. Each of the distributed phase windings of this polyphase winding comprises a number of conductor groups equal to the number of magnetic circuits or stator slots, one of the conductor groups of each such distributed phase winding being disposed in each magnetic circuit or stator slot. Each magnetic circuit therefore encircles a conductor group of each of the distributed phase windings. This description is general, to include cases where particular conductor groups may have zero conductors or turns.

Unlike the multiphase windings $1d$ to $18d$, the conductor groups of the distributed phase windings are not shown identical. They have different numbers of conductors or turns, varying progressively from stator slot to stator slot. The fact that the number of conductors or turns comprising the conductor groups disposed in the stator slots varies from stator slot to stator slot is diagrammatically indicated in the drawings in various ways. It is indicated by numbers, not greater than unity or 1.000; also by showing the conductor groups or windings as of different thickness; and further by showing the conductor groups or windings disposed in some of the stator slots, either in section or otherwise, as containing more conductors or turns than other conductor groups or windings disposed in other stator slots.

The numbers of conductors of the conductor groups of the phase 1 distributed phase winding are shown varying substantially as the absolute or positive values of the sine function over an angular range equal to $\pi$ or 180 degrees times the number of collections of stator slots. The numbers of conductors of the conductor groups of the other distributed phase windings are shown varying in a similar manner, but the respective angular ranges of the said sine function are displaced by angular amounts substantially equal to the phase displacement of the respective phase windings. Improved performance may, however, be obtained even though the conductors of the conductor groups are not distributed strictly according to the sine function. The distribution may, for example, be in accordance with substantially the absolute or positive values of other alternating functions the values of which, like the values of the sine function, progressively: first, increase from zero to a maximum in the interval zero to $\pi/2$ or 90 degrees; then, decrease, through zero to a minimum in the interval $\pi/2$ or 90 degrees to $3\pi/2$ or 270 degrees; and, finally, increase again to zero in the interval $3\pi/2$ or 270 degrees to $2\pi$ or 360 degrees.

In the two-collection assembly of Figs. 1, 6, 9, 11, 14 and 21, the points on the circumference where the numbers of conductors of the conductor groups of the phase 1 distributed phase winding are theoretically proportional to the values of the sine of 0, $\pi/2$ or 90, $\pi$ or 180, and $3\pi/2$ or 270 degrees are indicated by the radial reference lines +Z.L., + ₵, −Z.L. and − ₵, respectively. These radial reference lines will be referred to respectively as the positive reference zero line, the positive reference center line, the negative reference zero line and the negative reference center line. The reference zero lines +Z.L. and −Z.L. are respectively disposed midway between the stator slots 18 and 1 and 9 and 10, and the reference center lines +₵ and − ₵ are alined radially with respective central stator slots 5 and 14.

In the single-collection assembly of Figs. 5, 8 and 36, the number of conductors of the conductor groups of the phase 1 distributed phase winding are shown varying throughout the circumference substantially as the absolute or positive values of the sine function over the angular range 0 to $\pi$ or 180 degrees, rather than 0 to $2\pi$ or 360 degrees, and the points on the circumference where the numbers of conductors of the conductor groups are theoretically proportional to the sine of 0 and $\pi/2$ or 90 degrees are respectively indicated by the positive reference zero line +Z.L. and the positive reference center line + ₵. The positive reference zero and center lines +Z.L. and + ₵, respectively, have the same significance in Figs. 5, 8 and 36 as in Figs. 1, 6, 9, 11, 14 and 21.

With this selection of reference lines, the numbers of conductors of the phase 1 distributed phase winding disposed in the positive collection of stator slots 1 to 9 of Figs. 1, 5, 6, 8, 9, 11, 14 and 21 and the negative collection of stator slots 10 to 18 of Figs. 1, 6, 9, 14 and 21 are respectively proportional to 0.174, 0.500, 0.766, 0.940, 1.000, 0.940, 0.766, 0.500 and 0.174, the absolute or positive values of the sine of the respective progressively increasing angles 10, 30, 50, 70, 90, 110, 130, 150 and 170 degrees, corresponding to the positive collection, and 190, 210, 230, 250, 270, 290, 310, 330 and 350 degrees, corresponding to the negative collection. In the two-collection assembly of Figs. 1, 6, 9, 11, 14 and 21, these angles are equal to the angles subtended by the respective stator slots 1 to 18 at the center of the circle, measured counterclockwise from the positive reference zero line +Z.L. They may therefore be referred to as slot angles. The slot angle of the stator slot 2 of Fig. 6, for example, is marked "S."

More generally, the conductors of the phase 1 distributed phase winding are proportional to the sine of phase-sequence angles measured with respect to a reference phase which corresponds to the positive reference zero line +Z.L. in Figs. 1, 5, 6, 8, 9, 11, 14 and 21, disregarding the alternately opposite polarity, this reference phase is the phase midway between the phases of the alternating magnetic fluxes of the magnetic circuits encircling the stator slots 18 and 1. It may be termed a positive reference phase, and it may be associated with a phase-sequence angle of zero degrees. The alternating magnetic fluxes of the magnetic circuits encircling the stator slots 1 to 18 being respectively 10, 30, 50, 70, 90, 110, 130, 150, 170, 190, 210, 230, 250, 270, 290, 310, 330 and 350 magnetic degrees behind the positive reference phase, the magnetic circuits and the stator slots 1 to 18 which they respectively encircle may be associated with phase-sequence angles which are respectively the same as their previously-described geometric-sequence or slot angles. The phase-sequence angles are not the same, however, in an assembly the number of collections of stator slots of which is different from two. In the single-collection assembly of Figs. 5, 8 and 36, for example, the geometric-sequence or slot angles are equal to twice the corresponding phase-sequence angles.

From considerations of theory, the range of the phase-sequence angles of any practical collection of stator slots, represented, in Figs. 1, 5, 6, 8, 9, 11, 14 to 16 and 21, by the 160 degrees of the collection of nine stator slots 1 to 9 or 10 to 18, will be regarded as embracing substantially the theoretical range zero to $\pi$ or 180 degrees; and the range of the phase-sequence angles of any practical two-collection assembly of stator slots, represented by the 340 degrees of the two-collection assembly of eighteen stator slots 1 to 18, will similarly be regarded as embracing substantially the theoretical range zero to $2\pi$ or 360 degrees.

In Figs. 1, 9, 11, 14 to 16 and 21, the conductor groups are shown provided by coils or windings disposed in the various stator slots 1 to 18. The coils or windings of the phase 1 distributed phase winding of Figs. 1, 9, 14 and 21 are shown in section in Fig. 6; and Fig. 5 illustrates the corresponding single-collection arrangement. The coils or windings, like the conductor groups previously described, are indicated by decimal fractions which also indicate the relative numbers of turns of these coils or windings. As each conductor group may thus be constituted of more than one coil or winding, the relative number of conductors of a conductor group is necessarily the sum of the relative numbers of turns of the coils or windings of which that conductor group is constituted.

In Figs. 1, 6, 9, 11, 14 to 16 and 21, the conductor groups of the phase 1 distributed winding disposed in the central stator slots 5 and 14 are shown each provided with the maximum relative number of conductors, represented as $0.500+0.500=1.000$ or unity. They are indicated in Fig. 6 as provided with ten conductors. A similar showing appears in the central stator slot 5 of Figs. 5, 8 and 36. The conductor groups of the phase 1 distributed phase winding disposed in the stator slots 4, 6, 13 and 15 are similarly shown each provided with $7+2=9$ conductors, to represent approximately the relative number $0.766+0.174=0.940$. Though the ratio of 10 to 9 is somewhat less than the ratio of 1.000 to 0.940, the approximate diagrammatic showing of ten conductors to represent the 1.000 conductor group and of nine conductors to represent the 0.940 conductor group serves well enough for illustrative purposes.

The conductor groups of the phase 1 distributed phase winding disposed in the stator slots 3, 7, 12 and 16 are similarly indicated as provided with seven conductors to represent approximately the value 0.766, the conductor groups of the phase 1 distributed phase winding disposed in the stator slots 2, 8, 11 and 17 with five conductors to represent the value 0.500, and the conductor groups of the phase 1 distributed phase winding disposed in the the stator slots 1, 9, 10 and 18 with two conductors to represent approximately the value 0.174. The ratios 7:5:2 are sufficiently near to the ratios 0.766:0.500:0.174 to serve well enough for illustrative purposes.

To provide substantially equal phase displacement of the three distributed phase windings of Figs. 1, 5, 6, 8, 9, 11, 14 to 16 and 36, the total angular ranges corresponding to the phase 2 and phase 3 distributed phase windings are respectively displaced with respect to the total angular range corresponding to the phase 1 distributed phase winding substantially $2\pi/3$ or 120 degrees and $4\pi/3$ or 240 degrees in the direction of the phase sequence. In Fig. 21, on the other hand, the total angular range corresponding to the phase 2 distributed phase winding is displaced $\pi/2$ or 90 degrees in the direction of the phase sequence to provide a two-phase arrangement. In both cases, and in all similar such cases, the angular displacement with respect to one another of the total angular ranges corresponding to the respective phase windings is an angular amount substantially equal to the phase displacement of the respective phase windings of the polyphase winding.

Accordingly, to the 0 to $2\pi$ or 360 degree total angular range corresponding to the phase 1 distributed phase winding, there corresponds, in Figs. 1, 6, 9, 11 and 14 to 16, the total angular ranges (0–120) to ($2\pi$ or 360–120) degrees and (0–240) to ($2\pi$ or 360–240) degrees for the phase 2 and phase 3 distributed phase windings, respectively, and, in Fig. 21, the total angular range (0–90) to ($2\pi$ or 360–90) degrees for the phase 2 distributed phase winding. Corresponding considerations apply to distributed phase windings of single-collection arrangements.

The conductor groups of the phase 2 and phase 3 distributed phase windings of Figs. 1, 5, 6, 8, 9, 11, 14 to 16 and 36, similarly distributed over their respective total angular ranges, are duplicates of the conductor groups of the phase 1 distributed phase winding, but respectively displaced counterclockwise $2\pi/3$ or 120 and $4\pi/3$ or 240 degrees, respectively. They are duplicates, however, only because the particular number 18 of magnetic circuits or stator slots is divisible by three, the particular number of distributed phase windings.

In Fig. 21, wherein the displacement of the total angular ranges is only $\pi/2$ or 90 degrees, because, in this case the number 18 of stator slots or magnetic circuits is not divisible by four, the conductor groups of the phase 2 distributed phase winding are different, although arrived at in exactly the same manner. In Fig. 21, the decimal fractions $0.643+0.342$ or 0.985, 0.866, 0.643, 0.342, 0.000, 0.342, 0.643, 0.866 and $0.643+0.342$ or 0.985, respectively indicating the numbers of conductors of the conductor groups of the phase 2 distributed phase winding disposed in the stator slots 1 to 9 and 10 to 18, of Fig. 21, are respectively the absolute or positive numerical values of the sine of 280, 300, 320, 340, 360, 20, 40, 60 and 80 degrees and 100, 120, 140, 160, 180, 200, 220, 240 and 260 degrees, the geometric-sequence or phase-sequence angles associated with the respective stator slots decreased by $\pi/2$ or 90 degrees, the displacement of the respective total angular ranges.

A conductor group of each phase winding is thus disposed in each stator slot. In Fig. 21, the stator slots 5 and 14, representing a limiting case, are shown unprovided with conductor groups corresponding to the phase 2 distributed winding. This, however, is only an apparent, and not a real, exception to the rule. It would occur in all such cases where the angle corresponding to that conductor group is equal to zero or a multiple of $\pi$ or 180 degrees. As required by the sine law, such a conductor group would have zero conductors, and would be indicated as 0.000. With this explanation, and including this limiting case, it may be said that each phase winding has a number of conductor groups substantially equal to the number of stator slots in the assembly of stator slots, that a conductor group of each phase winding is disposed substantially in each stator slot and in the magnetic circuit encircling such stator slot, and that the number of conductors of the conductor groups of each distributed phase winding varies substantially as the absolute values of the sine over a total range substantially equal to $\pi$ or 180 degrees multiplied by the number of collections of magnetic circuits or stator slots, at angular increments each substantially equal to the total range divided by the number of magnetic circuits or stator slots.

In the induction machine of the present invention, the element of non-uniformity, arising out of the fact that the numbers of conductors of the conductor groups of any particular distributed phase winding varies from stator slot to stator slot, tends to become compensated for when the induction machine is provided with a polyphase winding comprising a plurality of such distributed phase windings, the respective total ranges of which are displaced with respect to one another, as before explained, an angular amount substantially equal to the phase displacement of the phase windings.

The direction of winding of the conductors of the conductor groups of each distributed phase winding changes alternately with, and with the negative of, the sign of the alternating function that determines the numbers of conductors of the respective groups. For uniformity, and in accordance with this method of winding, the direction of winding is shown herein changing with the sign of the sine in the odd-numbered stator slots and with the negative of the sine in the even-numbered stator slots.

The conductor groups of each distributed phase winding are connected in series along the above-described directions of winding into the respective phase-winding circuits. Although the conductor groups of each distributed phase winding may be connected in series in any desired sequence, for uniformity and simplicity, they are shown herein connected into the respective phase-winding circuits in the order of their geometric or phase sequence. The directions of winding will be readily understood following a discussion of the respective phase-winding circuits.

As illustrated in Fig. 9, a continuous or endless coil or winding, marked 0.174, is shown looped in the stator slots 1 and 4, so as to enclose the stator teeth 42, 43 and 44. This 0.174 coil or winding is shown in Fig. 9 as the least thick of the coils or windings and, in Figs. 5 and 6, by a cross-sectional showing representing it as composed of only two conductors.

A similar continuous winding, marked 0.500, is shown looped in the stator slots 2 and 5, so as to enclose the stator teeth 43, 44 and 45. The fact that it is composed of a larger number of conductors than the 0.174 winding is indicated in Fig. 9 by a showing of increased thickness and, in Figs. 5 and 6, by a cross-sectional showing representing it as composed of five conductors.

Another similar continuous winding, marked 0.766, is shown looped in the stator slots 3 and 6, so as to enclose the stator teeth 44, 45 and 46. This coil or winding is indicated in Fig. 9 by a still thicker showing and, in Figs. 5 and 6, by showing it, in section, as composed of seven conductors.

A 0.174 winding is shown looped also in the stator slots 6 and 9, so as to enclose the stator teeth 47, 48 and 49. This winding is similar, in all respects, to the 0.174 winding looped in the stator slots 1 and 4, enclosing the stator teeth 42, 43 and 44. Corresponding similarly to the 0.500 winding looped in the stator slots 2 and 5, there is shown also a 0.500 winding looped in the stator slots 5 and 8, so as to enclose the stator teeth 46, 47 and 48. Corresponding to the 0.766 winding looped in the stator slots 3 and 6, there is shown also a similar 0.766 winding looped in the stator slots 4 and 7, so as to enclose the stator teeth 45, 46 and 47.

The relative number of conductors in the conductor groups disposed in the stator slots 1 and 9 becomes thus represented by the number 0.174. The relative number of conductors in the conductor groups disposed in the stator slots 2 and 8 becomes represented by the number 0.500. The relative number of conductors in the conductor groups disposed in the stator slots 3 and 7 becomes similarly represented by the number 0.766, that in the conductor groups disposed in the stator slots 4 and 6 by the number 0.766+0.174 or 0.940, and that in the conductor groups disposed in the stator slot 5 becomes represented by the number 0.500+0.500 or unity. As before stated, this represents the maximum relative number of conductors.

In accordance with this arrangement, therefore, the various windings add their contributions to yield the correct number of conductors in the conductor groups disposed in the stator slots 1 to 9, so as to effect the desired variation according to the sine law.

The coils or windings of the phase 1 distributed winding disposed in the stator slots 10 to 18 are respectively exact duplicates of the coils or windings already described as disposed in the stator slots 1 to 9.

It is convenient to distinguish between the relative number of turns or conductors per coil or winding and the relative number of conductors per stator slot. Reference has been made above to the 0.174, 0.500 and 0.766 coils or windings. These values represent still further, however, the relative number of conductors in each of the stator slots 1, 2 and 3, respectively; and also in the stator slots 9, 8 and 7, the stator slots 10, 11 and 12, and the stator slots 18, 17 and 16, respectively. The relative number of conductors in each of the stator slots 4, 6, 13 and 15, however, is 0.174+0.766, or 0.940; and the relative number of conductors in the stator slots 5 and 14 is 0.500+0.500, or 1.000.

The important consideration, of course, is, not the relative number of turns per coil or winding, but, rather, the relative number of conductors per stator slot. In the description above, it was through the expedient of choosing properly the relative number of turns per coil or winding, and properly looping them in the proper stator slots, that the proper relative number of conductors per slot was arrived at.

That, however, constituted only one expedient for arriving at the desired result. A further example, as another illustration only, is afforded by Fig. 11. In this Fig. 11, the relative number of turns per coil of the phase 1 sinusoidally distributed phase winding is represented by the 0.174, 0.326, 0.440, 0.500, 0.500, 0.440, 0.326 and 0.174 windings. A 0.174 winding is shown disposed in the stator slots 1 and 2, so as to enclose the stator tooth 42; a 0.326 winding in the stator slots 2 and 3, so as to enclose the stator tooth 43; a 0.440 winding in the stator slots 3 and 4, so as to enclose the stator tooth 44; and a 0.500 winding in the stator slots 4 and 5, so as to enclose the stator tooth 45. A 0.174 winding is disposed also in the stator slots 8 and 9, so as to enclose the stator tooth 49; a 0.326 winding in the stator slots 7 and 8, so as to enclose the stator tooth 48; a 0.440 winding in the stator slots 6 and 7, so as to enclose the stator tooth 47; and a 0.500 winding in the stator slots 5 and 6, so as to enclose the stator tooth 46. These windings of the stator slots 1 to 9 are duplicated in the slots 10 to 18, though not shown in Fig. 11.

The relative number of conductors in the stator slots 1 and 9, therefore, is 0.174; the relative number of conductors in the stator slots 2 and 8 is 0.174+0.326, or 0.500; the relative number of conductors in the stator slots 3 and 7 is 0.326+0.440, or 0.766; the relative number of conductors in the stator slots 4 and 6 is 0.440+0.500, or 0.940; and the relative number of conductors in the stator slot 5 is 0.500+0.500, or 1.000.

The same relative numbers of conductors per slot, 0.174, 0.500, 0.766, 0.940 and 1.000, is thus arrived at with the employment of the relative number of turns per winding or coil shown in Fig. 11 that was obtained with the relative number of turns per winding or coil illustrated in Figs. 1, 5, 6, 8, 9, 21, 36 and phase 1 of Fig. 14 merely by a different disposition of the coils or windings in the various stator slots.

In the arrangement of Fig. 11, as in that of Figs. 1, 5, 6, 8, 9, 21, 36 and phase 1 of Fig. 14, moreover, the coils or windings are shown endless or continuous. It will be obvious, however, that the desired relative number of conductors per slot may be arrived at by other types of windings also. The above examples do not, of course, exhaust the methods of distributing the conductor groups in the various stator slots.

It having now been explained how to distribute the conductors of a phase winding so that the number of conductors in the conductor groups thereof shall vary according to the desired sine function, it is next in order to explain how to connect these conductor groups along the said directions of winding into the distributed primary-element phase winding, specifically illustrated as a stator phase winding. This may be effected in many ways. One series connection, as an example, will now be described in connection with Fig. 9. In Fig. 9, arrows are drawn to indicate the dierction of winding both through the stator slots and through the intermediate conductors. These same arrows may be considered hereinafter to indicate also the direction of the current supplied to the distributed primary-element phase winding at the instant when that current is at its positive peak amplitude.

The series circuit of the phase 1 distributed primary-element phase winding is diagrammatically shown, in Fig. 9, extending from a line terminal 116, by way of a line conductor 92, through the 0.174 coil or winding disposed in the stator slots 1 and 4, and by way of a conductor 93, to one end of the 0.500 winding disposed in the stator slots 5 and 2. The series distributed phase winding continues through this 0.500 winding, by way of a conductor 94, through the 0.766 winding disposed in the stator slots 3 and 6, by way of a conductor 95, through the further 0.766 winding disposed in the stator slots 7 and 4, and, by way of a conductor 96 to one end of the 0.500 winding disposed in the stator slots 5 and 8. The circuit of the series distributed primary-element phase winding continues through the 0.500 winding disposed in the stator slots 5 and 8, by way of a conductor 97, through the 0.174 winding disposed in the stator slots 9 and 6.

This completes the circuit of the series phase 1 distributed phase winding disposed in the stator slots of the positive collection of stator slots 1 to 9. As indicated by the arrows of Fig. 9, the conductors 93, 94, 95, 96 and 97 connect the 0.766, 0.500 and 0.174 windings, just described, to provide alternately opposite direction of winding from stator slot to stator slot. The directions in which the series circuit is traced, from stator slot to stator slot, are such that the direction of winding of the conductor groups in the odd-numbered stator slots is in an assumed positive direction, downward, away from the reader and the direction of winding of the conductor groups in the even-numbered stator slots is in the opposite or negative direction, upward, toward the reader.

A conductor 98 is shown in Fig. 9 connecting together the 0.174 windings disposed in the stator slots 9 and 6 and the stator slots 10 and 13, but with a reversal in the direction of connection. From here on, the connections constitute a repetition of the connections already described. The series phase 1 distributed primary-element phase-winding circuit continues through the 0.174 winding disposed in the stator slots 10 and 13, by way of a conductor 99, through the 0.500 winding disposed in the stator slots 14 and 11, by way of a conductor 100, through the 0.766 winding disposed in the stator slots 12 and 15, by way of a conductor 101, through the 0.766 winding disposed in the stator slots 16 and 13, by way of a conductor 102, through the 0.500 winding disposed in the stator slots 14 and 17, and, by way of a conductor 103, through the 0.174 winding disposed in the stator slots 18 and 15, back to a line conductor 104, connected to a line terminal 117. As indicated by the arrows of Fig. 9, the directions of winding are again reversed alternately, from stator slot to stator slot, but, this time, in such manner that the directions of winding in the even-numbered stator slots are positive, and those in the odd-numbered stator slots are negative.

The 0.174 winding disposed in the stator slots 10 and 13 is so connected into the series phase-winding circuit, by the conductor 98, that the direction of winding in the stator slot 10, as indicated by the arrows of Fig. 9, is in the same positive direction as the direction of winding of the 0.174 coil or winding in the stator slot 9. The directions of winding in the end slots 9 and 10 of the respective positive and negative collections are therefore in the same direction, and not in opposite directions.

Diametrically oppositely disposed conductor groups become duplicated, not only in magnitude, but also in direction, when the number of stator slots in each collection of stator slots is odd; and this renders it possible, as already described in connection with the two-collection assembly of Fig. 6, to operate the collections independently. It is because of this fact, and the fact that the number of poles of each collection of poles is even, that it is possible to provide an induction machine in accordance with the present invention that embodies only a single-collection assembly, or an assembly of an odd number of collections, of stator slots.

The series circuit of the phase 1 distributed primary-element phase winding diagrammatically illustrated in Fig. 11 may similarly be traced, in the direction of the respective arrows, from the line terminal 116, by way of the line conductor 92, through the 0.174 winding disposed in the stator slots 1 and 2, by way of a conductor 119, through the 0.326 winding disposed in the stator slots 2 and 3, by way of a conductor 120, through the 0.440 winding disposed in the stator slots 3 and 4, by way of a conductor 121, through the 0.500 winding disposed in the stator slots 4 and 5, by way of a conductor 122, through the 0.500 winding disposed in the stator slots 5 and 6, by way of a conductor 123, through the 0.440 winding disposed in the stator slots 6 and 7, by way of a conductor 124, through the 0.326 winding disposed in the stator slots 7 and 8, and, by way of a conductor 125, through the 0.174 winding disposed in the stator slots 8 and 9, to the conductor 98. The connections, not shown, from the conductor 98 to the line conductor 104 and the line terminal 117 will be a repetition of these connections. Here, again, the arrows clearly show the alternate reversals of the directions of winding of the successively disposed conductor groups.

The single-phase distributed winding described in connection with Fig. 9 may represent the phase 1 distributed winding of either the three-phase arrangement of Fig. 1 or of the two-phase arrangement of Fig. 21. In Fig. 14, it is shown developed into a plane, in order the better to illustrate its relation, in Fig. 1, to the phase 2 and phase 3 windings, respectively illustrated in the two accompanying figures, Figs. 15A and 15B and 16A and 16B.

The phase 2 and phase 3 distributed windings, in addition to having identical conductor groups respectively corresponding to those of the phase 1 distributed winding, as previously described, are shown in Figs. 1, 15A and 15B and 16A and 16B provided also with identical connecting conductors and line conductors, respectively corresponding to those of the phase 1 distributed winding, displaced $2\pi/3$ or 120 and $4\pi/3$ or 240 degrees counter-clockwise, respectively.

In the same way that the conductors 93 to 103 connect the windings of phase 1 in series to the conductors 92 to 104, the windings of phase 2 may be connected in series, by similar conductors, that are therefore represented in Figs. 1 and 15 by the same reference numerals, but augmented by 100; and the windings of phase 3 may be similarly series-connected by similar conductors that are represented in Figs. 1 and 16 by the same reference numerals, but augmented by 200.

The conductors 198 and 298 serve the same function for phases 2 and 3 that the conductor 98 does for phase 1. They connect together the intermediately disposed 0.174 windings of the respective assemblies corresponding to phases 2 and 3.

In Figs. 1 and 14 to 16, the line conductor 92 of phase 1 and the line conductor 304 of phase 3 are shown connected together to the common line terminal 116, the line conductor 192 of phase 2 and the line conductor 104 of phase 1 to a common terminal 117, and the line conductor 292 of phase 3 and the line conductor 204 of phase 2 to the common line terminal 118.

This provides a delta connection, as appears from the schematic of Fig. 12. By connecting together the conductors 104, 204 and 304, and connecting the conductors 92, 192 and 292 to the respective line terminals 116, 117 and 118, however, a Y connection may be obtained, as illustrated schematically in Fig. 13.

The line terminals 116, 117 and 118 constitute the line terminals of the three-phase machine.

The conductor groups of the phase 2 distributed winding of the two-phase arrangement of Fig. 21, previously described as different from the conductor groups of the phase 1 distributed winding, may be connected into a somewhat similar phase winding. This phase winding, corresponding to phase 2 may be traced, in Fig. 21, from the line terminal 217, by way of a conductor 329, through a 0.342 winding disposed in the stator slots 6 and 9 and encircling the stator teeth 47, 48 and 49, by way of a conductor 393, through a 0.643 winding disposed in the stator slots 7 and 10 and encircling the stator teeth 48, 49 and 50, by way of a conductor 394, through an 0.866 winding disposed in the stator slots 8 and 11, and encircling the stator teeth 49, 50 and 51, by way of a conductor 395, through a 0.643 winding disposed in the stator slots 9 and 12, and encircling the stator teeth 50, 51 and 52, and, by way of a conductor 396, through a further 0.342 winding disposed in the stator slots 10 and 13, and encircling the stator teeth 51, 52 and 53.

The circuit of the phase 2 distributed phase winding of Fig. 21 continues, by way of a conductor 397, through the conductor groups disposed in the stator slots 15 to 18 and 1 to 4, which have been described as duplicates of the conductor groups disposed in the stator slots 6 to 13. The conductor 397 connects the 0.342 winding disposed in the stator slots 10 and 13 to a 0.342 winding disposed in the stator slots 15 and 18, and encircling the stator teeth 56, 57 and 58. The circuit of the phase 2 distributed winding of Fig. 21 continues, by way of a conductor 398, through a 0.643 winding disposed in the stator slots 16 and 1, encircling the stator teeth 57, 58 and 41; by way of a conductor 399, through a 0.866 winding disposed in the stator slots 17 and 2, encircling the stator teeth 58, 41 and 42; by way of a conductor 400, through a 0.643 winding disposed in the stator slots 18 and 3, encircling the stator teeth 41, 42 and 43; and, by way of a conductor 401, through a 0.342 winding disposed in the stator slots 1 and 4, encircling the stator teeth 42, 43 and 44, to the line conductor 402, connected to the line terminal 218.

The connections of this circuit also provide alternately opposite directions of winding from stator slot to stator slot, with a reversal of connections, where the sine changes sign, through the medium of the conductor 397. As the phase 1 distributed winding is connected through the line conductors 92 and 104 to the terminals 216 and 217, respectively, the terminals 216, 217 and 218 constitute the terminals of the two-phase machine, the terminal 217 being the common terminal for the two phases.

As illustrated by the phase 2 distributed winding of Fig. 21, by orienting the reference zero lines Z. L. so that they are alined, each with a stator slot, both the number of actual conductor groups and the number of windings is reduced. In practice, it would also be advantageous to select a numer of stator slots which would provide like windings for the two phases. For the two-phase two-collection arrangement, this would be a number divisible by four.

The currents of the distributed phase windings of the polyphase winding each supplies a component magnetomotive force of the corresponding phase to each stator slot that is proportional to the number of conductors of the conductor group of that distributed phase winding disposed in that particular stator slot. The maximum magnetomotive force is accordingly contributed to the stator slot provided with a conductor group of that distributed phase winding comprising the maximum or unit number of conductors. This maximum magnetomotive force may be referred to as a unit magnetomotive force and its relative peak amplitude may be assumed equal to unity or 1.000, numerically the same as the number of conductors of the conductor group. The relative peak amplitude of the magnetomotive force contributed to any other stator slot by the current of this same phase is then similarly numerically the same as the number of conductors of the conductor group of this distributed phase winding disposed in that stator slot.

Referring to Fig. 20, with suitable choice of the origin of coordinates, the unit magnetomotive force contributed to any stator slot by the current of the phase 1 phase winding in an assumed unit conductor group of that phase winding disposed in that stator slot may be represented, disregarding the alternately opposite polarity, by the equation $$y = \cos x \quad (1)$$

The corresponding equation for the unit magnetomotive force contributed to any stator slot by the current of the $q$th phase winding in an assumed unit conductor group of that $q$th phase winding disposed in that stator slot, disregarding the alternately opposite polarity, is then $$y = \cos\left(x - \frac{2\pi}{p}q\right)$$

The relative number of conductors in the conductor group disposed in the central stator slot of this distributed phase winding corresponding to the $q$th phase, however, is $$\sin\left(\frac{\pi}{2} - \frac{2\pi}{p}q\right) = \cos\frac{2\pi}{p}q$$

The magnetomotive force exerted in the central stator slot by the current of the $q$th phase is therefore $$y = \cos\frac{2\pi}{p}q \cos\left(x - \frac{2\pi}{p}q\right)$$

The total magnetomotive force contributed by the currents of all $p$ phases to the central stator slot is accordingly $$y = \Sigma \cos\frac{2\pi}{p}q \cos\left(x - \frac{2\pi}{p}q\right)$$

where the addition is taken throughout the complete range of $2\pi$ or 360 electric degrees corresponding to the total range of phase displacement of the $p$ phases. This equation reduces to $$y = \frac{p}{2}\cos x \quad (2)$$

The total magnetomotive force contributed by the currents of all $p$ phase windings in the central stator slot is therefore sinusoidal, of the same phase and frequency as the current of phase 1, and with a peak amplitude proportional to half the sum of the $p$ phases.

The problem will now be solved for any other stator slot T, the angle of which is S degrees removed from the positive reference zero line +Z.L., as illustrated in Fig. 20. It has already been stated that, disregarding the alternately opposite direction of winding, the unit magnetomotive force of the current of the $q$th phase winding in any stator slot may be expressed by the equation $$y = \cos\left(x - \frac{2\pi}{p}q\right)$$

The number of conductors of the conductor group of the $q$th distributed phase winding disposed in the T stator slot is $$\sin\left(S - \frac{2\pi}{p}q\right)$$

The magnetomotive force of the current of the $q$th phase in the stator slot T is therefore represented by $$y = \sin\left(S - \frac{2\pi}{p}q\right)\cos\left(x - \frac{2\pi}{p}q\right)$$

and the total magnetomotive force contributed in the stator slot T by the currents of all $p$ phase windings is $$y = \Sigma \sin\left(S - \frac{2\pi}{p}q\right)\cos\left(x - \frac{2\pi}{p}q\right)$$

where the summation is again to be taken over the whole $2\pi$ or 360 degrees corresponding to the total range of phase displacement of the currents of the $p$ phase windings. This equation reduces to $$y = \frac{p}{2}\sin(S - x) \tag{3}$$

This equation, representing the magnetomotive force contributed to the stator slot T by the currents in the conductor groups of all the sinusoidally distributed phase windings corresponding to all $p$ phases, therefore, represents precisely the same sinusoidal variation described above by Equation 2, representing the magnetomotive force contributed by the currents in the conductor groups of all $p$ sinusoidally distributed phase windings in the central stator slot 5, but displaced $$S - \frac{\pi}{2}$$

degrees in phase, where S is the slot angle of the stator slot T, measured with respect to the positive reference zero line $+Z.L.$ The total magnetomotive forces contributed in the respective stator slots by the currents in the conductor groups of all $p$ sinusoidally distributed phase windings, therefore, are all sinusoidal, and, disregarding the alternately opposite direction of winding, equally phase-displaced. The peak amplitudes of these sinusoidal magnetomotive forces are proportional to half the number $p$ of sinusoidally distributed phase windings.

In the polyphase induction machine of the present invention, accordingly, a substantially sinusoidal component magnetomotive force is supplied to each stator slot by the substantially sinusoidal alternating current of each sinusoidally distributed phase winding. The amplitude and the polarity of each of these component magnetomotive forces are determined respectively by the number of conductors of the conductor group in which it is produced and the direction of winding of these conductors. Due to the displacement of the total angular ranges by means of which the relative numbers of conductors of the conductor groups of the respective phase windings are determined, the combined or total magnetomotive forces contributed to the various stator slots are equally phase-displaced, disregarding the alternately opposite polarity, over a total angular range of phase displacement equal to each of the previously-mentioned total angular ranges.

The alternating magnetic flux of the magnetic circuit encircling each stator slot will induce a voltage, or, more specifically, a back electromotive force, in any conductors disposed therein. Only those portions of the conductors or turns that are disposed inside the stator slots, of course, are effective for voltage-inducing purposes. The function of the remaining parts of the conductors or turns, on the outside of the respective stator slots, is merely to complete the electric connections between the portions of the conductors or turns inside the stator slots.

For the present, it will be assumed that in each stator slot, there is disposed a conductor group of a unit number of turns or conductors. The conductor group embodying such unit number of turns or conductors will be referred to as a unit conductor group.

The alternating voltages induced in the unit conductor groups disposed in the various stator slots are proportional to the negative of the rate of change of the alternating magnetic flux of the respective magnetic circuits. If the alternating magnetic fluxes be assumed, as before, to vary throughout their respective cycles according to the cosine, the voltages respectively induced thereby will then vary according to the sine.

Under the above assumptions, equal sinusoidal voltages will be induced in the unit conductor groups. These sinusoidal voltages will be equally phase displaced progressively, from stator slot to stator slot, disregarding the alternately opposite polarity, over a total range of phase displacement of $\pi$ or 180 degrees in each collection of stator slots, and over a total range of phase displacement of $2\pi$ or 360 degrees throughout the circumference of the two-collection assembly illustrated in Figs. 1, 2, 4, 6, 7, 9, 11, 14 to 16, 21, 27, 28 and 37.

The equal alternating voltages induced in the unit conductor groups disposed in the various stator slots 1 to 18 may be termed unit voltages, and their equal peak amplitudes may also be taken as unity. Assuming a sinusoidal wave form, the unit voltages induced in unit conductor groups respectively disposed in the stator slots 1 to 9 of Figs. 1, 5, 6, 8, 9, 11, 14, 21, 27, 28 and 37 may be represented by the curves $e_1$ to $e_9$ of Fig. 17. To avoid the confusion that would be introduced by nine additional curves, the voltages induced in unit conductor groups respectively disposed in the stator slots 10 to 18 of Figs. 1, 6, 9, 14, 21, 27, 28 and 37 may be represented by means of the respective vectors $e_{10}$ to $e_{18}$ of Fig. 17. Each of these vectors, positioned on the axis of abscissae at the point at which occurs the corresponding peak unity or 1.000 value, represents a sinusoidal variation of exactly the same type as do the curves $e_1$ to $e_9$.

In each distributed-phase-winding conductor group, a voltage will be induced proportional to the number of conductors or turns in the conductor group. Each such induced voltage, for reasons which will become apparent, will be referred to as a component voltage.

Referring to Fig. 18, the component voltage induced in the conductor group disposed in the stator slot 1, represented by the sinusoid $E_1$, is equal to the corresponding unit voltage $e_1$ multiplied by the sine of the 10 degree phase-sequence angle associated with the stator slot 1, or $$E_1 = e_1 \sin 10°$$

The component voltage induced in the conductor group disposed in the stator slot 2, represented by the sinusoid $E_2$, is similarly equal to the corresponding unit voltage $e_2$ multiplied by the sine of the 30 degree phase-sequence angle associated with the stator slot 2, or $$E_2 = e_2 \sin 30°$$

and so on.

Since the number of conductors of the conductor groups of the stator slots varies as the sine of the corresponding phase-sequence angle, the peak amplitudes are each respectively shown in Fig. 18 as equal to the peak amplitude of the alternating unit voltage induced in the said unit number of conductors multiplied by the sine of the corresponding phase-sequence angle.

The component voltages induced in the negative collection of stator slots 10 to 18 are duplicates of those induced in the positive collection of stator slot 1 to 9, and will be represented by sinusoidal curves that are duplicates of, and superposed upon, the respective sine curves $E_1$ to $E_9$ The component voltages induced in the conductor groups disposed in the stator slots of the single collection of stator slots 1 to 9, represented by the curves $E_1$ to $E_9$, respectively, will add, in the series distributed phase-winding circuit described, to produce the resultant voltage represented by the curve $E_R$ of Fig. 18. This voltage addition may be expressed by the equation $$E_R = E_1 + E_2 + E_3 + E_4 + E_5 + E_6 + E_7 + E_8 + E_9 \quad (4)$$

By substitution, this resultant voltage may be expressed, in terms of the original unit voltages, as $$E_R = e_1 \sin 10° + e_2 \sin 30° + e_3 \sin 50° \ldots + e_9 \sin 170° \quad (5)$$

The analytical treatment will now be taken up in connection with the more general problem of a stator core 19 having a two-collection assembly of $n$ stator slots and, therefore, with the $n$ conductor groups of the phase 1 distributed phase winding respectively disposed therein, and also with the alternating component voltages induced in those conductor groups, respectively represented by sinusoids of the nature illustrated by Fig. 18. It will therefore be assumed, in Fig. 19, that the range $$x = 2\pi$$

on the X axis of abscissae, has been divided up into $n$ equal intervals. It will be asumed also that the ordinates of the component sinusoidal curves of Fig. 19 are each zero, changing from negative to positive, at $$x = m$$

where $m$ is any integrer from 1 to the total number $n$.

Let the sinc curve representing both the unit voltage $e_s$ and the component voltage $E_s$ of Fig. 19 be represented by the equation $$y = \sin x$$

Then the equation of the mth sine curve, representing the alternating component voltage induced in the conductor group disposed in the mth stator slot, is $$y = \cos \frac{2\pi}{n} m \sin \left( x - \frac{2\pi}{n} m \right)$$

The equation of the resultant composite curve representing the addition of all these component sine curves is therefore equal to the sum of the individual equations of these component sine curves, and this reduces to $$E_R = \frac{n}{2} \sin x \quad (6)$$

In the phase 1 distributed phase winding comprising two collections of conductor groups illustrated in Figs. 1, 6, 9, 11, 14 to 16 and 21, therefore, the alternating component voltages induced in the various conductor groups will add their contributions to produce a sinusoidal resultant composite voltage $E_R$ of the same frequency and phase as either the alternating unit voltage or the component voltage induced in the central stator slot 5, in Figs. 1, 6, 9, 11, 14 to 16 and 21. The peak amplitude of this sinusoidal resultant composite voltage $E_R$ is equal to the peak amplitude of either the unit voltage or the component voltage induced in the central stator slot 5 multiplied by one-half the total number of stator slots in the two-collection assembly. In Figs. 1, 6, 9, 11 and 14 to 16 and 21, this total number is 18, and one-half that number is 9.

When the total number of stator slots in a two-collection assembly is even, the two collections are necessarily duplicates and equal contributions are therefore afforded from both collections of conductor groups thereof. The resultant or composite voltage induced in a distributed phase winding comprising only a single collection of conductor groups as illustrated in Figs. 5, 8 and 36, may therefore be expressed by the equation $$E_R = \frac{n}{4} \sin x$$

or by the equation $$E_R = \frac{N}{2} \sin x \quad (7)$$

where N is the number of component voltages induced in the conductor groups of a single-collection-assembly induction machine.

It may be shown that the equation thus derived for the composite sinusoidal voltage $E_R$ induced in the phase 1 distributed phase windings of Figs. 1, 5, 6, 8, 9, 11, 14 to 16 and 21 is applicable also to arrangements wherein no stator slots are alined with the reference center lines ¢ or reference zero lines Z. L. and to sinusoidally distributed phase windings which are in different orientation with respect to the stator slots.

Under normal operating conditions, the alternating magnetic fluxes of the magnetic circuits encircling the stator slots 1 to 18, and the voltages induced thereby, are non-sinusoidal. Despite this fact, however, if the numbers of conductors of each distributed phase winding varies as the sine, and the direction of winding changes alternately with, and with the negative of, the sign thereof, the resultant composite voltage will still be very nearly sinusoidal. This arises from the fact that most of the harmonics present in the component voltages are suppressed in the sinusoidally distributed phase windings and therefore do not appear in the composite voltages. Just what harmonics are suppressed depends upon the number of component voltages, magnetic circuits or stator slots.

It will be demonstrated, by summing separately the respective harmonics of the non-sinusoidal component voltages, that most of the harmonics of these non-sinusoidal component voltages cancel in the sinsuoidally distributed phase winding and that, for this reason, the composite voltage curve is substantially sinusoidal. This will be done analytically for the general case of an induction machine of the present invention provided with a two-collection assembly of $n$ stator slots.

The curves $E_1$ to $E_9$ of Fig. 18, previously described as representing the component voltages respectively induced in the conductor groups of the phase 1 distributed phase winding disposed in the stator slots 1 to 9, when these component voltages are assumed sinusoidal, may now therefore be regarded as representing also the fundamental voltages of the component voltages when the component voltages are assumed non-sinusoidal.

Because the non-sinusoidal component voltages induced in the stator slots are of the same wave form, they are all known to contain fundamental and harmonic voltages respectively of the same frequency and in exactly the same ratio. It is therefore possible to represent any harmonic voltage of any amplitude H, of any harmonic order $h$, in any desired phase relation $\beta$, induced in the conductor group of the phase 1 distributed phase winding disposed in the mth stator slot by the equation $$y = H \cos \left( \theta + \frac{2\pi}{n} m \right) \sin h. \left( x - \theta - \beta - \frac{2\pi}{n} m \right)$$

This equation introduces an angle $\theta$ to represent the general case in which the stator slots are displaced by that angle from the position shown in the drawings. In that position of course $\theta = 0$.

The sum of the harmonic voltages of the harmonic order $h$ of the component voltages induced in the conductor groups of the phase 1 sinusoidally distributed phase winding comprising two collections of conductor groups accordingly becomes represented by the equation $$Y = H \Sigma \cos \left( \theta + \frac{2\pi}{n} m \right) \sin h. \left( x - \theta - \beta - \frac{2\pi}{n} m \right)$$

It may be shown that this equation equals zero, except when $h\pm1$ is any whole number $k$ multiplied by $n$, the number of stator slots in the two-collection assembly of stator slots, or $$h = kn \pm 1$$

In either of these two latter cases, the equation reduces to $$Y = \frac{n}{2}H \sin [h.(x-\theta-\beta) \pm \theta]$$

All other harmonics of the non-sinusoidal component voltages cancel in the sinusoidally distributed phase winding.

As the number $n$ of stator slots is increased, the number of cancelled harmonics is also increased. In the induction machine of the present invention shown in Fig. 22, for example, wherein the number of stator slots $n$ is twelve, the harmonics $h$ which do not cancel in the distributed phase 1 winding are $$h = 12k \pm 1$$

or the 11th, 13th, 23rd, 25th, 35th, and so on. In the induction machine shown in Figs. 1, 6, 9, 11, 14 to 16 and 21, on the other hand, wherein the number $n$ of stator slots is eighteen, only the 17th, 19th, 35th, 37th, and similarly spaced other higher harmonics remain uncancelled. The induction machine shown in Figs. 5, 8 and 36, as previously explained, performs in exactly the same manner as each of the two like collections of the two-collection assembly of Figs. 1, 6, 9, 11, 14 to 16 and 21, and the same harmonics will be cancelled. Similar considerations apply to the cancellation of the harmonics in the sinusoidally distributed phase 2 and phase 3 windings.

In each sinusoidally distributed phase winding, therefore, the sinusoidal impressed voltage is opposed by a substantially sinusoidal composite voltage; and a substantially sinusoidal current flows through the phase winding, as previously assumed.

There is diagrammatically shown in Figs. 1, 3 to 7, inclusive, 25, 27, 28 and 37 a single endless-conductor rotor phase winding or coil circuit 270 wound zigzag from rotor slot to rotor slot through the eight rotor slots 21 to 28 of the single-collection assembly and the sixteen rotor slots 21 to 36 of the two-collection assembly. The endless-conductor rotor phase winding or coil 270 is shown constituted of a single heavy conductive bar, such as copper, enclosed in an insulating shield, shown partly broken away in Figs. 5 and 25, in order to insulate it from the rotor core and all the other conductors. The showing, however, is diagrammatic; it may represent also a single series phase-winding circuit 270 provided with constituent conductor groups, each of the same number of conductors, one disposed in each rotor slot of the single-collection assembly of rotor slots 21 to 28 or of the two-collection assembly of rotor slots 21 to 36. In Figs. 1, 3 to 7, inclusive, 25, 27, 28 and 37, the constituent conductor groups are shown each constituted of a single conductor. In Figs. 26 and 30, they are shown constituted each of several conductors, and they may be constituted each of a large number of conductors, respectively provided by windings wound through the same rotor slots.

The individual constituent conductors of the endless-conductor rotor phase winding 270 disposed in the odd-numbered rotor slots are shown connected in a direction opposite to that of the individual constituent conductors disposed in the even-numbered rotor slots, to indicate diagrammatically that the rotor phase winding 270 may be considered to pass in one direction through the odd-numbered rotor slots and in the opposite direction through the even-numbered rotor slots.

It has previously been stated that the number of assemblies of rotor slots, in an operable arrangement, must be more than one. The 32 rotor slots of the rotor 262, illustrated in Figs. 1, 2, 4, 7, 25 to 28, inclusive, 30 and 32, for example, have been described as divided into two assemblies of sixteen rotor slots each. There must likewise be provided a plurality of rotor phase windings, one disposed in each assembly of rotor slots. A second similar endless-conductor rotor phase winding 269 is therefore diagrammatically shown disposed in the second assembly of sixteen rotor slots 321 to 336.

In Fig. 22, similarly, an endless-conductor rotor phase winding 734 is shown mounted in the two-collection assembly of ten rotor slots 136 to 145, and an endless-conductor rotor phase winding 733 in the two-collection assembly of ten rotor slots 736 to 745.

In Fig. 26, the end conductors 305 and 306 of the rotor phase coil or winding 270 are shown connected to respective slip rings 309 and 310. The phase winding 269 is similarly shown connected, by the end conductors 307 and 308, to respective slip rings 310 and 311. The slip ring 310 therefore serves as a common connection to both the rotor phase windings 269 and 270. The conductor groups disposed in the various rotor slots are thus connected in series along the alternately opposite directions of winding into the respective rotor-phase-winding circuits 269 and 270.

As in present-day wound-rotor motors, the function of the slip rings is to provide for the connection of variable resistors into the rotor phase-winding circuits 269 and 270 for operation of the induction motor as a varying-speed induction motor. A variable resistor 318 is shown connected by a conductor 315, through a brush 312, to the slip ring 309, and a variable resistor 319 by a conductor 317, through a brush 314, to the slip ring 311. The resistance thus introduced by the resistors 318 and 319 into the circuits of the respective rotor phase windings 270 and 269 may be varied by means of an adjustable contact arm 320 that is connected by means of a common conductor 316, through a brush 313, to the common slip ring 310.

It is not essential that the series connections of the rotor phase windings 269 and 270 be in the sequence of the consecutively numbered rotor slots of the respective assemblies of rotor slots. The order in which the individual constituent conductors are connected in series may be entirely irrelevant.

The invention is not, of course, restricted to induction machines the rotor phase windings of which are provided with only two rotor phase windings. The rotor may be wound also with three or more phases, merely by properly spacing the rotor slots and properly disposing the rotor phase windings therein.

The three-phase rotor 263 of Fig. 37, as an illustration, is shown provided with three two-collection assemblies of sixteen rotor slots each, 21 to 36, 521 to 536 and 621 to 636, in which are disposed the respective three rotor phase windings 270, 271 and 272.

In the examples so far considered, each collection of stator slots has been illustrated as provided with an odd number of stator slots and each collection of rotor slots has been illustrated as provided with an even number of rotor slots, one less or one more in number than the number of stator slots of each collection of stator slots. In such induction machines, the collections of stator slots, the magnetic circuits which respectively encircle those stator slots, and the conductor groups disposed therein are respectively duplicates. Furthermore, in the conductor groups of each phase winding disposed in the stator slots of each collection of stator slots, there are as many conductors wound in the positive direction as there are conductors wound in the negative direction. Similar remarks, of course, apply to the rotor slots of each collection of rotor slots and the conductor groups disposed therein.

The invention is obviously not restricted to use with an odd number of stator slots or magnetic circuits in each collection of stator slots or magnetic circuits, or to an even number of rotor slots in each collection of rotor slots. Nor is it restricted to sinusoidally distributed phase windings the conductor groups of which, disposed in each collection of stator slots, are provided with the same number of conductors wound in each direction. In emphasis of this fact, reference may now be had to Fig. 22, which is a counterpart, in all respects, of Fig. 6, except that the two collections of nine stator magnetic circuits and slots of Fig. 6 have been replaced by two collections of six magnetic circuits and slots each, and the two collections of eight rotor slots of each assembly of rotor slots have been replaced by two collections of five rotor slots each. The stator collections, of course, may embody one less magnetic circuit or slot each, instead of one more, than the number of rotor slots of each collection of rotor slots.

The twelve stator slots of the stator 182 are shown in Fig. 22 at 146 to 157, and the twelve stator teeth, one between each two adjacently disposed stator slots, at 158 to 169. The two assemblies, each of ten rotor slots, are shown at 136 to 145 and 736 to 745. In Fig. 22, the reference zero lines +Z. L. and —Z. L. are shown alined radially with the stator slots 146 and 152, respectively, and the reference center lines + ₵ and — ₵ are shown alined radially with the central stator slots 149 and 155 of the positive and negative collections of stator slots 146 to 151 and 152 to 157, respectively. Accordingly, the numbers of conductors of the phase 1 distributed phase winding disposed in the positive collection of stator slots 146 to 151 and the negative collection of stator slots 152 to 157 are respectively proportional to 0.000, 0.500, 0.866, 1.000, 0.866 and 0.500, the absolute or positive values of the respective progressively increasing angles 0, 30, 60, 90, 120 and 150 degrees corresponding to the positive collection, and 180, 210, 240, 270, 300 and 330 degrees corresponding to the negative collection.

According to the arrangement illustrated in Fig. 22, this distribution of the conductors of the conductor groups is attained, for example, by disposing a coil or winding having the relative number 0.500 of turns in the stator slots 147 and 148 and the stator slots 156 and 157, so as respectively to enclose the stator teeth 159 and 168; disposing a 0.366 coil or winding in the stator slots 148 and 149 and also in the stator slots 155 and 156, so as respectively to enclose the stator teeth 160 and 167; disposing a 0.634 coil or winding in the stator slots 149 and 150, as well as in the stator slots 154 and 155, so as respectively to enclose the stator teeth 161 and 166; and disposing a 0.232 coil or winding in the stator slots 150 and 151, and also in the stator slots 153 and 154, so as respectively to enclose the stator teeth 162 and 165. The stator slots 146 and 152, as already explained, require zero conductors or windings, but an additional 0.268 winding is shown disposed in the stator slots 151 and 153 in order to provide the excess of conductors wound in the positive direction in the positive collection of stator slots 146 to 151 and the excess of conductors wound in the negative direction in the negative collection of stator slots 152 to 157.

The relative number of conductors in the conductor groups of the central stator slots 149 and 155 will therefore be 0.366+0.634 or 1.000. The relative number of conductors in the conductor groups of the stator slots 148 and 156 will be 0.500+0.366 or 0.866. The same 0.866 value is obtained for the conductor groups of the stator slots 150 and 154, by adding 0.634 and 0.232. As the conductor groups in the stator slots 147 and 157 are constituted of only the 0.500 windings, the relative number of turns per coil or winding and the relative number of conductors per slot, in this instance, are the same. The relative number of conductors in the stator slots 151 and 153 are similarly 0.500, but provided by the 0.232 and 0.268 coils or windings.

The series circuit of Fig. 22 may be traced from a line terminal 170, by way of a line conductor 171, through the 0.500 winding disposed in the stator slots 147 and 148, by way of a conductor 172, through the 0.366 winding disposed in the stator slots 148 and 149, by way of a conductor 173, through the 0.634 winding disposed in the stator slots 149 and 150, by way of a conductor 174, through the 0.232 winding disposed in the stator slots 150 and 151, and, by way of a conductor 175, to the 0.268 winding disposed in the stator slots 151 and 153. The series circuit continues through this 0.268 winding and, by way of the conductors 176, 177, 178 and 179, through the remaining 0.232, 0.634, 0.366 and 0.500 coils or windings, to a line conductor 180 connected to a line terminal 181.

The change in the direction of winding due to the change in the sign of the sine function is somewhat obscured in this distributed winding of Fig. 22. The obscurity arises out of the fact that, because the sine of the angles zero and π or 180 degrees, associated with the conductor groups disposed in the stator slots 146 and 152, is equal to 0.000, there are no conductors disposed in these stator slots. Since, therefore, there are no conductors in the conductor groups disposed in these stator slots 146 and 152, no direction of winding can be associated with these zero conductor groups. The obscurity will become resolved, however, if it be observed that, still retaining the alternateness in the direction of winding from stator slot to stator slot, a change will be introduced in the direction of winding at these points by winding in opposite directions the conductor groups disposed on opposite sides of the reference zero line Z. L.

In Fig. 22, the direction of winding is opposite in diametrically oppositely disposed stator slots, rather than the same, as in Figs. 1, 6, 9, 14 to 16 and 21. The magnetomotive forces supplied to, and the polarity of, the magnetic circuits encircling diametrically oppositely disposed stator slots is therefore opposite. However, the distributed phase winding of Fig. 22 performs in exactly the same manner as the phase 1 distributed phase winding of these Figs. 1, 6, 9, 14 to 16 and 21.

The distributed phase winding of Fig. 22 would constitute one of the distributed phase windings of a polyphase arrangement. A three-phase polyphase winding would be provided with two additional distributed phase windings comprising conductor groups identical to those of Fig. 22, but respectively displaced 2π/3 or 120 and 4π/3 or 240 degrees counterclockwise, in the direction of the phase sequence. A two-phase arrangement would be provided similarly with only one additional distributed phase winding, displaced π/2 or 90 degrees counterclockwise. In both the two-phase and the three-phase arrangements, the distributed phase windings would be alike, for the number 12 of stator slots is divisible by both three and four.

The phase winding illustrated in Fig. 22 may be simplified by selecting an orientation of the reference lines such that the stator slots of each collection of stator slots symmetrically straddle the reference center line ₵. The unequal number of conductors wound in each direction through the stator slots of each collection of stator slots is then avoided because, for each conductor group associated with one direction of winding, there is a conductor group disposed symmetrically thereto, on the other side of the reference center line ₵, that has the same number of conductors wound in the opposite direction.

The direction of winding of the conductor groups of the rotor phase windings 733 and 734, like the direction of winding of the conductor groups of the rotor phase windings 269 and 270, is alternately opposite from rotor slot to rotor slot of the respective assemblies of rotor slots. However, because of the odd number of rotor slots of each collection of rotor slots of Fig. 22, the direction of winding is opposite in diametrically oppositely disposed rotor slots. This, of course, corresponds to the opposite direction of winding in diametrically oppositely disposed stator slots.

When each collection of stator slots and magnetic circuits is provided with an even number of stator slots and magnetic circuits, respectively, illustrated as six in Fig. 22, diametrically oppositely disposed stator magnetic circuits are necessarily of opposite polarity, rather than the same polarity, and the negative collection of magnetic circuits is actually a negative collection. Furthermore, because the number of rotor slots of each collection of rotor slots is odd, the assembly must necessarily include an even number of collections to provide as many rotor phase-winding conductor groups wound in the positive direction as there are rotor phase-winding conductor groups wound in the positive direction as there are rotor phase-winding conductor groups wound in the negative direction.

The alternating magnetic fluxes encircling the stator slots complete their circuits in the rotor core and effect magnetic coupling to the rotor phase-winding conductor groups disposed in the rotor slots within their respective magnetic circuits. The magnetic coupling of each alternating magnetic flux to a rotor phase winding is theoretically a maximum when a rotor slot, in which is disposed a conductor group of that rotor phase winding, is alined radially with the stator slot encircled by that alternating magnetic flux. Conversely, it is theoretically a minimum or zero when rotor slots in which are disposed conductor groups of that rotor phase winding are symmetrically misalined with respect to the stator slot encircled by that alternating magnetic flux. Resulting from the difference of one in the number of stator slots of each collection of stator slots and the number of rotor slots of each collection of rotor slots, in each collection, there is a point on the circumference where the magnetic coupling to a rotor phase winding is theoretically a maximum and a further point where the magnetic coupling to that same rotor phase winding is theoretically a minimum or zero. Resulting from the angular displacement of the rotor phase windings and the assemblies of rotor slots in which they are respectively disposed, the points of maximum and minimum magnetic coupling corresponding to the various rotor phase windings are likewise respectively angularly displaced.

In Figs. 5 and 6, for example, the magnetic coupling of the alternating magnetic fluxes encircling the central stator slots 5 and 14 with respect to the conductor groups of the rotor phase winding 270 disposed in the rotor slots 25 and 33 is theoretically a maximum. As illustrated by the dashed lines, substantially all the magnetic flux of the magnetic circuits encircling the stator slots 5 and 14 also encircles the rotor slots 25 and 33 respectively alined therewith. Conversely, the magnetic coupling of the alternating magnetic fluxes encircling the stator slots 1, 9, 10 and 18 with respect to the conductor groups of the rotor phase winding 270 is very nearly a minimum. This latter condition is not illustrated by the dashed lines of Figs. 5 and 6, for the alternating magnetic fluxes encircling the stator slots 1, 9, 10 and 18 attain their respective maximum values at other instants in the electric cycle.

When the rotor 262 is stationary, in the position illustrated in Figs. 1 to 8, the magnetic coupling to the conductor group of the rotor phase winding 270 disposed in the rotor slot 25 is a maximum, and a maximum voltage is therefore induced therein. The magnetic coupling to the conductor groups of the rotor phase winding 270 disposed in the rotor slots 24, 23 and 22 on the one side of the rotor slot 25 and the rotor slots 26 to 28 on the other side of the rotor slot 25 is progressively smaller, and, accordingly, corresponding progressively smaller progressively phase-displaced voltages are induced therein. A near-minimum voltage is therefore induced in the conductor group of the rotor phase winding 270 disposed in the rotor slot 21. Due to the symmetry of the arrangement, the composite voltage induced in the portion of the rotor phase winding 270 disposed in the rotor slots of the positive collection of rotor slots 21 to 28 is of increased amplitude, but of the same phase as the voltage induced in the conductor group of the rotor phase winding 270 disposed in the rotor slot 25. An identical composite voltage is induced in the portion of the rotor phase winding 270 disposed in the rotor slots of the negative collection of rotor slots 29 to 36.

When the stationary position of the rotor 262 is such that the rotor slot 25, or any other rotor slot of the assembly of rotor slots 21 to 36, is alined radially with some other stator slot, the amplitude of the composite voltage induced in the rotor phase winding is exactly the same, but its phase is the same as the phase of the voltage induced in the conductor group disposed in the alined rotor slot. It may be shown also that, in intermediate positions of the rotor 262, wherein no rotor slot of the assembly of rotor slots 21 to 36 is alined radially with a stator slot, the amplitude of the composite voltage is similarly the same, but that its phase is of an intermediate value. In this manner, a composite voltage is induced in the rotor phase winding 270 the phase of which corresponds to the particular stationary position of the rotor 262.

As illustrated by the nested dashed lines of Fig. 8, the magnetic coupling to the conductor groups of the rotor phase winding 269 disposed in the rotor slots 321 and 328 of the collection of rotor slots 321 to 328 is very nearly a maximum, whereas the magnetic coupling to the conductor groups disposed in the rotor slots 324 and 325, not illustrated by the nested dashed lines, is theoretically very nearly a minimum or zero. Due to the symmetry, the composite voltage induced in the rotor phase winding 269 is of an intermediate phase, midway between the phases of the voltages induced in the conductor groups of the rotor phase winding 269 disposed in the rotor slots 21 and 28. This phase is displaced $\pi/2$ or 90 degrees with respect to the phase of the composite voltage induced in the rotor phase winding 270, heretofore described. Similarly, in the two-collection assembly of Figs. 1, 2, 4, 6 and 7 and the single-collection assembly of Fig. 3, the composite voltages respectively induced in the rotor phase windings 269 and 270 are displaced $\pi/2$ or 90 degrees, as are also the currents produced by these composite voltages.

In Fig. 37, wherein the rotor 263 embodies three equiangularly spaced phase windings 270, 271 and 272, respectively disposed in the assemblies of rotor slots 21 to 36, 521 to 536 and 621 to 636, the composite voltages are equally phase-displaced by increments of $2\pi/3$ or 120 degrees, rather than $\pi/2$ or 90 degrees.

It is well known that equally phase-displaced currents in phase windings similar to the rotor phase windings 270 and 269 of Figs. 1, 3 to 8, 27 and 28, or the rotor phase windings 270 to 272 of Fig. 37, disposed in equiangularly-spaced respective assemblies of rotor slots provided along the circumference of a magnetizable core, produce a rotating magnetic field in that magnetizable core of a number of alternately opposite poles equal to the number of slots of each assembly of slots. Accordingly, there is produced in the rotor core 262 of the single-collection assembly of Figs. 3, 5 and 8, by the rotor phase 1 and rotor phase 2 currents, a rotating magnetic field of eight alternately opposite poles, the same number as the number of rotor slots in each of the single collection assemblies of rotor slots 21 to 28 and 321 to 328, one less than the number of stator slots of the single-collection assembly of stator slots 1 to 9. Similarly, in the rotor 262 of the two-collection assembly of Figs. 1, 2, 4, 6, 7, 27 and 28, there is produced a rotating magnetic field of sixteen alternately opposite poles, the same number as the number of rotor slots in each of the two-collection assemblies of rotor slots 21 to 36 and 321 to 336, two less than the number of stator slots of the two-collection assembly of stator slots 1 to 18. In the rotor core 735 of Fig. 22, there is similarly produced, when the rotor is stationary, a rotating magnetic field of ten poles, the same number as the number of rotor slots in each of the two-collection assemblies of rotor slots 136 to 145 and 736 to 745. An increase in the number of assemblies of rotor slots and corresponding rotor phase windings, as illustrated in Fig. 37, renders the rotation of the rotating magnetic field more uniform and its amplitude more constant, but it does not change the number of poles or the phase of the rotating magnetic field.

Resulting from the cooperation of the magnetic pattern produced in the stator 19 by the supplied polyphase stator current and the rotating magnetic field produced in the rotor 262 by the induced polyphase rotor current, a starting torque is produced, as will now be explained with reference to Figs. 27 and 28.

Figs. 5, 6 and 8 illustrate, by means of dashed lines, the alternating magnetic fluxes encircling the stator slots and the continuation of these magnetic fluxes in the rotor core 262. Unlike Figs. 5, 6 and 8, the continuation of these alternating magnetic fluxes in the rotor core 262 is not illustrated in Figs. 27 and 28. Instead, there is illustrated, in Figs. 27 and 28, the magnetic flux produced in the rotor core 262, and the polarity produced in the rotor teeth, at the particular instant or portion of the cycle, by the polyphase current induced in the polyphase rotor winding. The instantaneous polarities of the stator and rotor teeth are indicated in Figs. 27 and 28 either by N or S, to represent north and south polarities, respectively, or else these stator and rotor teeth bear no indication at all, to represent neutral polarity.

When the magnetic flux of the magnetic circuit encircling the central stator slot 5 is at its maximum value with the stator tooth 45 of north polarity and the stator tooth 46 of south polarity, as illustrated in Fig. 27, the phase 1 current of the rotor phase winding 270 is at a zero value, and that of the rotor phase winding 269 is at its maximum-peak value. The magnetization produced in the rotor 262 by the polyphase rotor current, at this instant, is therefore due entirely to the phase 2 current through the rotor phase winding 269. This current travels down through the odd-numbered rotor slots 321, 323, 325, 327, 329, 331, 333 and 335, away from the reader, and up through the even-numbered rotor slots 322, 324, 326, 328, 330, 332, 334 and 336, toward the reader, in a counterclockwise direction, as indicated by the arrow heads on the rotor phase winding 269 of Fig. 27.

Because the rotor phase winding 269 zigzags back and forth through the alternately disposed rotor slots of the assembly of rotor slots 321 to 336, the rotor teeth of the two assemblies of rotor teeth 64 to 79 and 364 to 379 become associated, in pairs, with alternately opposite polarity. At this instant of time, each such pair of rotor teeth therefore comprises one pole of the rotor rotating magnetic field. As the same current travels through all parts of this rotor phase winding 269, moreover, the intensity of these north and south poles, due to this rotor current, is the same throughout the circumference.

Still referring to Fig. 27, the rotor south pole comprising the rotor teeth 967 and 68 is shown radially alined with the central stator slot 5, midway between the stator teeth 45 and 46, of north and south polarity, respectively. Since unlike poles attract and like poles repel, a torque is produced in the rotor 262, tending to rotate the rotor 262 clockwise, as indicated by the large curved arrow. A similar clockwise torque is produced, of course, in the negative collection by the rotor south pole comprising the rotor teeth 975 and 76 and the stator teeth 54 and 55, of north and south polarity, respectively.

Additional clockwise torque is produced in the neighborhoods of the stator teeth 42, 43, 44, 47, 48, 49, 51, 52, 53, 56, 57 and 58. However, the torque decreases progressively to a minimum or zero in the neighborhoods of the stator teeth 41 and 50, respectively alined with the positive and negative reference zero lines +Z. L. and —Z. L. No torque, as a matter of fact, could be produced in these neighborhoods, even if the stator teeth 41 and 50 were magnetized, because the rotor south poles comprising the pairs of rotor teeth 979 and 64 and 971 and 72 are alined with the respective stator teeth 41 and 50.

In Fig. 28, the magnetic fluxes produced in the stator 19 and the rotor 262 by the respective polyphase stator and rotor currents are illustrated for an instant $\pi/4$ or 45 degrees later in the electric or magnetic cycle, the rotor 262 being shown still in the initial or reference position wherein the rotor slot 25 is alined radially with the central stator slot 5. At this instant, the currents through the rotor phase windings 269 and 270 are of equal amplitude, below their maximum peak amplitude. These currents travel down through the respective odd-numbered rotor slots, away from the reader, up through the respective even-numbered rotor slots, toward the reader, in the counterclockwise direction, as indicated by the arrowheads on the respective rotor phase windings 269 and 270 of Fig. 28.

The polarity established in the rotor teeth is the resultant effect of these two equal currents. The current of the rotor phase winding 269 tends to magnetize the rotor teeth in the manner illustrated in Fig. 27, but with decreased amplitude. The current of the rotor phase winding 270, on the other hand, tends to magnetize the pairs of rotor teeth 64 and 964, 66 and 966, 68 and 968, 70 and 970, 72 and 972, 74 and 974, 76 and 976 and 78 and 978 in the north polarity and the pairs of rotor teeth 65 and 965, 67 and 967, 69 and 969, 71 and 971, 73 and 973, 75 and 975, 77 and 977 and 79 and 979 in the south polarity. The combined effect is that the rotor teeth 64 to 79 become associated with neutral polarity, the rotor teeth 964, 966, 968, 970, 972, 974, 976 and 978 with north polarity, and the rotor teeth 965, 967, 969, 971, 973, 975, 977 and 979 with south polarity. The rotating magnetic field accordingly has rotated clockwise through a small angle corresponding to the apparent 45-degree counterclockwise rotation of the stator magnetic pattern.

At the instant represented by Fig. 28, a near-maximum clockwise torque obtains in the neighborhoods where the rotor south poles comprising the rotor teeth 969 and 977 are respectively very nearly alined with the stator slots 7 and 16. In Fig. 28 as in Fig. 27, the clockwise torque decreases progressively to the zero value at points displaced $\pi/2$ or 90 geometric degrees, or, more generally, $\pi/2$ or 90 electric or magnetic degrees, from the points where the maximum clockwise torque occurs. This, of course, in Fig. 28, is in the neighborhoods of the stator teeth 43 and 52.

As the electric cycle is advanced, the stator magnetic pattern continues its apparent counterclockwise rotation, and the rotor rotating magnetic field continues its clockwise rotation. At any instant, at points on the circumference where the alternating magnetic flux of a stator magnetic circuit is a maximum, the torque is a maximum and, correspondingly, at points on the circumference displaced $\pi/2$ or 90 electric or magnetic degrees therefrom, where the alternating magnetic flux of a stator circuit is a minimum, the torque is also a minimum. At all instants in the electric cycle, a clockwise torque is produced and, if free to rotate, the rotor 262 will turn in the direction of the torque and tend to attain the synchronous speed associated with the particular number of poles of the rotating magnetic field induced in the rotor.

The same analysis that has been offered above in connection with the assembly of one or more collections of eight rotor slots each could equally well, furthermore, have been offered in connection with an assembly of one or more collections of ten rotor slots each, as illustrated in Figs. 33, 34 and 36, the number of stator slots of each collection of stator slots being maintained at nine. When the number of rotor slots of each collection of rotor slots is one more, rather than one less, than the number of stator slots of each collection of stator slots, however, the direction of torque is in the same direction as the direction of the phase sequence, instead of opposite to the direction of the phase sequence, as above described.

According to a modification of the invention illustrated in Figs. 33, 34 and 36, the rotor phase windings, instead of comprising each a single series circuit of the respective conductor groups, comprise a plurality of series circuits, each of conductor groups disposed in equiangularly spaced rotor slots of the respective collections of rotor slots.

Fig. 36 illustrates the stator 19 of Fig. 5, but cooperating with a different rotor 840. For explanatory purposes, this rotor 840 of Fig. 36, like the rotor 262 of Fig. 5, is shown provided with only one of a plurality of single-collection assemblies of rotor slots. This one single-collection assembly of rotor slots comprises ten rotor slots 820 to 829, one more, rather than one less, rotor slot than there are stator slots in the single-collection assembly of stator slots 1 to 9.

The rotor phase winding disposed in the rotor slots 820 to 829 of Fig. 36 is shown constituted of five separate and independent endless-conductor circuits 850, 851, 852, 892 and 894, each disposed in only two diametrically oppositely disposed slots of the rotor 840, and all assumed to be of substantially the same resistance. The endless-conductor circuit 850 is shown disposed in the diametrically oppositely disposed rotor slots 820 and 825, the endless-conductor circuit 892 in the oppositely disposed rotor slots 821 and 826, the endless-conductor circuit 851 in the oppositely disposed rotor slots 822 and 827, the endless-conductor circuit 894 in the oppositely disposed rotor slots 823 and 828, and the endless-conductor circuit 852 in the oppositely disposed rotor slots 824 and 829. The portion of the endless-conductor circuit 850 disposed behind the rotor 840 is indicated in Fig. 36 by dashed lines. Although not indicated in Fig. 36, portions of the endless-conductor circuits 851, 852, 892 and 894 are disposed similarly behind the rotor 840.

It may be shown that, in each of the plurality of series circuits of such a rotor phase winding, the induced voltages add to produce a resultant voltage of substantially the same phase and frequency as the composite voltage induced in a corresponding rotor phase winding comprising a single series circuit of the same constituent conductor groups. The five endless-conductor circuits, though the voltages therein are each the resultant of only two induced component voltages, together constitute a single rotor phase winding, fully the equivalent of, and functioning in exactly the same manner as, the single endless-conductor rotor phase winding 270.

In the absence of an additional rotor phase winding, however, as already explained, the induction motor diagrammatically illustrated in Fig. 36 will not operate. It has already been made clear that at least one further rotor phase winding is required in order to produce the polyphase rotor current and the accompanying rotating magnetic field.

In Figs. 33 and 34, the rotor 840 is shown provided with two two-collection assemblies of rotor slots 820 to 839 and 1020 to 1039. The two-collection assembly of rotor slots 820 to 839 comprises the positive collection of rotor slots 820 to 829, heretofore described, and a further duplicate negative collection of rotor slots 830 to 839. Similarly, the two-collection assembly of rotor slots 1020 to 1039 comprises the positive collection of rotor slots 1020 to 1029 and a duplicate negative collection of rotor slots 1030 to 1039.

The two-collection assembly of rotor slots 820 to 839 of the rotor 840 of Fig. 34 is shown provided with a rotor phase winding comprising ten substantially like endless-conductor circuits 850 to 859. The endless-conductor circuits 850, 851 and 852 are shown disposed in the same rotor slots as the similarly numbered endless-conductor circuits of Fig. 36. The endless-conductor circuit 853 is shown in Fig. 34 disposed in the rotor slots 826 and 831; the endless-conductor circuit 854, in the rotor slots 828 and 833; the endless-conductor circuit 855, in the rotor slots 830 and 835; the endless-conductor circuit 856, in the rotor slots 832 and 837; the endless-conductor circuit 857, in the rotor slots 834 and 839; the endless-conductor circuit 858, in the rotor slots 821 and 836; and the endless-conductor circuit 859, in the rotor slots 823 and 838.

A similar rotor phase winding comprising the endless-conductor circuits 1050 to 1059 is shown disposed in the two-collection assembly of rotor slots 1020 to 1039. The endless-conductor circuit 1050 is shown disposed in the rotor slots 1020 and 1025; the endless-conductor circuit 1051, in the rotor slots 1022 and 1027; the endless-conductor circuit 1052, in the rotor slots 1024 and 1029; the endless-conductor circuit 1053, in the rotor slots 1026 and 1031; the endless-conductor circuit 1054, in the rotor slots 1028 and 1033; the endless-conductor circuit 1055, in the rotor slots 1030 and 1035; the endless-conductor circuit 1056, in the rotor slots 1032 and 1037; the endless-conductor circuit 1057, in the rotor slots 1034 and 1039; the endless-conductor circuit 1058, in the rotor slots 1021 and 1036; and the endless-conductor circuit 1059, in the rotor slots 1023 and 1038.

Each of the twenty endless-conductor circuits 850 to 859 and 1050 to 1059 is disposed in equiangularly-spaced rotor slots, one an odd-numbered and the other an even-numbered rotor slot, of a collection of rotor slots. This includes the condition wherein, for purposes of symmetry, some of the endless-conductor circuits, such as the endless-conductor circuits 853, 1053, 854, 1054, 858, 1058, 859 and 1059, are wound in one slot of one collection of rotor slots, and in a second slot, not a rotor slot of the same collection of rotor slots equiangularly spaced thereto, but rather in a slot of the other collection of rotor slots corresponding to that equiangularly-spaced rotor slots.

The currents through the phase 1 and phase 2 rotor windings respectively comprising the endless-conductor circuits 850 to 859 and 1050 to 1059 are displaced $\pi/2$ or 90 degrees, and therefore produce a rotating magnetic field in the rotor 840 of twenty poles of alternately opposite polarity. This rotating magnetic field cooperates with the alternating magnetic fluxes of the stator magnetic circuits to produce torque in the rotor element in the counterclockwise direction, the direction of the phase sequence.

Since the endless-conductor circuits shown in Figs. 34 and 36 each comprises a single endless loop, they may be tied to a common point or ground, without affecting the operation. It is therefore possible, as shown more particularly in Fig. 33, to fabricate these endless-conductor circuits all in the shape of a U, the arms of which may be connected to a common end plate 842 disposed in back of the rotor 840.

Although the resultant of the component voltages induced in equiangularly-spaced rotor slots of each collection of rotor slots of the rotor 262 of Figs. 1 to 8, 27 and 28 is similarly of the same phase as the composite voltage induced in a corresponding complete series circuit of the conductor groups disposed in each such collection of rotor slots, it is not possible to provide rotor phase windings comprising simple endless-conductor circuits, similar to the endless-conductor circuits 850 to 859 and 1050 to 1059 of Fig. 34, for the reason that the direction of winding in equiangularly-spaced rotor slots of each collection of rotor slots of the rotor 262 of Figs. 1 to 8, 27 and 28 is the same, rather than opposite, as in Fig. 36.

Rotation of either the rotor 262 of Figs. 1 to 8, the rotor 840 of Figs. 33, 34 and 36, the rotor 735 of Fig. 22, or the rotor 263 of Fig. 37 effects modulation of the voltages induced in the rotor phase-winding conductor groups with the result that, between zero and synchronous speed, they are of irregular wave form. Despite the irregular wave form, however, the voltages induced in the conductor groups of each rotor phase winding, or in the circuits comprising each rotor phase winding, combine into a composite voltage of regular wave form the amplitude and the frequency of which decrease linearly to zero when the rotor speed is increased linearly to theoretical synchronous speed.

Although their sum, the composite voltage, is thus equal to zero at synchronous speed, the voltages induced in the individual conductor groups of each rotor phase winding are not equal to zero. At synchronous speed, they are of regular wave form and of a frequency equal to $$\left(2+\frac{4}{n-2}\right)x \text{ line frequency}$$

when the number of rotor slots of each collection of rotor slots is equal to one less than the number of stator slots of each collection of stator slots, and to $$\left(2-\frac{2}{n+2}\right)x \text{ line frequency}$$

when the number of rotor slots of each collection of rotor slots is equal to one more than the number of stator slots of each collection of stator slots, where $n$ is again the number of stator slots of the two-collection assembly of stator slots. Furthermore, at synchronous speed, the voltages induced in the conductor groups of each rotor phase winding, or the circuits comprising each rotor phase winding, are equally phase-displaced over a total range of $2\pi$ or 360 degrees times the number of collections. It is only because the voltages induced in the conductor groups of each rotor phase winding are equally phase-displaced that, at synchronous speed, the respective composite voltages are equal to zero.

Each rotor phase winding of the present invention may accordingly be tapped to provide a voltage output of higher-than-line frequency. In Fig. 29, for example, the rotor 262 of Fig. 5 is reproduced with lead conductors 1139 and 1142 respectively connected to diametrically oppositely disposed points 1140 and 1141 of the rotor phase winding 270. The diametrically oppositely disposed points 1140 and 1141 are shown radially alined with the respective rotor slots 23 and 27 to indicate schematically that the lead conductors 1139 and 1142 are connected to the theoretical centers of the conductor groups disposed in the respective rotor slots 23 and 27. The other ends of the lead conductors 1139 and 1142 are shown connected to respective slip rings 1138 and 1143, respectively contacted by the brushes 1137 and 1144. Additional conductors 1136 and 1145 respectively connect the brushes 1137 and 1144 to the terminals 1135 and 1146 of an external load.

With an external load connected to the terminals 1135 and 1146, a load current will flow, during one half of the cycle, in the direction indicated by the arrows, from the terminal point 1135, by way of the conductor 1136, the brush 1137, the slip ring 1138 and the conductor 1139, to the connection point 1140 of the rotor phase winding 270. At this connection point 1140, the current will divide, part going through the upper half of the conductor group disposed in the rotor slot 23, the conductor groups disposed in the rotor slots 24 to 26 and the upper half of the conductor group disposed in the rotor slot 27, to the diametrically opposite connection point 1141 of the rotor phase winding 270. The other part of the current will go through the lower half of the conductor group disposed in the rotor slot 23, the conductor groups disposed in the rotor slots 22, 21 and 28, and the lower half of the conductor group disposed in the rotor slot 27, to the same connection point 1141. From the connection point 1141, the combined currents will continue, by way of the conductor 1142, the slip ring 1143, the brush 1144 and the conductor 1145, to the other terminal 1146. During the other half of the cycle, of course, the current will flow in the opposite direction.

The rotor 262 of Fig. 29, like the rotor 262 of Fig. 5, is not shown provided with the additional single-collection assembly of rotor slots 321 to 336 and the rotor phase winding 269. For purposes of clarity, they are shown in Fig. 8, and reproduced in Fig. 31. In Fig. 31, lead conductors 1151 and 1154 are shown connected to diametrically oppositely disposed connection points 1152 and 1153 of the rotor phase winding 269. These diametrically oppositely disposed connection points 1152 and 1153 are shown radially alined with the rotor teeth 965 and 969 to indicate schematically that the lead conductors 1151 and 1154 are connected betwen the conductor groups disposed in the rotor slots 322 and 323 and 326 and 327, respectively. The other ends of the lead conductors 1151 and 1154 are connected to the slip rings 1150 and 1155, contacted by the brushes 1149 and 1156, respectively. Conductors 1148 and 1157 connect the brushes 1149 and 1156 to load terminals 1147 and 1158, respectively.

With an external load connected across the terminals 1147 and 1158 of Fig. 31, a load current flows, during one-half the cycle, in the direction indicated by the arrows, from the terminal point 1147, by way of the conductor 1148, the brush 1149, the slip ring 1150 and the conductor 1151, to the connection point 1152. At the connection point 1152, the current divides, part going through the branch comprising the conductor groups of the rotor phase winding 269 disposed in the rotor slots 323 to 326, and the other part through the branch comprising the conductor groups disposed in the rotor slots 322, 321, 328 and 327, to the diametrically oppositely disposed connection point 1153. From the connection point 1153, the current will flow, by way of the conductor 1154, the slip ring 1155, the brush 1156 and the conductor 1157, to the load terminal 1158.

It has already been explained that the showing of the rotor phase windings 270 and 269 of Figs. 29 and 31 is diagrammatic, and that the single conductors thereof disposed in the various rotor slots 21 to 36 and 321 to 336, respectively, may each represent a large number of conductors, though with the same number of conductors disposed in the conductor group of each rotor slot. Corresponding practical examples of parallel-circuit frequency-converter connections of the type diagrammatically illustrated in Figs. 29 and 31 will now be described in connection with the two-collection assemblies of Figs. 30 and 32, respectively.

In Fig. 30, the conductor 1139, which is connected to the connection point 1140 of the conductor 924, between the coils 923 and 925, connects to the center of the conductor group disposed in the rotor slot 23, in the same manner as schematically illustrated in connection with the corresponding conductor group of the rotor phase winding 270 of Fig. 29. From the connection point 1140, one branch of the parallel circuit may be traced through the coil 925, disposed in the rotor slots 23 and 24, by way of the conductor 926, through the coil 927, disposed in the rotor slots 24 and 25, by way of the conductor 928, through the coil 929, disposed in the rotor slots 25 and 26, and, by way of the conductor 930, through the coil 931, disposed in the rotor slots 26 and 27. The branch circuit then continues through the corresponding coils and conductors of the negative collection. It may be traced from the coil 931, by way of the conductor 932, through the coil 933, disposed in the rotor slots 31 and 32, by way of the conductor 934, through the coil 935, disposed in the rotor slots 32 and 33, by way of the conductor 936, through the coil 937, disposed in the rotor slots 33 and 34, by way of the conductor 938, through the coil 939, disposed in the rotor slots 34 and 35, and, by way of the conductor 940, to the connection point 1141. In this branch of the parallel circuit of Fig. 30, as in the corresponding branch circuit schematically shown in Fig. 29, there is included half the conductor group disposed in the rotor slot 23, the conductor groups disposed in the rotor slots 24 to 26, and half the conductor group disposed in the rotor slot 27. Also included in this branch of the parallel circuit of Fig. 30 are the corresponding conductor groups and halves thereof of the negative collection, namely, half the conductor group disposed in the rotor slot 31, the conductor groups disposed in the rotor slots 32 to 34, and half the conductor group disposed in the rotor slot 35.

The other branch of the parallel circuit of Fig. 30 may be traced from the connection point 1140, through the coil 923, disposed in the rotor slots 22 and 23, by way of the conductor 922, through the coil 921, disposed in the rotor slots 21 and 22, by way of the conductor 920, through the coil 951, disposed in the rotor slots 21 and 36, and, by way of the conductor 950, through the coil 949, disposed in the rotor slots 35 and 36. From the coil 949, this other branch of the parallel circuit continues, by way of the conductor 948, through the coil 947, disposed in the rotor slots 30 and 31, by way of the conductor 946, through the coil 945, disposed in the rotor slots 29 and 30, by way of the conductor 944, through the coil 943, disposed in the rotor slots 28 and 29, and, by way of the conductor 942, through the coil 941, disposed in the rotor slots 27 and 28, to the same connection point 1141. In this branch of the parallel circuit, the conductor groups disposed in the rotor slots 21 and 22, half the conductor group disposed in each of the rotor slots 23 and 27, and the conductor group disposed in the rotor slot 28 are connected in series in the same manner as indicated schematically in Fig. 29. In Fig. 30, the corresponding conductor groups of the negative collection, the conductor groups disposed in the rotor slots 29 and 30, half the conductor group disposed in each of the rotor slots 31 and 35, and the conductor group disposed in the rotor slot 36 are also included in this branch of the parallel circuit. The connections from the points 1140 and 1141 to the respective terminals 1135 and 1146 are the same in Fig. 30 as in Fig. 29.

The rotor phase winding of Fig. 32, which similarly corresponds to the rotor phase winding 269, is provided with connection points 1152 and 1153 corresponding to the similarly identified connection points of Fig. 31. In Fig. 32, as in Fig. 31, the connection point 1152 lies between the conductor groups disposed in the rotor slots 322 and 323. The conductor groups disposed in the rotor slots 323 to 326, as well as the corresponding conductor groups of the negative collection disposed in the rotor slots 331 to 334, are connected into one branch of the parallel circuit, and the conductor groups disposed in the rotor slots 321, 322, 327 and 328, as well as the conductor groups disposed in the rotor slots 329, 330, 335 and 336 of the negative collection, are connected into the other branch of the parallel circuit.

From the connection point 1152 of Fig. 32, the said one branch of the parallel circuit may be traced, by way of the conductor 1174, through the coil 1175, disposed in the rotor slots 323 and 334, by way of the conductor 1176, through the coil 1177, disposed in the rotor slots 324 and 333, by way of the conductor 1178, through the coil 1179, disposed in the rotor slots 325 and 332, and, by way of the conductor 1180, through the coil 1181, disposed in the rotor slots 326 and 331, to the connection point 1153 of the conductor 1182. The said other branch of the parallel circuit of Fig. 32 may be traced from the connection point 1152, by way of the conductor 1174, through the coil 1173, disposed in the rotor slots 322 and 327, by way of the conductor 1172, through the coil 1171, disposed in the rotor slots 321 and 328, by way of the conductor 1170, through the coil 1185, disposed in the rotor slots 329 and 336, and, by way of the conductor 1184, through the coil 1183, disposed in the rotor slots 330 and 335, to the same connection point 1153. The connections from the points 1152 and 1153 to the respective terminals 1147 and 1158 are the same as described in connection with Fig. 31.

The rotor phase windings of Figs. 29 and 30, and of Figs. 31 and 32, function in exactly the same manner as the rotor phase windings 270 and 269, respectively, of Figs. 1, 3 to 8, 27 and 28, irrespective of whether a load is or is not connected to the terminals 1135 and 1146 and 1147 and 1158.

In an experimental machine, it has been found that the voltages which appear at the terminals 1135 and 1146 and 1147 and 1158 are equally phase-displaced at all rotor speeds, and that their frequency decreases linearly with respect to line frequency as the rotor speed decreases linearly to zero. The amplitudes of the voltages which appear at these terminals, on the other hand, have been found to remain substantially constant from synchronous speed down to approximately ¼ of synchronous speed.

The invention is not restricted to use with only single assemblies of stator slots, nor to assemblies of stator slots equiangularly spaced throughout only $2\pi$ or 360 degrees. In Fig. 23, for example, the stator 19 is shown provided with two assemblies of stator slots: first, the previously described single-collection assembly of nine stator slots 1 to 9; and, secondly, the stator slots of an additional single-collection assembly of nine stator slots 1(2) to 9(2). These two assemblies function in exactly the same manner. Each stator slot of each of these two single-collection assemblies of stator slots lies midway between two stator slots of the other assembly of stator slots. For reasons which will presently appear, the stator slots 1(2) to 9(2) of Fig. 23 are disposed diametrically opposite to the stator slots 1 to 9, respectively.

The single-collection assembly of stator slots 1 to 9 is provided with the same positive reference zero line +Z. L. and the same positive reference center line + ₵ in Fig. 23 as in Fig. 5. The positive reference zero line +Z. L. is shown radially disposed midway between the stator slots 1 to 9 and the positive reference center line + ₵ is shown radially alined with the central stator slot 5.

The single-collection assembly of stator slots 1(2) to 9(2) of Fig. 23 is similarly provided with a positive reference zero line +Z. L. (2) radially disposed midway between the stator slots 1(2) and 9(2) and with a positive reference center line + ₵ (2) radially alined with the central stator slot 5(2).

The stator slots of each of the assemblies of stator slots 1 to 9 and 1(2) to 9(2) may be provided with phase windings similar to those of Figs. 3, 4 and 7 or they may be provided with distributed phase windings similar to those of Figs. 1, 5, 6, 8, 9, 11, 14 to 16 and 21. If distributed phase windings are used, the reference lines shown in Fig. 23 may constitute the reference lines for the phase 1 distributed phase windings, and additional reference lines may be selected for the other distributed phase windings, as previously explained. The conductor groups of such phase 1 distributed phase windings are shown disposed in the stator slots of the assemblies of stator slots 1 to 9 and 1(2) to 9(2). Additional conductor groups would be required for each of the other phase windings.

When the stator 19 is provided with two assemblies of stator slots, the stator slots of each assembly of stator slots are separated by a stator slot of the other assembly of stator slots and two stator teeth. In Fig. 23, for example, the stator slots 5 and 6 of the single-collection assembly of stator slots 1 to 9 are separated by the stator slot 1(2) of the single-collection assembly of stator slots 1(2) to 9(2) and two stator teeth 46—41 and 46—42. However, considering the two assemblies as separate entities, the two stator teeth between each two stator slots of an assembly of stator slots perform the same function as would a single stator tooth similarly disposed. The stator teeth 46—41 and 46—42 of Fig. 23 perform exactly the same function with respect to the stator slots of the single-collection assembly of stator slots 1 to 9 as the stator tooth 46 of Figs. 5 and 8.

Furthermore, because the assembly of stator slots 1(2) to 9(2) of Fig. 23 is a duplicate of the assembly of stator slots 1 to 9, except that they are in a different orientation, there are two stator teeth which perform a similar function with respect to this additional assembly of stator slots 1(2) to 9(2) also. To maintain the functional reference, each stator tooth in Fig. 23 is identified by means of two numbers separated by a dash. The number before the dash is the number of the equivalent stator tooth with respect to the assembly of stator slots 1 to 9, and the number after the dash is the number of the equivalent stator tooth with respect to the assembly of stator slots 1(2) to 9(2), as determined by their similarity in function to the stator teeth shown in Figs. 5 and 8. For example, the stator teeth 46—41 and 46—42, in Fig. 23, bear the same relation to the assembly of stator slots 1 to 9 and the stator teeth 41—46 and 42—46 to the assembly of stator slots 1(2) to 9(2) as does the single stator tooth 46 to the assembly of stator slots 1 to 9 in Figs. 5 and 8.

To maintain the same functional reference with respect to both assemblies of stator slots 1 to 9 and 1(2) to 9(2), each rotor slot is identified also by two numbers separated by a dash. The first number indicates the relation of the rotor slot with respect to the assembly of stator slots 1 to 9 and the second number, the relation of the rotor slot with respect to the assembly of stator slots 1(2) to 9(2). Thus, in Fig. 23, the rotor slot 25—21 performs with respect to the assembly of stator slots 1 to 9, and the rotor slot 21—25 with respect to the assembly of rotor slots 1(2) to 9(2), in the same manner as does the rotor slot 25 of Fig. 5 with respect to the assembly of stator slots 1 to 9. In Fig. 23, therefore, corresponding stator slots, corresponding stator teeth and corresponding rotor slots, as well as corresponding geometric reference lines of the respective single collections are displaced $\pi$ or 180 degrees.

Each of the stator slots of the additional single-collection assembly of stator slots 1(2) to 9(2), like each of the stator slots of the single-collection assembly of stator slots 1 to 9, is encircled by a magnetic circuit and the magnetic circuits are energized by the polyphase current supplied to the sinusoidally-distributed polyphase winding disposed in the stator slots 1(2) to 9(2) in the same manner as previously described in connection with Figs. 1, 5, 6, 8, 9, 14 to 16 and 21. A single-unit core must necessarily be used to provide continuity for all the magnetic circuits of both assemblies of magnetic circuits.

The alternating magnetic fluxes encircling the stator slots 1(2) to 9(2), like the alternating magnetic fluxes encircling the stator slots 1 to 9, induce component voltages in the rotor phase-winding conductor groups disposed in the rotor slots 21 to 36 and 321 to 336. Furthermore, the component voltages induced by the alternating magnetic fluxes encircling the stator slots 1(2) to 9(2) are identical with the component voltages induced by the alternating magnetic fluxes encircling the stator slots 1 to 9. However, because the two assemblies of stator slots 1 to 9 and 1(2) to 9(2) are displaced $\pi$ or 180 degrees in the single-collection arrangement of Fig. 23, the said identical voltages are induced in rotor phase-winding conductor groups disposed in rotor slots which are displaced $\pi$ or 180 degrees.

In the conductor group disposed in any rotor slot of Fig. 23, identified by the two rotor slot numbers separated by a dash, voltages are induced which are similar to the voltages induced in the conductor groups disposed in the separate rotor slots of Figs. 1 to 8, 27 and 28, identified each by one of the said two rotor slot numbers. The total component voltages induced one in each of the conductor groups respectively disposed in the rotor slots 21—25 to 28—24 of Fig. 23, like the resultant voltage induced in the conductor groups disposed in equiangularly-spaced rotor slots of each collection of rotor slots, are therefore substantially alike and of the same phase as the voltage induced in a corresponding rotor phase winding comprising the conductor groups disposed in all the rotor slots of the particular assembly of rotor slots. Furthermore, at synchronous speed, the voltages induced in the individual conductors are equal to zero. Similar remarks, of course, apply to the voltages induced in the conductor groups disposed in the rotor slots 321—325 to 328—324 of Fig. 23.

It is therefore not necessary that the conductors disposed in the assemblies of rotor slots 21—25 to 28—24 and 321—325 to 328—324 be connected into separate insulated rotor phase windings. They may constitute, instead, for example, the conducting bars of a squirrel-cage rotor winding 185, as shown in Fig. 35. In this uninsulated squirrel-cage rotor winding 185, the currents produced by the above-described induced voltages are confined to the desired paths, and a rotating magnetic field is produced in the same manner as previously described. This rotating magnetic field cooperates with the alternating magnetic fluxes encircling both assemblies of stator slots 1 to 9 and 1(2) to 9(2) to produce torque in the rotor element. Furthermore, because the two assemblies of rotor slots 1 to 9 and 1(2) to 9(2) are displaced $\pi$ or 180 degrees, corresponding to an electric displacement of $\pi/2$ or 90 degrees, substantial torque is produced throughout the circumference and throughout the electric cycle.

A further modification, somewhat similar to the modification described in connection with Fig. 23, is illustrated by Fig. 24. Fig. 24 illustrates the same single-collection assembly of nine stator slots 1 to 9 of Fig. 5, but equiangularly spaced over a total geometric angle equal to $4\pi$ or 720 degrees, rather than $2\pi$ or 360 degrees. When the stator slots of the single-collection assembly of stator slots 1 to 9 are thus equiangularly spaced throughout $4\pi$ or 720 degrees, each pair of consecutively numbered stator slots becomes separated by two stator teeth and a further stator slot. The rotor slots, on the other hand, become superposed, so that the number of rotor slots and induced rotor poles is reduced by a factor of two. The various parts of the single-collection assembly still function as they do in the induction machine illustrated by Fig. 5, although the synchronous speed is increased, due to the reduction in the number of induced rotor poles. The two stator teeth between each pair of consecutively numbered stator slots performs the same function as the corresponding stator tooth of Fig. 5. Furthermore, since each stator tooth of Fig. 24 is disposed between two pairs of different consecutively numbered stator slots, each stator tooth performs two functions. To maintain the functional reference in Fig. 24, as in Fig. 23, each stator tooth is identified by two numbers separated by a dash. Each rotor slot is also identified in Fig. 24 by two numbers separted by a dash, for each rotor slot and the conductor group disposed therein performs the functions of the two rotor slots which are indicated by the two respective numbers and the conductor groups disposed therein.

The induction machine illustrated in Fig. 23 is provided with two diametrically opposed like single-collection assemblies, and it is therefore magnetically balanced. The magnetic balance of the single-collection assembly of Fig. 24, on the other hand, although improved over that of the single-collection assembly of Fig. 5, is nevertheless not complete.

The induction machine illustrated by Fig. 24 is not limited to a single-collection assembly of only nine stator slots and a corresponding single-collection assembly of only nine stator magnetic circuits. Additional similar single-collection assemblies of stator slots and magnetic circuits may be provided, preferably equiangularly spaced with respect to the collection of stator slots and magnetic circuits shown; and, furthermore, each assembly of stator slots or magnetic circuits may comprise more than one collection. In a particular arrangement, of course, each assembly must comprise the same number of collections and the same number of stator slots or magnetic circuits, respectively, and each assembly of stator slots must be provided with a suitable polyphase winding, as previously described. Nor is the induction machine of the present invention limited to assemblies of stator slots and corresponding assemblies of magnetic circuits equiangularly spaced throughout only 2π or 360 or 4π or 720 degrees. They may be equiangularly spaced, in a similar manner, throughout any desired integral number of times 2π or 360 degrees. However, to avoid superposition of stator slots or magnetic circuits of each assembly of stator slots or magnetic circuits, and to provide the desired superposition of the rotor slots and rotor induced magnetic poles, the said integral number must not be a factor of the number of stator slots or magnetic circuits of each assembly of stator slots or magnetic circuits, respectively, and it must be a factor of the number of rotor slots of each assembly of rotor slots.

Accordingly, when the stator slots of each assembly of stator slots, or the magnetic circuits of each assembly of magnetic circuits, are disposed at positions sequentially separated in the same angular direction by an angle substantially equal to 2π or 360 degrees multiplied by an integral number, not a factor of the number of stator slots or magnetic circuits of each assembly of stator slots or magnetic circuits, divided by the number of stator slots or magnetic circuits of each assembly of stator slots or magnetic circuits, respectively, the number of rotor slots of each assembly of rotor slots must be equal to a number which, multiplied by the said integral number, is equal to the number of stator slots of each assembly of stator slots, or the number of magnetic circuits of each assembly of magnetic circuits, plus or minus the number of collections of stator slots or magnetic circuits of each assembly of stator slots or magnetic circuits, respectively.

In the case of Fig. 24, for example, the integral number is 2, which is not a factor of nine, the number of stator slots in the single-collection assembly of stator slots. The stator slots of the assembly of stator slots are disposed at positions sequentially separated by an angle 80 degrees. This angle 80 degrees is 2π or 360 degrees multiplied by this factor 2, and divided by 9, the number of stator slots in the assembly of stator slots. The number of rotor slots of each assembly of rotor slots is 4, which, multiplied by the said integral number 2, is equal to the number 9 of stator slots of the assembly of stator slots 1 to 9, minus 1, the number of collections in the assembly of stator slots.

It has heretofore been proposed to employ polyphase windings comprising sinusoidally distributed phase windings, but these have involved either bipolar machines or machines having multiples of two poles with a relatively large number of coils and slots per pole and attendant winding, punching and insulation difficulties. To decrease the winding and insulation difficulties of three-phase machines of this character, it has been proposed to restrict the distribution of the phase windings to provide the coils of only two phase windings in each slot, still retaining the said large number of slots. These proposals have been of such nature that the advantages of the sinusoidal distribution have been lost.

According to the present invention, on the other hand, these difficulties are substantially entirely overcome. There is practically one slot corresponding to each pole. In the machine illustrated in Fig. 1, for example, there are only 18 stator slots corresponding to 16 rotor poles. The winding and insulation difficulties are decreased by a large factor, and the sinusoidal distribution, moreover, is rigidly maintained. The induction machine of the present invention, therefore, has all the advantages associated with other polyphase machines of a large number of poles, with additional advantages absent from present-day machines.

With the decrease in the number of primary-element slots, the cost of the laminations is lower, less slot insulation is required and there are fewer coils to wind, all of which decrease the cost of the machine. The field of application is broader, for the invention makes it possible to build polyphase induction machines for higher frequency-to-speed ratios. This is because the mechanical design is not restricted by the presence of a large number of primary-element slots.

It has been explained, in connection with Fig. 2, that the primary-element core may be built in sections, each section providing a circuit for the magnetic flux encircling one primary-element slot. Each lamination may therefore be small and there is no need for careful overlapping and butting of laminations to provide continuity, as in present-day induction machines. Large induction machines of this nature may be built in sections and the assembly may be completed at the point of installation. This is particularly true if simple primary-element phase windings, similar to the phase windings $1d$ to $18d$ of Figs. 3 and 4, are used.

The sinusoidally distributed polyphase winding, as has been described in detail, provides the desired sinusoidal operation under all conditions of balanced load. Of even greater importance, with regard to large machines, is the recognition of the fact that this sinusoidally distributed polyphase winding provides a means for transforming from a substantially sinusoidal polyphase electric system of a small number of phases to a polyphase magnetic system of a greater number of phases and the further fact that this transformation need not be accomplished in the induction machine where distributed windings are difficult to insulate. By eliminating distributed windings, large induction machines embodying the present invention may be greatly simplified and the power output increased by a large factor.

Further modifications will occur to persons skilled in the art, and all such are intended to be included within the spirit and scope of the invention, as defined in the appended claims.

What is claimed is:

1. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of phase windings each having a number of primary-element conductor groups substantially equal to the number of primary-element slots, a primary-element conductor group of each phase winding being disposed substantially in each primary-element slot, the numbers of conductors of the primary-element conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of primary-element slots at angular increments each substantially equal to the said total range divided by the number of primary-element slots, the respective total ranges being displaced with respect to one another an angular amount substantially equal to the phase displacement of the phase windings, the directions of winding of the conductors of the primary-element conductor groups of each phase winding changing alternately with, and with the negative of, the sign of the said alternating function, the primary-element conductor groups of the respective phase windings being connected in series along the said directions of winding, the secondary element having means for producing, by induction from the primary element, a magnetic field, rotating with respect to the said secondary element, of substantially equiangularly spaced poles of alternately opposite polarity equal in number to the number of primary-element slots plus or minus the number of collections of primary-element slots.

2. An induction machine having, in combination, stator and rotor elements, one a primary and the other a secondary element, the primary element having means for producing a plurality of substantially like magnetic systems, stationary with respect to the said primary element, each of the same number of substantially equiangularly spaced magnetic fluxes of alternately opposite polarity substantially equally phase-displaced, disregarding the alternately opposite polarity, over a total range substantially equal to the same multiple of 180 degrees, and the secondary element having means cooperating with the magnetic fluxes to produce torque in the rotor element.

3. An induction machine having, in combination, stator and rotor elements, one a primary and the other a secondary element, the primary element having a magnetizable core provided with one or more substantially like assemblies, stationary with respect to the said primary element, of substantially equiangularly spaced primary-element slots, each assembly comprising the same number one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said alternating function, the conductor groups of the respective phase windings being connected in series along the said directions of winding, and the secondary element having means for producing, by induction from the primary element, a magnetic field, rotating with respect to the said secondary element, of substantially equiangularly spaced poles of alternately opposite polarity equal in number to the number of slots of each assembly of primary-element slots plus or minus the number of collections of slots of each assembly of primary-element slots.

4. An induction machine having, in combination, stator and rotor elements, one a primary and the other a secondary element, the primary element having means for producing a magnetic system, stationary with respect to the said primary element, of substantially equiangularly spaced magnetic fluxes of alternately opposite polarity substantially equally phase-displaced, disregarding the alternately opposite polarity, over a total range substantially equal to a multiple of 180 degrees, and the secondary element having means for producing in the said secondary element, by induction from the said alternating magnetic fluxes, a magnetic field, rotating with respect to the said secondary element, of substantially equiangularly spaced poles of alternately opposite polarity equal in number to the number of magnetic fluxes plus or minus the said multiple.

5. An induction machine having, in combination, stator and rotor elements, one a primary and the other a secondary element, the primary element having means for producing one or more substantially like magnetic systems, stationary with respect to the said primary element, each of the same number of substantially equiangularly spaced magnetic fluxes of alternately opposite polarity substantially equally phase-displaced, disregarding the alternately opposite polarity, over a total range substantially equal to the same multiple of 180 degrees, and the secondary element having means for producing in the said secondary element, by induction from the said alternating magnetic fluxes, a magnetic field, rotating with respect to the said secondary element, of substantially equiangularly spaced poles of alternately opposite polarity equal in number to the number of magnetic fluxes of each system of magnetic fluxes plus or minus the said multiple.

6. An induction machine having, in combination, stator and rotor elements, one a primary and the other a secondary element, the primary element having means for producing a magnetic system, stationary with respect to the said primary element, of magnetic fluxes of alternately opposite polarity at positions sequentially separated in the same angular direction by an angle substantially equal to 360 degrees multiplied by an integral number, not a factor of the number of magnetic fluxes, divided by the number of magnetic fluxes, the magnetic fluxes being substantially equally phase-displaced, disregarding the alternately opposite polarity, over a total range substantially equal to a multiple of 180 degrees, and the secondary element having means for producing in the said secondary element, by induction from the said alternating magnetic fluxes, a magnetic field, rotating with respect to the said secondary element, of substantially equiangularly spaced poles of alternately opposite polarity equal in number to a number which, multiplied by the said integral number, is equal to the number of magnetic fluxes plus or minus the said multiple.

7. An induction machine having, in combination, stator and rotor elements, one a primary and the other a secondary element, the primary element having means for producing one or more substantially like magnetic systems, stationary with respect to the said primary element, each of the same number of magnetic fluxes of alternately opposite polarity at positions sequentially separated in the same angular direction by an angle substantially equal to 360 degrees multiplied by an integral number, not a factor of the number of magnetic fluxes of each system of magnetic fluxes, divided by the number of magnetic fluxes of each system of magnetic fluxes, the magnetic fluxes of each system of magnetic fluxes being substantially equally phase-displaced, disregarding the alternately opposite polarity, over respective total ranges each substantially equal to the same multiple of 180 degrees, and the secondary element having means for producing in the said secondary element, by induction from the said alternating magnetic fluxes, a magnetic field, rotating with respect to the said secondary element, of substantially equiangularly spaced poles of alternately opposite polarity equal in number to a number which, multiplied by the said integral number, is equal to the number of magnetic fluxes of each system of magnetic fluxes plus or minus the said multiple.

8. An induction machine having, in combination, stator and rotor elements, one a primary and the other a secondary element, the primary element having means for producing a magnetic system, stationary with respect to the said primary element, of an assembly of substantially equiangularly spaced magnetic circuits comprising one or more collections each of substantially the same number of magnetic circuits, means for supplying a component magnetomotive force from and corresponding to each phase of a polyphase electric system to, and reacting to produce a component voltage for and corresponding to each phase of the polyphase electric system in, each magnetic circuit, the peak amplitudes of the component magnetomotive forces and the component voltages corresponding to the respective phases of the polyphase electric system being substantially proportional to the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another, respective angular amounts substantially equal to the phase displacement of the phases of the polyphase electric system, means for changing the polarities of the component magnetomotive forces and the component voltages corresponding to each phase of the polyphase electric system alternately with, and with the negative of, the sign of the said sine and for combining the said component voltages, in the said polarities, into composite voltages, one corresponding to each phase of the polyphase electric system, and the secondary element having means cooperating with the magnetic circuits to produce in the said secondary element, by induction, a magnetic field, rotating with respect to the said secondary element, of substantially equiangularly spaced poles of alternately opposite polarity equal in number to the number of magnetic circuits plus or minus the number of collections of magnetic circuits.

9. An induction machine having, in combination, stator and rotor elements, one a primary and the other a secondary element, the primary element having means for producing a magnetic system, stationary with respect to the said primary element, comprising one or more substantially like assemblies, each of the same number, of substantially equiangularly spaced magnetic circuits, each assembly comprising the same number of one or more collections each of substantially the same number of magnetic circuits, means for supplying a component magnetomotive force from and corresponding to each phase of a polyphase electric system to, and reacting to produce a component voltage for and corresponding to each phase of the polyphase electric system in, each magnetic circuit, the peak amplitudes of the component magnetomotive forces and the component voltages corresponding to the respective phases of the polyphase electric system being substantially proportional to the absolute values of the sine over a total range substantially equal to 180 degrees multiplied by the number of collections of magnetic circuits of each assembly of magnetic circuits at angular increments each substantially equal to the said total range divided by the number of magnetic circuits of each assembly of magnetic circuits, the respective total ranges of the respective assemblies of magnetic circuits being displaced with respect to one another respective angular amounts substantially equal to the phase displacement of the phases of the polyphase electric system, means for changing the polarities of the component magnetomotive forces and the component voltages corresponding to each phase of the polyphase electric system alternately with, and with the negative of, the sign of the said sine and for combining the said component voltages, in the said polarities, into composite voltages, one corresponding to each phase of the polyphase electric system, and the secondary element having means cooperating with the magnetic circuits to produce in the said secondary element, by induction, a magnetic field, rotating with respect to the said secondary element, of substantially equiangularly spaced poles of alternately opposite polarity equal in number to the number of magnetic circuits of each assembly of magnetic circuits plus or minus the number of collections of magnetic circuits of each assembly of magnetic circuits.

10. An induction machine having, in combination, stator and rotor elements, one a primary and the other a secondary element, the primary element having means for producing a magnetic system, stationary with respect to the said primary element, comprising one or more substantially like assemblies, each of the same number, of magnetic circuits at positions sequentially separated in the same angular direction by an angle substantially equal to 360 degrees multiplied by an integral number, not a factor of the number of magnetic circuits of each assembly of magnetic circuits, divided by the number of magnetic circuits of each assembly of magnetic circuits, each assembly comprising the same number of one or more collections each of substantially the same number of magnetic circuits, means for supplying a component magnetomotive force from and corresponding to each phase of the polyphase electric system to, and reacting to produce a component voltage for and corresponding to each phase of the polyphase electric system in, each magnetic circuit, the peak amplitudes of the component magnetomotive forces and the component voltages corresponding to the respective phases of the polyphase electric system being substantially proportional to the absolute values of the sine over a total range substantially equal to 180 degrees multiplied by the number of collections of magnetic circuits of each assembly of magnetic circuits at angular increments each substantially equal to the said total range divided by the number of magnetic circuits of each assembly of magnetic circuits, the respective total ranges of the respective assemblies of magnetic circuits being displaced with respect to one another respective angular amounts substantially equal to the phase displacement of the phases of the polyphase electric system, means for changing the polarities of the component magnetomotive forces supplied to, and the component voltages produced in, the magnetic circuits of each assembly of magnetic circuits and corresponding to each phase of the polyphase electric system alternately with, and with the negative of, the sign of the said sine and for combining the said component voltages, in the said polarities, into composite voltages, one corresponding to each phase of the polyphase electric system, and the secondary element having means cooperating with the magnetic circuits to produce in the said secondary element, by induction, a magnetic field, rotating with respect to the said secondary element, of substantially equiangularly spaced poles of alternately opposite polarity equal in number to a number which, multiplied by the said integral number, is equal to the number of magnetic circuits of each assembly of magnetic circuits plus or minus the number of collections of magnetic circuits of each assembly of magnetic circuits.

11. An induction machine having, in combination, stator and rotor elements, one a primary and the other a secondary element, the primary element having means for producing a magnetic system, stationary with respect to the said primary element, of an assembly of substantially equiangularly spaced magnetic circuits comprising one or more collections each of substantially the same number of magnetic circuits, means for supplying substantially like magnetomotive forces of alternately opposite polarity to, and reacting to produce substantially like component voltages of alternately opposite polarity in, the magnetic circuits, the magnetomotive forces and the voltages respectively supplied to and produced in the magnetic circuits of the assembly of magnetic circuits being substantially equally phase-displaced, disregarding the alternately opposite polarity, over a total range substantially equal to 180 degrees multiplied by the number of collections of magnetic circuits of each assembly of magnetic circuits, and the secondary element having means cooperating with the magnetic circuits to produce in the said secondary element, by induction, a magnetic field, rotating with respect to the said secondary element, of substantially equiangularly spaced poles of alternately opposite polarity equal in number to the number of magnetic circuits plus or minus the number of collections of magnetic circuits.

12. An induction machine having, in combination, stator and rotor elements, one a primary and the other a secondary element, the primary element having means for producing a magnetic system, stationary with respect to the said primary element, of one or more substantially like assemblies, each of the same number, of substantially equiangularly spaced magnetic circuits, each assembly comprising the same number of one or more collections each of substantially the same number of magnetic circuits, means for supplying substantially like magnetomotive forces of alternately opposite polarity to, and reacting to produce substantially like voltages of alternately opposite polarity in, the magnetic circuits of each assembly of magnetic circuits, the magnetomotive forces and the voltages respectively supplied to and produced in the magnetic circuits of each assembly of magnetic circuits being substantially equally phase-displaced, disregarding the alternately opposite polarity, over a total range substantially equal to 180 degrees multiplied by the number of collections of magnetic circuits of each assembly of magnetic circuits, and the secondary element having means cooperating with the magnetic circuits to produce in the said secondary element, by induction, a magnetic field, rotating with respect to the said secondary element, of substantially equiangularly spaced poles of alternately opposite polarity equal in number to the number of magnetic circuits of each assembly of magnetic circuits plus or minus the number of collections of magnetic circuits of each assembly of magnetic circuits.

13. An induction machine having, in combination, stator and rotor element, one a primary and the other a secondary element, the primary element having means for producing a magnetic system, stationary with respect to the said primary element, of one or more substantially like assemblies, each of the same number, of magnetic circuits at positions sequentially separated in the same angular direction by an angle substantially equal to 360 degrees multiplied by an integral number, not a factor of the number of magnetic circuits of each assembly of magnetic circuits, divided by the number of magnetic circuits of each assembly of magnetic circuits, each assembly comprising the same number of one or more collections each of substantially the same number of magnetic circuits, means for supplying substantially like magnetomotive forces of alternately opposite polarity to, and reacting to produce substantially like voltages of alternately opposite polarity in, the magnetic circuits of each assembly of magnetic circuits, the magnetomotive forces and the voltages respectively supplied to and produced in the magnetic circuits of each assembly of magnetic circuits being substantially equally phase-displaced, disregarding the alternately opposite polarity, over a total range substantially equal to 180 degrees multiplied by the number of collections of magnetic circuits of each assembly of magnetic circuits, and the secondary element having means cooperating with the magnetic circuits to produce in the said secondary element, by induction, a magnetic field, rotating with respect to the said secondary element, of substantially equiangularly spaced poles of alternately opposite polarity equal in number to a number which, multiplied by the said integral number, is equal to the number of magnetic circuits of each assembly of magnetic circuits plus or minus the number of collections of magnetic circuits of each assembly of magnetic circuits.

14. An induction machine having, in combination, stator and rotor elements, one a primary and the other a secondary element, the primary element having a magnetizable core provided with an assembly, stationary with respect to the said primary element, of substantially equiangularly spaced primary-element slots comprising one or more collections each of substantially the same number of primary-element slots, a polyphase winding comprising a plurality of phase windings each having a number of primary-element conductor groups substantially equal to the number of primary-element slots, a primary-element conductor group of each phase winding being disposed substantially in each primary-element slot, the numbers of conductors of the primary-element conductor groups of each phase winding varying substantially as the absolute values of the sine over a total range substantially equal to 180 degrees multiplied by the number of collections of primary-element slots at angular increments each substantially equal to the said total range divided by the number of primary-element slots, the respective total ranges being displaced with respect to one another an angular amount substantially equal to the phase displacement of the phase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like assemblies each of substantially equiangularly spaced secondary-element slots, the number of slots of each assembly of secondary-element slots being equal to the number of primary-element slots plus or minus the number of collections of primary-element slots, substantially like secondary-element conductor groups being disposed one in each slot of each assembly of secondary-element slots, the directions of winding of the conductors of the secondary-element conductor groups being alternately opposite from slot to slot of each assembly of secondary-element slots, and the secondary-element conductor groups disposed in the slots of each assembly of secondary-element slots being connected along the said directions of winding into respective secondary-element phase windings.

15. An induction machine having, in combination, stator and rotor elements, one a primary and the other a secondary element, the primary element having a magnetizable core provided with an assembly, stationary with respect to the said primary element, of substantially equiangularly spaced primary-element slots comprising one or more collections each of substantially the same number of primary-element slots, a polyphase winding comprising a plurality of phase windings each having a number of primary-element conductor groups substantially equal to the number of primary-element slots, a primary-element conductor group of each phase winding being disposed substantially in each primary-element slot, the numbers of conductors of the primary-element conductor groups of each phase winding varying substantially as the absolute values of the sine over a total range substantially equal to 180 degrees multiplied by the number of collections of primary-element slots at angular increments each substantially equal to the said total range divided by the number of primary-element slots, the respective total ranges being displaced with respect to one another an angular amount substantially equal to the phase displacement of the phase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having means for producing, by induction from the primary element, a magnetic field, rotating with respect to the said secondary element, of substantially equiangularly spaced poles of alternately opposite polarity equal in number to the number of primary-element slots plus or minus the number of collections of primary-element slots.

16. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of phase windings each having a number of primary-element conductor groups substantially equal to the number of primary-element slots, a primary-element conductor group of each phase winding being disposed substantially in each primary-element slot, the numbers of conductors of the primary-element conductor groups of each phase winding varying substantially as the absolute values of the sine over a total range substantially equal to 180 degrees multiplied by the number of collections of primary-element slots at angular increments each substantially equal to the said total range divided by the number of primary-element slots, the respective total ranges being displaced with respect to one another an angular amount substantially equal to the phase displacement of the phase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like assemblies each of substantially equiangularly spaced secondary-element slots, the number of slots of each assembly of secondary-element slots being equal to the number of primary-element slots plus or minus the number of collections of primary-element slots, substantially like secondary-element conductor groups being disposed one in each slot of each assembly of secondary-element slots, the directions of winding of the conductors of the secondary-element conductor groups being alternately opposite from slot to slot of each assembly of secondary-element slots, and the secondary-element conductor groups disposed in the slots of each assembly of secondary-element slots being connected along the said directions of winding into respective secondary-element phase windings.

17. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of phase windings each having a number of primary-element conductor groups substantially equal to the number of primary-element slots, a primary-element conductor group of each phase winding being disposed substantially in each primary element slot, the numbers of conductors of the primary-element conductor groups of each phase winding varying substantially as the absolute values of the sine over a total range substantially equal to 180 degrees multiplied by the number of collections of primary-element slots at angular increments each substantially equal to the said total range divided by the number of primary-element slots, the respective total ranges being displaced with respect to one another an angular amount substantially equal to the phase displacement of the phase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having means for producing, by induction from the primary element, a magnetic field, rotating with respect to the said secondary element, of substantially equiangularly spaced poles of alternately opposite polarity equal in number to the number of primary-element slots plus or minus the number of collections of primary-element slots.

18. An induction machine having, in combination, stator and rotor elements, one a primary and the other a secondary element, the primary element having a magnetizable core provided with one or more substantially like assemblies, stationary with respect to the said primary element, of substantially equiangularly spaced primary-element slots, each assembly comprising the same number of one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like assemblies each of substantially equiangularly spaced secondary-element slots, the number of slots of each assembly of secondary-element slots being equal to the number of slots of each assembly of primary-element slots plus or minus the number of collections of slots of each assembly of primary-element slots, substantially like secondary-element conductor groups being disposed one in each slot of each assembly of secondary-element slots, the directions of winding of the conductors of the secondary-element conductor groups being alternately opposite from slot to slot of each assembly of secondary-element slots, and the secondary-element conductor groups disposed in the slots of each assembly of secondary-element slots being connected along the said directions of winding into respective secondary-element phase windings.

19. An induction machine having, in combination, stator and rotor elements, one a primary and the other a secondary element, the primary element having a magnetizable core provided with one or more substantially like assemblies, stationary with respect to the said primary element, of substantially equiangularly spaced primary-element slots, each assembly comprising the same number one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said sine, the primary-element conductor groups of the respective phase windings being connected in series along the said directions of winding, and the secondary element having means for producing, by induction from the primary element, a magnetic field, rotating with respect to the said secondary element, of substantially equiangularly spaced poles of alternately opposite polarity equal in number to the number of slots of each assembly of primary-element slots plus or minus the number of collections of slots of each assembly of primary-element slots.

20. An induction machine having, in combination, stator and rotor elements, one a primary and the other a secondary element, the primary element having a magnetizable core provided with one or more substantially like assemblies, stationary with respect to the said primary element, of primary-element slots at positions sequentially separated in the same angular direction by an angle substantially equal to 360 degrees multiplied by an integral number, not a factor of the number of slots of each assembly of primary-element slots, divided by the number of slots of each assembly of primary-element slots, each assembly comprising the same number of one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like assemblies each of substantially equiangularly spaced secondary-element slots, the number of slots of each assembly of secondary-element slots being equal to a number which, multiplied by the said integral number, is equal to the number of slots of each assembly of primary-element slots plus or minus the number of collections of slots of each assembly of primary-element slots, substantially like secondary-element conductor groups being disposed one in each slot of each assembly of secondary-element slots, the directions of winding of the conductors of the secondary-element conductor groups being alternately opposite from slot to slot of each assembly of secondary-element slots, and the secondary-element conductor groups disposed in the slots of each assembly of secondary-element slots being connected along the said directions of winding into respective secondary-element phase windings.

21. An induction machine having, in combination, stator and rotor elements, one a primary and the other a secondary element, the primary element having a magnetizable core provided with one or more substantially like assemblies, stationary with respect to the said primary element, of primary-element slots at positions sequentially separated in the same angular direction by an angle substantially equal to 360 degrees multiplied by an integral number, not a factor of the number of slots of each assembly of primary-element slots, divided by the number of slots of each assembly of primary-element slots, each assembly comprising the same number of one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said sine, the primary-element conductor groups of the respective phase windings being connected in series along the said directions of winding, and the secondary element having means for producing, by induction from the primary element, a magnetic field, rotating with respect to the secondary element, of substantially equiangularly spaced poles of alternately opposite polarity equal in number to a number which, multiplied by the said integral number, is equal to the number of slots of each assembly of primary-element slots plus or minus the number of collections of slots of each assembly of primary-element slots.

22. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of substantially like phase windings wound through the primary-element slots, means for energizing the windings to produce substantially like magnetomotive forces of alternately opposite polarity in magnetic circuits surrounding adjacently disposed primary-element slots, the magnetomotive forces being substantially equally phase-displaced, disregarding the alternately opposite polarity, over a total range substantially equal to 180 degrees multiplied by the number of collections of primary-element slots, the secondary element having a magnetizable core provided with a plurality of substantially like assemblies each of substantially equiangularly-spaced secondary-element slots, the number of slots of each assembly of secondary-element slots being equal to the number of primary-element slots plus or minus the number of collections of primary-element slots, substantially like secondary-element conductor groups disposed one in each slot of each assembly of secondary-element slots, the directions of winding of the conductors of the secondary-element conductor groups being alternately opposite from slot to slot of each assembly of secondary-element slots, and the secondary-element conductor groups disposed in the slots of each assembly of secondary-element slots being connected along the said directions of winding into respective secondary-element phase windings.

23. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of phase windings wound through the primary-element slots, means for energizing the windings to produce substantially like magnetomotive forces of alternately opposite polarity in magnetic circuits surrounding adjacently disposed primary-element slots, the magnetomotive forces being substantially equally phase-displaced, disregarding the alternately opposite polarity, over a total range substantially equal to 180 degrees multiplied by the number of collections of primary-element slots, the secondary element having a magnetizable core provided with a plurality of substantially like assemblies each of substantially equiangularly spaced secondary-element slots, the number of slots of each assembly of secondary-element slots being equal to the number of primary-element slots plus or minus the number of collections of primary-element slots, and a polyphase winding comprising a phase winding wound through the slots of each assembly of secondary-element slots for producing, by induction from the primary element, a magnetic field, rotating with respect to the said secondary element, of a number of substantially equiangularly spaced poles of alternately opposite polarity equal to the number of slots of each assembly of secondary-element slots.

24. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of substantially like phase windings wound through the primary-element slots, means for supplying substantially like voltages of alternately opposite polarity to adjacently disposed phase windings wound through the primary-element slots, the voltages respectively supplied to the primary-element slots by the windings being substantially equally phase-displaced, disregarding the alternately opposite polarity, over a total range substantially equal to 180 degrees multiplied by the number of collections of primary-element slots, the secondary element having a magnetizable core provided with a plurality of substantially like assemblies each of substantially equiangularly spaced secondary-element slots, the number of slots of each assembly of secondary-element slots being equal to the number of primary-element slots plus or minus the number of collections of primary-element slots, and a polyphase winding comprising a phase winding wound through the slots of each assembly of secondary-element slots for producing, by induction from the primary element, a magnetic field, rotating with respect to the said secondary element, of a number of substantially equiangularly spaced poles of alternately opposite polarity equal to the number of slots of each assembly of secondary-element slots.

25. An induction machine having, in combination, stator and rotor elements, one a primary and the other a secondary element, the primary element having a magnetizable core provided with one or more substantially like assemblies, stationary with respect to the said primary element, of substantially equiangularly spaced primary-element slots, each assembly comprising the same number of one or more collections each of substantially the same number of primary-element slots, a polyphase winding corresponding to each assembly of primary-element slots, each polyphase winding comprising a plurality of substantially like phase windings respectively wound through the slots of the corresponding assembly of primary-element slots, means for supplying substantially like voltages of alternately opposite polarity to adjacently disposed phase windings wound through the slots of each assembly of primary-element slots, the voltages respectively supplied to the slots of each assembly of primary-element slots by the windings being substantially equally phase-displaced, disregarding the alternately opposite polarity, over a total range substantially equal to 180 degrees multiplied by the number of collections of slots of each assembly of primary-element slots, the secondary element having a magnetizable core provided with a plurality of substantially like assemblies each of substantially equiangularly spaced secondary-element slots, the number of slots of each assembly of secondary-element slots being equal to the number of slots of each assembly of primary-element slots plus or minus the number of collections of slots of each assembly of primary-element slots, and a polyphase winding comprising a phase winding wound through the slots of each assembly of secondary-element slots for producing, by induction from the primary element, a magnetic field, rotating with respect to the said secondary element, of a number of substantially equiangularly spaced poles of alternately opposite polarity equal to the number of slots of each assembly of secondary-element slots.

26. An induction machine having, in combination, stator and rotor elements, one a primary and the other a secondary element, the primary element having a magnetizable core provided with one or more substantially like assemblies, stationary with respect to the said one element, of primary-element slots at positions sequentially separated in the same angular direction by an angle substantially equal to 360 degrees multiplied by an integral number, not a factor of the number of slots of each assembly of primary-element slots, divided by the number of slots of each assembly of primary-element slots, each assembly comprising the same number of one or more collections each of substantially the same number of primary-element slots, a polyphase winding corresponding to each assembly of primary-element slots, each polyphase winding comprising a plurality of substantially like phase windings respectively wound through the slots of the respective assembly of primary-element slots, means for supplying substantially like voltages of alternately opposite polarity to adjacently disposed phase windings wound through the slots of each assembly of primary-element slots, the voltages respectively supplied to the slots of each assembly of primary-element slots by the windings being substantially equally phase-displaced, disregarding the alternately opposite polarity, over a total range substantially equal to 180 degrees multiplied by the number of collections of slots of each assembly of primary-element slots, the secondary element having a magnetizable core provided with a plurality of substantially like assemblies each of substantially equiangularly spaced secondary-element slots, the number of slots of each assembly of secondary-element slots being equal to a number which, multiplied by the said integral number, is equal to the number of slots of each assembly of primary-element slots plus or minus the number of collections of slots of each assembly of primary-element slots, and a polyphase winding comprising a phase winding wound through the slots of each assembly of secondary-element slots for producing, by induction from the primary element, a magnetic field, rotating with respect to the said secondary element, of a number of substantially equiangularly spaced poles of alternately opposite polarity equal to the number of slots of each assembly of secondary-element slots.

27. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of substantially like phase windings each of which is wound through adjacently disposed primary-element slots, means for supplying substantially like voltages of alternately opposite polarity to the phase windings, the voltages respectively supplied to the primary-element slots by the windings being substantially equally phase-displaced, disregarding the alternately opposite polarity, over a total range substantially equal to 180 degrees multiplied by the number of collections of primary-element slots, the secondary element having a magnetizable core provided with a plurality of substantially like assemblies each of substantially equiangularly spaced secondary-element slots, the number of slots of each assembly of seconary-element slots being equal to the number of primary-element slots plus or minus the number of collections of primary-element slots, and a polyphase winding comprising a phase winding wound through the slots of each assembly of secondary-element slots for producing, by induction from the primary element, a magnetic field, rotating with respect to the said secondary element, of a number of substantially equiangularly spaced poles of alternately opposite polarity equal to the number of slots of each assembly of secondary-element slots.

28. An induction machine having, in combination, stator and rotor elements, one a primary and the other a secondary element, the primary element having a magnetizable core provided with one or more substantially like assemblies, stationary with respect to the said primary element, each of the same number of substantially equiangularly spaced primary-element slots, each assembly comprising the same number of one or more collections each of substantially the same number of primary-element slots, a polyphase winding corresponding to each assembly of primary-element slots, each polyphase winding comprising a plurality of substantially like phase windings each of which is wound through adjacently disposed slots of the corresponding assembly of primary-element slots, means for supplying substantially like voltages of alternately opposite polarity to the phase windings, the voltages respectively supplied to the slots of each assembly of primary-element slots by the windings being substantially equally phase-displaced, disregarding the alternately opposite polarity, over a total range substantially equal to 180 degrees multiplied by the number of collections of slots of each assembly of slots, the secondary element having a magnetizable core provided with a plurality of substantially like assemblies each of substantially equiangularly spaced secondary-element slots, the number of slots of each assembly of secondary-element slots being equal to the number of slots of each assembly of primary-element slots plus or minus the number of collections of slots of each assembly of primary-element slots, and a polyphase winding comprising a phase winding wound through the slots of each assembly of secondary-element slots for producing, by induction from the primary element, a magnetic field, rotating with respect to the said secondary element, of a number of substantially equiangularly spaced poles of alternately opposite polarity equal to the number of slots of each assembly of secondary-element slots.

29. An induction machine having, in combination, stator and rotor elements, one a primary and the other a secondary element, the primary element having a magnetizable core provided with one or more substantially like assemblies, stationary with respect to the said primary element, of primary-element slots at positions sequentially separated in the same angular direction by an angle substantially equal to 360 degrees multiplied by an integral number, not a factor of the number of slots of each assembly of primary-element slots, divided by the number of slots of each assembly of primary-element slots, each assembly comprising the same number of one or more collections each of substantially the same number of primary-element slots, a polyphase winding corresponding to each assembly of primary-element slots, each polyphase winding comprising substantially like phase windings each of which is wound through adjacently disposed slots of the corresponding assembly of slots, means for supplying substantially like voltages of alternately opposite polarity to the phase windings, the voltages respectively supplied to the slots of each assembly of primary-element slots by the windings being substantially equally phase-displaced, disregarding the alternately opposite polarity, over a total range substantially equal to 180 degrees multiplied by the number of collections of slots of each assembly of primary-element slots, the secondary element having a magnetizable core provided with a plurality of substantially like assemblies each of substantially equiangularly spaced secondary-element slots, the number of slots of each assembly of secondary-element slots being equal to a number which, multiplied by the said integral number, is equal to the number of slots of each assembly of primary-element slots plus or minus the number of collections of slots of each assembly of primary-element slots, and a polyphase winding comprising a phase winding wound through the slots of each assembly of secondary-element slots for producing, by induction from the primary element, a magnetic field, rotating with respect to the said secondary element, of a number of substantially equiangularly spaced poles of alternately opposite polarity equal to the number of slots of each assembly of secondary-element slots.

30. An induction machine having, in combination, stator and rotor elements, one a primary and the other a secondary element, the primary element having a magnetizable core provided with a plurality of substantially like assemblies, stationary with respect to the said primary element, of substantially equiangularly spaced primary-element slots, each assembly comprising the same number of one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like assemblies each of substantially equiangularly spaced secondary-element slots, the number of slots of each assembly of secondary-element slots being equal to the number of slots of each assembly of primary-element slots plus or minus the number of collections of slots of each assembly of primary-element slots, and a squirrel-cage winding disposed in the secondary-element slots.

31. An induction machine having, in combination, stator and rotor elements, one a primary and the other a secondary element, the primary element having a magnetizable core provided with one or more substantially like assemblies, stationary with respect to the said primary element, of substantially equiangularly spaced primary-element slots, each assembly comprising the same number of one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like asssemblies each of substantially equiangularly spaced secondary-element slots, the number of slots of each assembly of secondary-element slots being equal to a number which, multiplied by the said integral number, is equal to the number of slots of each assembly of primary-element slots plus or minus the number of collections of slots of each assembly of primary-element slots, and a squirrel-cage winding disposed in the secondary-element slots.

32. An induction machine having, in combination, stator and rotor elements, one a primary and the other a secondary element, the primary element having a magnetizable core provided with one or more of substantially like assemblies, stationary with respect to the said primary element, of primary-element slots at positions sequentially separated in the same angular direction by an angle substantially equal to 360 degrees multiplied by an integral number, not a factor of the number of slots of each assembly of primary-element slots, divided by the number of slots of each assembly of primary-element slots, each assembly comprising the same number of one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like asssemblies each of substantially equiangularly spaced secondary-element slots, the number of slots of each assembly of secondary-element slots being equal to a number which, multiplied by the said integral number, is equal to the number of slots of each assembly of primary-element slots plus or minus the number of collections of slots of each assembly of primary-element slots, and a squirrel-cage winding disposed in the secondary-element slots.

33. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of substantially like phase windings wound through the primary-element slots, means for supplying substantially like voltages of alternately opposite polarity to adjacently disposed phase windings wound through the primary-element slots, the voltages respectively supplied to the primary-element slots by the windings being substantially equally phase-displaced, disregarding the alternately opposite polarity, over a total range substantially equal to 180 degrees multiplied by the number of collections of primary-element slots, the secondary element having a magnetizable core provided with a plurality of substantially like assemblies each of substantially equiangularly spaced secondary-element slots, the number of slots of each assembly of secondary-element slots being equal to the number of primary-element slots plus or minus the number of collections of primary-element slots, substantially like secondary-element conductor groups being disposed one in each slot of each assembly of secondary-element slots, the directions of winding of the conductors of the secondary-element conductor groups being alternately opposite from slot to slot of each assembly of secondary-element slots, and the secondary-element conductor groups disposed in the slots of each assembly of secondary-element slots being connected, along the said directions of winding, in series and the conductor groups disposed in secondary-element slots displaced 360 degrees divided by two times the number of collections of primary-element slots also in parallel, into respective secondary-element phase-winding circuits.

34. An induction machine having, in combination, stator and rotor elements, one a primary and the other a secondary element, the primary element having magnetizable-core means provided with an assembly, stationary with respect to the said primary element, of substantially equiangularly spaced primary-element slots comprising one or more collections each of substantially the same number of primary-element slots, a polyphase winding comprising a plurality of phase windings each having a number of primary-element conductor groups substantially equal to the number of primary-element slots, a primary-element conductor group of each phase winding being disposed substantially in each primary-element slot, the numbers of conductors of the primary-element conductor groups of each phase winding varying substantially as the absolute values of the sine over a total range substantially equal to 180 degrees multiplied by the number of collections of primary-element slots at angular increments each substantially equal to the said total range divided by the number of primary-element slots, the respective total ranges being displaced with respect to one another an angular amount substantially equal to the phase displacement of the phase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like assemblies each of substantially equiangularly spaced secondary-element slots, the number of slots of each assembly of secondary-element slots being equal to the number of primary-element slots plus or minus the number of collections of primary-element slots, substantially like secondary-element conductor groups being disposed one in each slot of each assembly of secondary-element slots, the directions of winding of the conductors of the secondary-element conductor groups being alternately opposite from slot to slot of each assembly of secondary-element slots, and the secondary-element conductor groups disposed in the slots of each assembly of secondary-element slots being connected, along the said directions of winding, in series, and the conductor groups disposed in secondary-element slots displaced 360 degrees divided by two times the number of collections of primary-element slots also in parallel, into respective secondary-element phase windings.

35. An induction machine having, in combination, stator and rotor elements, one a primary and the other a secondary element, the primary element having a magnetizable core provided with one or more substantially like assemblies, stationary with respect to the said primary element, of substantially equiangularly spaced primary-element slots, each assembly comprising one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of the sine over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phase windings, the directions of winding of the conductors of the primary-element conductor groups of each phase winding changing alternately with, and with the negative of, the sign of the said sine, the primary-element conductor groups of the respective phase windings being connected in series along the said directions of winding, the secondary element having a magnetizable core provided with a plurality of substantially like assemblies each of substantially equiangularly spaced secondary-element slots, the number of slots of each assembly of secondary-element slots being equal to the number of slots of each assembly of primary-element slots plus or minus the number of collections of slots of each assembly of primary-element slots, substantially like conductor groups disposed in each slot of each assembly of secondary-element slots, the directions of winding of the conductors of the conductor groups being alternately opposite from slot to slot of each assembly of secondary-element slots, means connecting the conductor groups disposed in secondary-element slots of each assembly of secondary-element slots which are displaced 360 degrees divided by two times the number of collections of primary-element slots, in series through a conductive plate common to all the series circuits.

36. An induction machine having, in combination, stator and rotor elements, one a primary and the other a secondary element, the primary element having a magnetizable core provided with one or more substantially like assemblies, stationary with respect to the said primary element, of substantially equiangularly spaced primary-element slots, each assembly of primary-element slots comprising the same number of one or more collections each of substantially the same number of primary-element slots, a polyphase winding corresponding to each assembly of primary-element slots, each polyphase winding comprising a plurality of substantially like primary-element phase windings respectively wound through the slots of the corresponding assembly of primary-element slots, means for supplying substantially like voltages of alternately opposite polarity to adjacently disposed primary-element phase windings wound through the slots of each assembly of primary-element slots, the voltages respectively supplied to the slots of each assembly of primary-element slots by the windings being substantially equally phase-displaced, disregarding the alternately opposite polarity, over a total range substantially equal to 180 degrees multiplied by the number of collections of slots of each assembly of primary-element slots, the secondary element having a magnetizable core provided with a plurality of substantially like assemblies each of substantially equiangularly spaced secondary-element slots, the number of slots of each assembly of secondary-element slots being equal to the number of slots of each assembly of primary-element slots plus or minus the number of collections of slots of each assembly of primary-element slots, substantially like conductor groups disposed in each slot of each assembly of secondary-element slots, the directions of winding of the conductors of the conductor groups being alternately opposite from slot to slot of each assembly of secondary-element slots, means connecting the conductor groups disposed in secondary-element slots of each assembly of secondary-element slots which are displaced 360 degrees divided by two times the number of collections of primary-element slots, in series through a conductive plate common to all the series circuits.

37. An induction machine having, in combination, stator and rotor elements, one a primary and the other a secondary element, the primary element having a magnetizable core provided with one or more substantially like assemblies, stationary with respect to the said primary element, of primary-element slots at positions sequentially separated in the same angular direction by an angle substantially equal to 360 degrees multiplied by an integral number, not a factor of the number of slots of each assembly of primary-element slots, divided by the number of slots of each assembly of primary-element slots, each assembly comprising the same number of one or more collections each of substantially the same number of primary-element slots, a polyphase winding corresponding to each assembly of primary-element slots, each polyphase winding comprising a plurality of phase windings each having a number of primary-element conductor groups substantially equal to the number of slots of each assembly of primary-element slots, a primary-element conductor group of each phase winding being disposed substantially in each slot of the corresponding assembly of primary-element slots, the numbers of conductors of the primary-element conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of slots of each assembly of primary-element slots at angular increments each substantially equal to the said total range divided by the number of slots of each assembly of primary-element slots, the respective total ranges of the respective polyphase windings being displaced with respect to one another respective angular amounts substantially equal to the phase displacement of the phases of the respective polyphase windings, the directions of winding of the conductors of the primary-element conductor groups of each phase winding changing alternately with, and with the negative of, the sign of the said alternating function, the primary-element conductor groups of the respective phase windings being connected in series along the said directions of winding, and the secondary element having means for producing, by induction from the primary element, a magnetic field, rotating with respect to the secondary element, of substantially equiangularly spaced poles of alternately opposite polarity equal in number to a number which, multiplied by the said integral number, is equal to the number of slots of each assembly of primary-element slots plus or minus the number of collections of slots of each assembly of primary-element slots.

References Cited in the file of this patent

FOREIGN PATENTS

| | | |
|---|---|---|
| 644,676 | Great Britain | Oct. 18, 1950 |
| 656,655 | Great Britain | Aug. 29, 1951 |